United States Patent [19]

Rubbia

[11] Patent Number: 5,774,514
[45] Date of Patent: Jun. 30, 1998

[54] ENERGY AMPLIFIER FOR NUCLEAR ENERGY PRODUCTION DRIVEN BY A PARTICLE BEAM ACCELERATOR

[76] Inventor: Carlo Rubbia, 9, Chemin des Tulipiers, Geneve, Switzerland, 1200

[21] Appl. No.: 632,424

[22] PCT Filed: Jul. 25, 1994

[86] PCT No.: PCT/EP94/02467

§ 371 Date: Apr. 24, 1996

§ 102(e) Date: Apr. 24, 1996

[87] PCT Pub. No.: WO95/12203

PCT Pub. Date: May 4, 1995

[30] Foreign Application Priority Data

Oct. 29, 1993 [EP] European Pat. Off. .............. 93117587

[51] Int. Cl.⁶ ...................................................... G21C 1/30
[52] U.S. Cl. .......................... 376/193; 376/181; 376/171; 376/194; 376/355; 376/381
[58] Field of Search ..................................... 376/181, 190, 376/192, 193, 194, 195, 355, 381, 170–172

[56] References Cited

U.S. PATENT DOCUMENTS

| | | | |
|---|---|---|---|
| 3,291,694 | 12/1966 | Borst ........................................ | 376/170 |
| 3,325,371 | 6/1967 | Stanton .................................... | 376/193 |
| 3,349,001 | 10/1967 | Stanton .................................... | 376/193 |
| 4,309,249 | 1/1982 | Steinberg et al. ....................... | 376/192 |
| 5,037,604 | 8/1991 | Dauvergne ............................... | 376/172 |
| 5,160,696 | 11/1992 | Bowman .................................. | 376/195 |

FOREIGN PATENT DOCUMENTS

| | | |
|---|---|---|
| 2152380 | 4/1973 | France . |
| 2655402 | 7/1977 | Germany . |

OTHER PUBLICATIONS

Bowman et al, Nuclear Instuments and Methods in Physics Research vol. A320, No. 1–2, pp. 336–367, Aug. 15. 1992.
Okumura et al, Journal of Nuclear Science and Technology vol. 25, No. 12, pp. 948–951, Dec. 1988.
Grand, Nature, vol. 278, No. 5706, pp. 693–656, Apr. 19, 1979.
Maly, Atomwirtschaft–Atomtechnik, vol. 19, No. 12, pp. 601–603, Dec. 1974.

*Primary Examiner*—Daniel D. Wasil
*Attorney, Agent, or Firm*—Larson & Taylor

[57] ABSTRACT

A method for producing energy from a nuclear fuel material contained in an enclosure, through a process of breeding of a fissile element from a fertile element of the fuel material via a β-precursor of the fissile element and fission of the fissile element. A high energy particle beam is directed into the enclosure for interacting with heavy nuclei contained in the enclosure so as to produce high energy spallation neutrons. The neutrons thereby produced are multiplied in steady sub-critical conditions by the breeding and fission process. The breeding and fission process is carried out inside the enclosure.

36 Claims, 26 Drawing Sheets

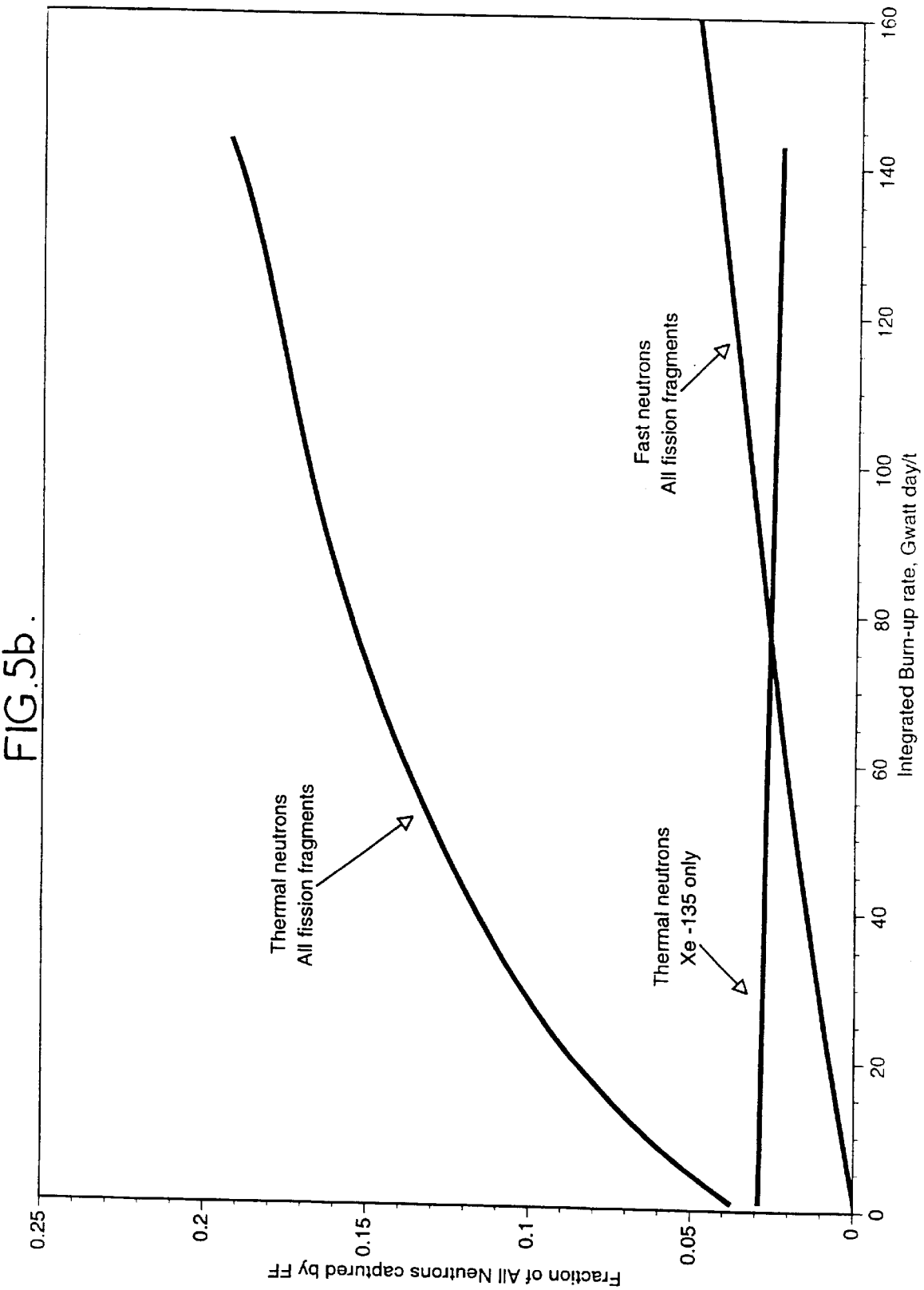

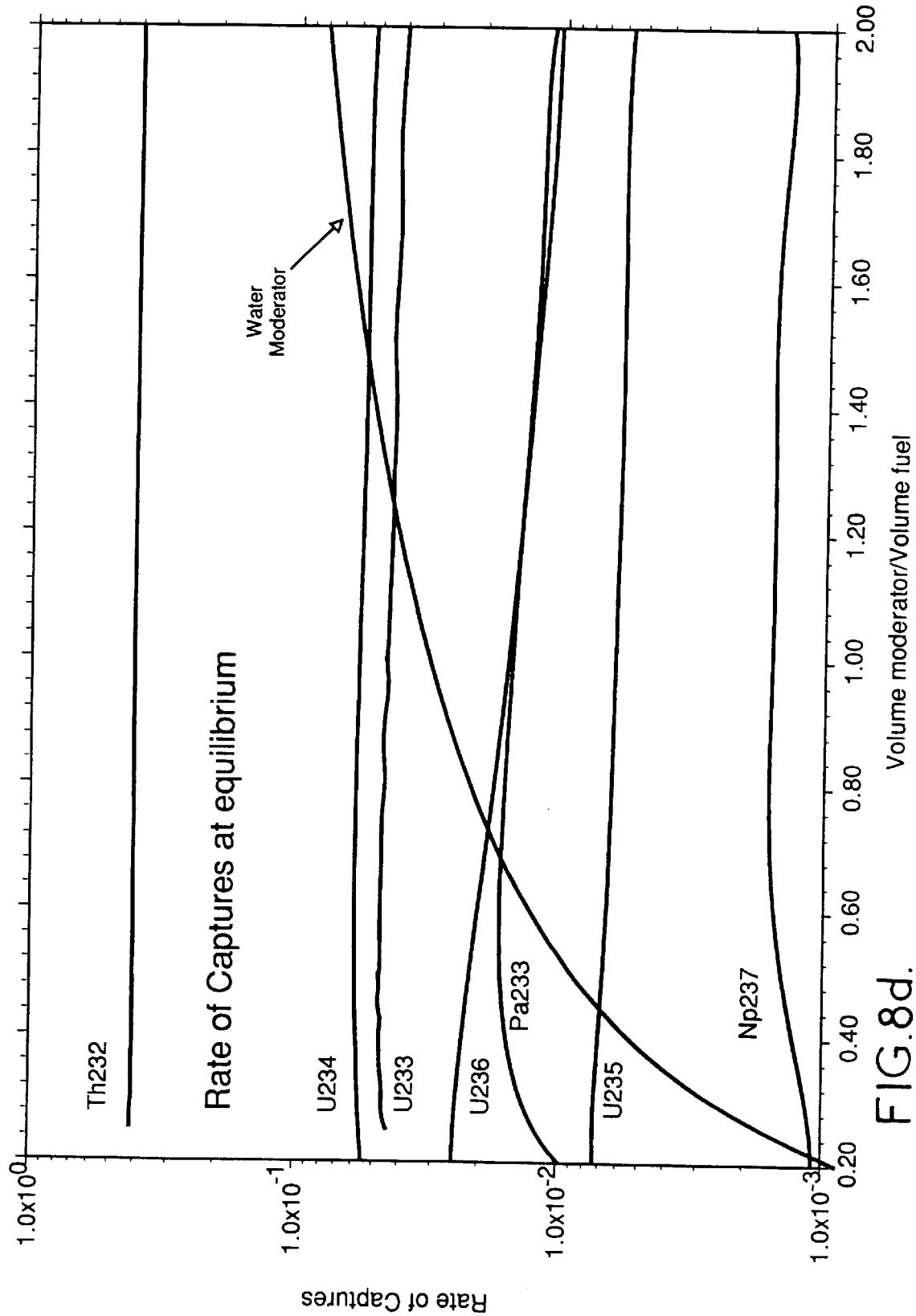

ENERGY AMPLIFIER FOR NUCLEAR ENERGY PRODUCTION DRIVEN BY A PARTICLE BEAM ACCELERATOR

The present invention relates to a method of producing energy from a nuclear fuel material. The invention is also directed to an energy amplifier for implementing such method, and to an energy production installation incorporating such energy amplifier.

Nuclear Reactors are of widespread use for the production of thermal or electrical power. Numerous Reactor designs have been developed, leading to extensive technological studies. However, conventional Reactors are not without problems. Control of the operation is generally delicate, as dramatically demonstrated by some accidents. For most Reactor designs, preparation of the fuel material involves isotopic separation, a complex and costly process which gives rise to proliferation risks. Proliferation risks also result from the fact that conventional nuclear Reactors generally produce fissile Plutonium. Energy recovery from such Plutonium, for instance by means of a fast neutron breeder Reactor, has raised many difficulties and is only marginally employed. Moreover, Plutonium and other actinides produced in non-negligible amounts in conventional Reactors are radiologically toxic, and are not easily disposed of. Geological storage of such actinides, together with fission fragments, is used, but clearly is not a satisfying solution.

Today's nuclear energy is based primarily on fissions of natural $U^{235}$, which constitutes however only about 0.7% of ordinary Uranium. Early in the development of nuclear energy, one realised the importance of breeding artificial fuels from more abundant nuclear species with the help of neutron captures. In particular, starting from the dominant $U^{238}$ one can breed $Pu^{239}$ and from natural Thorium (pure isotope $Th^{232}$) readily fissionable $U^{233}$. While $U^{238}$—$Pu^{239}$ breeding has led to the extensive but controversial development of the (fast) breeder Reactors, so far relatively little progress has been made on the $Th^{232}$—$U^{233}$ breeding chain.

In "Nuclear energy generation and waste transmutation using an accelerator-driven intense thermal neutron source" (Nuclear Instruments and Methods in Physics Research, 1992, Vol. A320, pages 336–367), C. D. Bowman et al contemplate using a proton accelerator for incinerating actinide wastes produced by a light-water Reactor (see also U.S. Pat. No. 5,160,696). The installation is also expected to be capable of producing energy from the thorium cycle. However, the thermal neutron flux in the installation core needs to be very high (in the $10^{16}$ cm$^{-2}$.s$^{-1}$ range) in order to achieve the transmutation of Neptunium and Americium. Under these conditions, the energy producing breeding and fission process (i.e. capture of a neutron by $Th^{232}$ leading to $Pa^{233}$, βdecay of $Pa^{233}$ into $U^{233}$, and n-fission of $U^{233}$) cannot be performed in situ, but instead necessitates continuous extraction of $Pa^{233}$ away from the neutron flux to allow for βdecay of $Pa^{233}$ into $U^{233}$ outside the core while limiting neutron captures by $Pa^{233}$, which would plague the neutron balance and lead to producing additional actinides (at about $10^{16}$ cm$^{-2}$.s$^{-1}$ the probabilities of forming $Pa^{234}$ and $U^{233}$ from $Pa^{233}$ are comparable). Moreover, abundant fission products must be continuously extracted from the installation core and chemically processed. Such extractions and chemical processing are complicated manipulations which would make the installation virtually unsuitable for commercial energy production applications. Also, the accumulation of $Pa^{233}$ out of the installation core is undesirable because it would decay, after about 27 days, into highly proliferative $U^{233}$.

To summarize the prior art, practical nuclear energy Reactors and fast breeders rely on a critical chain reaction which is generally carried out inside a sealed enclosure, but still raise many problems despite several decades of extensive developments. And the above proposition of an accelerator-driven thermal neutron scheme is presently a prospective issue. Its practical applications will be conditioned by long term Research and Development, due to the extremely high neutron flux and the requirement for chemical separation at unprecendentedly high radioactive levels.

A primary object of the present invention is to provide a viable alternative to conventional Reactors for extracting nuclear energy, which circumvents a number of problems encountered with such Reactors and East breeders.

Another object of the invention is that the energy producing scheme does not necessitate continuous reprocessing of the fuel material. It is also desired that the energy producing scheme be compatible with the use of Thorium as the main constituent of the fuel material.

According to the invention, there as provided a method of producing energy from a nuclear fuel material contained in an enclosure, through a process of breeding of a fissile element from a fertile element of the fuel material via a β-precursor of said fissile element and fission of the fissile element, characterised in that a high energy particle beam is directed into the enclosure for interacting with heavy nuclei contained in the enclosure so as to produce high energy neutrons, the neutrons thereby produced being multiplied in sub-critical conditions by the breeding and fission process, said breeding and fission process being carried out inside the enclosure.

The amount by which neutrons are slowed down from production to fission is application-dependent. One could for instance slow down neutrons all the way to thermal energies ($E_{ave} \approx 0.025$ (T/273° K.) eV, slightly affected by the temperature T of the medium). In other cases, like for instance when light water is used as moderator, one could let neutrons reach energies on the order of several eV. Finally, in other applications, one can use coolants which have little moderating action and hence operate with neutrons of energies of the order of 100 keV. We denominate such neutrons as "fast neutrons", in contrast from he previous examples which are indicated as "thermal" and "epithermal" neutrons, respectively.

In order to obtain a high energy output, the average neutron flux to which the fuel material is exposed has to be intense. However, there are reasons for limiting the neutron flux in the method of the invention. Advantageously, the average neutron flux Φ is sufficiently low to prevent neutron captures by a substantial amount of the β-precursor of the fissile element. A practical Limitation is $\Phi \leq 0.03/(\sigma_i^{(2)} \tau_2)$, where $\sigma_i^{(2)}$ and $\tau_2$ designate the neutron capture cross section and the half-life, respectively, of the β-precursor, so that at most 3% of the β-precursors capture neutrons instead of decaying into the fissile element. This condition ensures that practically all the β-precursor nuclei are transformed into the relevant fissile element, and that the neutron balance in the enclosure is not affected by undesired captures, thereby optimising the energy gain.

Since the breeding and fission process is subcritical, the effective multiplication factor k is smaller than 1. In order to obtain a high gain, the fissile content of the fuel material is such that the effective multiplication factor is close to 1 (typically $0.9 \leq k \leq 0.98$). In the event of a beam interruption, the fissile content increases due to the β-decays of the available β-precursors, and the system might become critical. In order to avoid this, it is possible to insert control bars or the like into the enclosure. But a simpler solution is to keep the average neutron flux sufficiently low to limit the inventory of the β-precursor so as to prevent the fuel material from reaching criticality in the event of the beam interruption. This condition can be quantified as $\Phi \leq 0.2/(\sigma^{(3)}\tau_2)$, where $\sigma^{(3)}$ designates the total neutron interaction cross section of the fissile nuclei.

Evidently, the largest value of k at which the device can realistically work depends on the type of protections employed and the operational stability of k due to the above-indicated effects and which in turn depend on which energy domain is chosen for the neutrons. In general, one can say that the above conditions permit for fast neutrons a substantially larger k than for thermal or epithermal.

Once the fuel material has reached equilibrium conditions, a burning phase takes place, where the ratio between the concentrations of the fissile element and of the fertile element in the fuel material is substantially stable. When, in the initial fuel load, the ratio between the concentrations of the fissile element and of the fertile element is substantially smaller than the stable value of said ratio in the burning phase, an initial breeding phase is carried out in order to reach the stable value. During the initial breeding phase, the incident beam intensity should be higher than in the burning phase.

It is also possible to use an initial fuel load in which the ratio between the concentrations of the fissile element and of the fertile element is about the stable value of said ratio in the burning phase. In such case, the fissile element content of the initial fuel load can be recovered, through chemical separation, from an other fuel material which has been consumed in a previous similar energy production operation. Alternatively, additional fuel material can be inserted in the enclosure during activation of the particle beam, said additional fuel material having an initial content in which the ratio between the concentrations of the fissile element and of the fertile element is substantially smaller than the stable value of said ratio in the burning phase, the additional fuel material being removed from the enclosure once the stable value of said ratio is reached, in order to use said additional fuel material as the initial fuel load in a subsequent energy production operation.

When the fertile element is $Th^{232}$ ($pa^{233}$ being the β-precursor, and $U^{233}$ being the fissile element) and the neutrons are thermal or epithermal, the average neutron flux in the enclosure is preferably less than $1.5\times10^{14}$ cm$^{-2}$.s$^{-1}$ and the fuel material is left in the enclosure until it has been subjected to an integrated neutron flux of about $3\times10^{22}$ cm$^{-2}$. It is possible to provide $U^{235}$ nuclei in the initial fuel load, so as to have a fissile content in the fuel material prior to the burning phase.

When the fertile element is $U^{238}$ ($Np^{239}$ being the β-precursor, and $Pu^{239}$ being the fissile element) and the neutrons are again thermal or epithermal, the average neutron flux in the enclosure is preferably less than $10^{15}$ cm$^{-2}$.s$^{-1}$, and the fuel material is left in the enclosure until it has been subjected to an integrated neutron flux of about $10^{22}$ cm$^{-2}$.

The "heavy nuclei" contained in the enclosure, which interact with the particle beam for producing high energy neutrons, can be comprised of nuclei of the fuel material. In such an embodiment of the present invention, the moderator medium is water, and the ratio between the values respectively occupied by the water moderator and by the fuel material in the enclosure is in the range $0.2 \leq V_m/V_f \leq 1$. In particular, the moderator can be flowing water, further used for extracting heat from the enclosure. Preferably, the fuel material is then in fragmented form, and forms a fluidized bed with the water moderator. The ratio $V_m/V_f$, and thus the reactivity, can be easily adjusted by adjusting the flow rate of the water moderator.

Alternatively, the "heavy nuclei" are provided by a separate spallation target, centrally located in the enclosure and surrounded by the fuel material and the moderator medium. To avoid impairing the efficiency of the energy production, the spallation target should contain a substantial amount of a material having a high transparency to thermal neutrons. Spallation target made of bismuth and/or lead typically fulfill this condition.

In the latter embodiment, a solid-phase moderator medium, such as graphite, can be used. The solid-phase moderator is arranged so as to achieve a substantially complete thermalization of the high energy neutrons produced by the spallation target, the fuel material being for instance comprised of a plurality of fuel bodies, each encapsulated in a shell of solid-phase moderator. An important advantage of this embodiment is that the heat produced by the fissions can be extracted from the enclosure by means of gazeous coolants, which are known to give rise to higher thermodynamical efficiencies than liquid coolants.

Finally, instead of light water, a liquid metal such as Lead, Bismuth or an eutectic mixture of the two can be used as a coolant. Because of the lower moderating action of such materials, the device will then be driven by fast neutrons. In view of the considerable safety problems related to liquid Sodium, chosen almost universally in the Fast Breeder reactors, we have opted for liquid Lead. Another overwhelming reason for choosing Lead (or Bismuth, or an eutectic mixture of the two) is the fact that these materials are high energy targets which offer an excellent neutron yield, and therefore, the coolant material can also be the first target for the high energy proton beam.

Although light water as a coolant is well known due to the vast experience of PWR's, its high pressure ($\geq 160$ bars) is not without potential problems, and for instance a massive loss of the coolant due to a leak could lead to melt-down problems. The presence of the window which must withstand such a large pressure and permit the injection of the high energy beam further complicates the problem. These problems can be strongly attenuated by reducing the temperature and, hence, the operating pressure of the water, but at the cost of a lower thermodynamical efficiency, but it could still be of interest for special applications like for instance water desalination or heat production.

There are advantages in operating with a liquid metal coolant which has a very low vapour pressure (<<1 mm Hg) in spite of the higher operating temperature, typically 600° C., with a correspondingly higher thermodynamical efficiency. There is no way in which a major part of the coolant can be lost or spilled out, provided its tank is sufficiently strong and possibly double-walled. The radioactivity heating will in practice be sufficient to maintain the Lead in the main tank in its liquid form. It suffices then to introduce a convective, passive and permanent heat dissipation from the tank to the outside of an amount larger than the radioactivity heating (a few percent of the full thermal power). This will dissipate safely away the residual power due to radioactive decays after shut-off and eliminate in an automatic and credible way all risks associated to an uncontrolled temperature rise in the case of the failure of the standard cooling system, with the risk of melt-down accidents. This additional cooling system should be entirely passive and involve convection cooling either with water or air or both.

The fact that this last device lends itself to an intrinsically safe protection against accidental melt-down represents an important asset.

The particles of the incident beam are typically protons or deuterons provided by a linear particle accelerator or by a sector-focussed cyclotron, and having an energy of at least 0.5 GeV, preferably between 1 and 1.5 GeV.

According to the second aspect of the present invention, there is provided an energy amplifier for implementing a method as outlined hereabove, comprising an enclosure for containing a fuel material including a fertile element, characterized in that it further comprises means for directing a high energy particle beam into the enclosure so as to produce high energy neutrons from the interaction of the particle beam with heavy nuclei contained in the enclosure, whereby the neutrons can be multiplied in subcritical conditions by an in situ process of breeding fissile elements from fertile elements of the fuel material and fission of the fissile elements.

According to another aspect of the present invention, there is provided an energy production installation, comprising an energy amplifier as defined hereabove, a particle accelerator for producing a high energy particle beam directed into the enclosure of the energy amplifier, coolant fluid circulation means for extracting heat from the enclosure of the energy amplifier, and energy conversion means for transforming heat conveyed by the coolant fluid into a readily usable form of energy.

A portion of the energy output of the energy conversion means can be used for driving the particle accelerator.

The thereby described invention of an Energy Amplifier circumvents the well known difficulty that nuclear Reactors are plagued by an insufficient breeding power in order to use natural Thorium as the primary fuel in practical conditions. In order to have a fully self-sufficient breeding chain reaction, the number of secondary neutrons $\eta$ resulting from one neutron captured must exceed 2 for the fissile element: each time one neutron must be sacrificed to replace the fissioned nucleus out of the fertile nucleus and another one is needed to continue the fission chain. Such fully sustained breeding is very difficult in a Reactor, since for thermal neutrons $\eta=2.29$ for $U^{233}$, very close to the minimal condition $\eta \geq 2$. Therefore in a Reactor a fully sustained breeding is plagued by the problem of the neutron inventory. In order to ensure at the same time breeding and the criticality, at most a fraction $(2.29-2)/2.29=0.126$ of the neutrons may be lost by containment losses and captures by other materials. This is very close to the minimal value of neutron losses which can be achieved using the most careful design and heavy water moderation, leaving little or no room for the inevitable build up of captures due for instance to fission fragments and other mechanisms of neutron absorption related to the breeding process, which will be described in more detail later on. Consequently a Thorium-based conventional thermal Reactor cannot operate in a satisfactory way on a self sufficient $Th^{232}$—$U^{233}$ cycle. The external supply of neutrons removes the above mentioned limitations.

Fast neutrons are in a region in which $\eta$ is significantly larger than for thermal and epithermal neutrons. In addition, because of the higher energies, additional neutrons are produced at each generation by different processes, like for instance fast fissions in the fertile material $Th^{232}$ and $(n;2n)$ reactions in the fuel and the moderator. In order to take into account these contributions, it is customary to replace the parameter $\eta$ with $\eta\epsilon$ where $\epsilon$ is the ratio of all neutrons produced to the ones from the main fissile material. For the case of fast neutrons, we expect $\eta\epsilon \approx 2.4 \rightarrow \leftarrow 2.5$ significantly larger than $\eta=2.29$, but in our view not quite enough to have a long lasting critical Reactor.

Used in conjunction with the present invention, Thorium offers very important advantages with respect to Uranium-based Reactors and breeders:

1) Thorium is more abundant than Uranium. More importantly, it is a pure isotope, which can in principle all be used as fuel. Hence, in the Energy Amplifier, Thorium is a fuel 140 times more effective than natural Uranium in a Reactor where natural Uranium requires most often also a costly and complicated isotopic enrichment.

2) The breeding and energy producing reactions used in the present scheme generate little minor actinides amongst the radioactive waste. In regime conditions, an approximately constant quantity of fissionable nuclei is present and continuously burnt and regenerated from the bulk material. Such actinides are not literally considered to be "waste" since they constitute the badly needed "seeds" for the next load of the power generating plant. Instead, conventional Reactors produce a large surplus of long-lived and highly toxic actinides (the number of Plutonium nuclei produced is typically 0.5 to 0.9 of the fissioned $U^{235}$ nuclei), growing essentially indefinitely with the burn-up of the fuel.

3) of course in both cases and for a given delivered energy, there is a comparable quantity of fission fragments, most of which are unstable. The toxicity of the fission fragments is strong, but much more short-lived. It decays well below the toxicity level of a volume of natural Uranium ores for an equivalent energy delivery in a period of a few hundred years, over which a safe depository is perfectly sensible.

4) The risk of nuclear proliferation is negligible, since the potentially strategic material, namely $U^{233}$, is present in the fuel as an isotopic mixture, with $U^{232}$ produced by the inevitable (n,2n) reactions in sufficient amount to positively "denaturate" the Uranium if chemically separated. The $U^{232}$ isotope is relatively short-lived (70 years) and its decay products are strongly radioactive and produce a large spontaneous heat making very hard, albeit impossible, any military diversion of the material. As yet, the added toxicity due to the presence of $U^{232}$ is not so large as to make the processing of the spent fuel impossibly expensive. This feature is of course lost in the "incinerators" in which the $Pa^{233}$ is promptly extracted and it produces later by decay, essentially pure, bomb grade $U^{233}$. This effect is obviously maximized in the case of fast neutrons which produce about 50 times more $U^{232}$ than thermal neutrons. Fast neutrons have also the added advantage that the production of higher-mass actinides is in practice totally suppressed. Even the production of the lower Neptunium and Plutonium isotopes, like $Np^{237}$ and $Pu^{238}$ is virtually absent (levels of less than 1 gr/ton after 100 GWatt (t) day/ton). A fortiori, this applies to higher Plutonium, Americium, Curium, Californium isotopes etc. which are the main source of long-lived toxicity of ordinary Nuclear Reactors. In the case of thermal neutrons, Plutonium isotopes are produced in very small quantities and "incinerated" so that they reach equilibrium with fractional concentrations indicated within parenthesis: $Pu^{239}(1.03\times10^{-4})$, $Pu^{240}(6.9\times10^{-5})$, $Pu^{242}(8.8\times10^{-5})$ and $Pu^{238}(1.97\times10^{-4})$, which has the moderate lifetime of 87.7 years for $\alpha$-decay into $U^{234}$.

In conclusion, the scheme is driven by the wish of simplicity and achieves the goal of creating practical nuclear energy based on the natural Thorium breeding-burning cycle. The fuel is kept sealed and it contains a minimal, constant amount of fissile material, resulting from a stable equilibrium condition between breeding and fissions. The utilisation of each fuel load is expected to last several years of full utilisation in the Energy Amplifier without requiring manipulations. Eventually the fuel must be returned to the factory to be regenerated, removing the "poisons" due to fission fragments and recovering the chemically separated Uranium isotopes which will become the "seeds" for the next fuel load. Hence the breeding process can continue essentially indefinitely for each installation.

The present invention differs radically from proposals for the beam-driven "incinerators" largely described in the literature, which are expected to destroy actinides and possibly also some of the fission fragments produced by nuclear Reactors. Our philosophy is on the contrary to strongly suppress the production of such actinides in the first instance. The two devices follow different design criteria and also operate in very different conditions:

1) the Energy Amplifier must operate at a relatively low neutron flux to ensure the corrrect performance of the proposed breeding cycle and to prevent the risk of criticality. Such neutron flux (typically about $10^{14}$ $cm^{-2}s^{-1}$ for the thermal case) is comparable to the one in ordinary Nuclear Reactors and for which ample technological experience on materials etc. exists already. On the contrary, an effective incineration based on thermal neutrons needs a neutron flux which is about two orders of magnitude higher and correspondingly larger beam power. Equally sharp limitations apply to the fast neutron flux at which the device can operate in acceptable conditions. Note that for the equivalent operating conditions, and in particular for the same burn-up rate, the neutron flux is approximately 33 times larger. As well known, it simply reflects the fact that cross sections are generally smaller at higher energies. Considerable experience exists on fuel pins or rods intended for Fast Breeders. Most of such experience can be directly transferred to our application. The thermodynamics of the fuel pins allow a burn-up rate which is about three times the one of a thermal Energy amplifier, which turns out to be the limit, if the previously mentioned limits are worked out for this case. The corresponding neutron flux is then about 100 larger, i.e. $\Phi \leq 10^{16}$ $cm^{-2}.s^{-1}$. At such a flux, the current pin design should permit a burn-up of about 100 GWatt day/t.

2) Incinerating a useful amount of actinides would be a major load on our neutron inventory and it would not permit our system to operate economically. In our case breeding and not incineration is the primary goal and determines the choice of all parameters. It relies on the $Th^{232}$—$U^{233}$ cycle while in incinerators, fissions from other Actinides must contribute in a major way to the neutron generation.

3) At a very high thermal neutron flux, continuous chemical separation on-line (with a continuous removal of the $Th^{232}$ "ashes") is needed, which is not required by our scheme where the fuel remains "in situ" for the duration of the full fuel cycle.

The Energy Amplifier can be compared in its expected performance with the long range perspectives of Nuclear Fusion. A fusion device based on Deuterium - Tritium burning will produce about four times as many neutrons at about seven times the average energy of fissions for the same amount of generated energy. In a Fusion Reactor, even if there are no fission fragments, these neutrons will interact and build up a large amount of radioactivity in the containment walls and in the nearby equipment, which will represent a radiation hazard of a magnitude comparable to the one of the fission fragments. Furthermore, while fission fragments are tightly retained inside the fuel cladding, the neutron contamination in a Fusion Power Station will be distributed over a number of large scale active components scattered over a very big volume. But in both instances, the bulk of the radioactive products is relatively short-lived (up to few hundred years) and represents a minor problem when compared with the Actinides from a thermal Reactor.

Lithium is normally used to breed Tritium. Hence, a Fusion Power Station will essentially burn Lithium and Deuterium with Tritium as an intermediary. The natural availability of Lithium on the Earth's crust is estimated to be only seven times the one of Thorium and they are both vastly adequate for millions of years of very intensive utilisation.

More specifically, we can compare our device with ion beam-driven Inertial Fusion. Both devices need a particle accelerator, but the one for Inertial Fusion is much larger, complicated and expensive. The target gain for an inertially driven fusion device, according to the most optimistic assumptions will be G=80÷100. This factor however is likely to be substantially reduced and even lost since the efficiency of the corresponding accelerator will be lower in view of its much greater complexity. Hence, the target gain for the Energy Amplifier concept here proposed is very likely to be close to the one assumed for Ion-beam Inertial Fusion when the complexity of the latter device is completely understood and duly taken into account. The gain of the fast neutron version of our invention has values (G=100÷150) which are definitely larger than what is expected from Inertial Fusion.

Finally, practical Fusion devices based on Magnetic Confinement must be very large to ensure containment and efficient burning conditions. This is probably also the case of Inertial Fusion—although for different reasons. Their minimal economical power level is correspondingly very large—within the Gigawatt range. Our device can be built of much smaller dimensions, deliver economically smaller power outputs and therefore offer a much greater flexibility in their utilisation. Finally, the technology is much less sophisticated and this makes it far more suited than Fusion machines to respond to the growing energy demands of developing countries and as an alternative to fossil fuels.

BRIEF DESCRIPTION OF THE DRAWINGS

FIG. 5b is a plot showing the fraction of neutrons captured by the fission fragments as a function of the integrated burn-up in the cases of thermal and fast neutrons.

FIG. 8a–8d are plots showing the variations of some parameters as functions of the water/Thorium volume ratio in an Energy Amplifier without a separate spallation target.

FIG. 10b and 10c are sectional views of fuel pebbles and spallation metal pebbles, respectively, used in the Amplifier of FIG. 10a.

Figure 1:
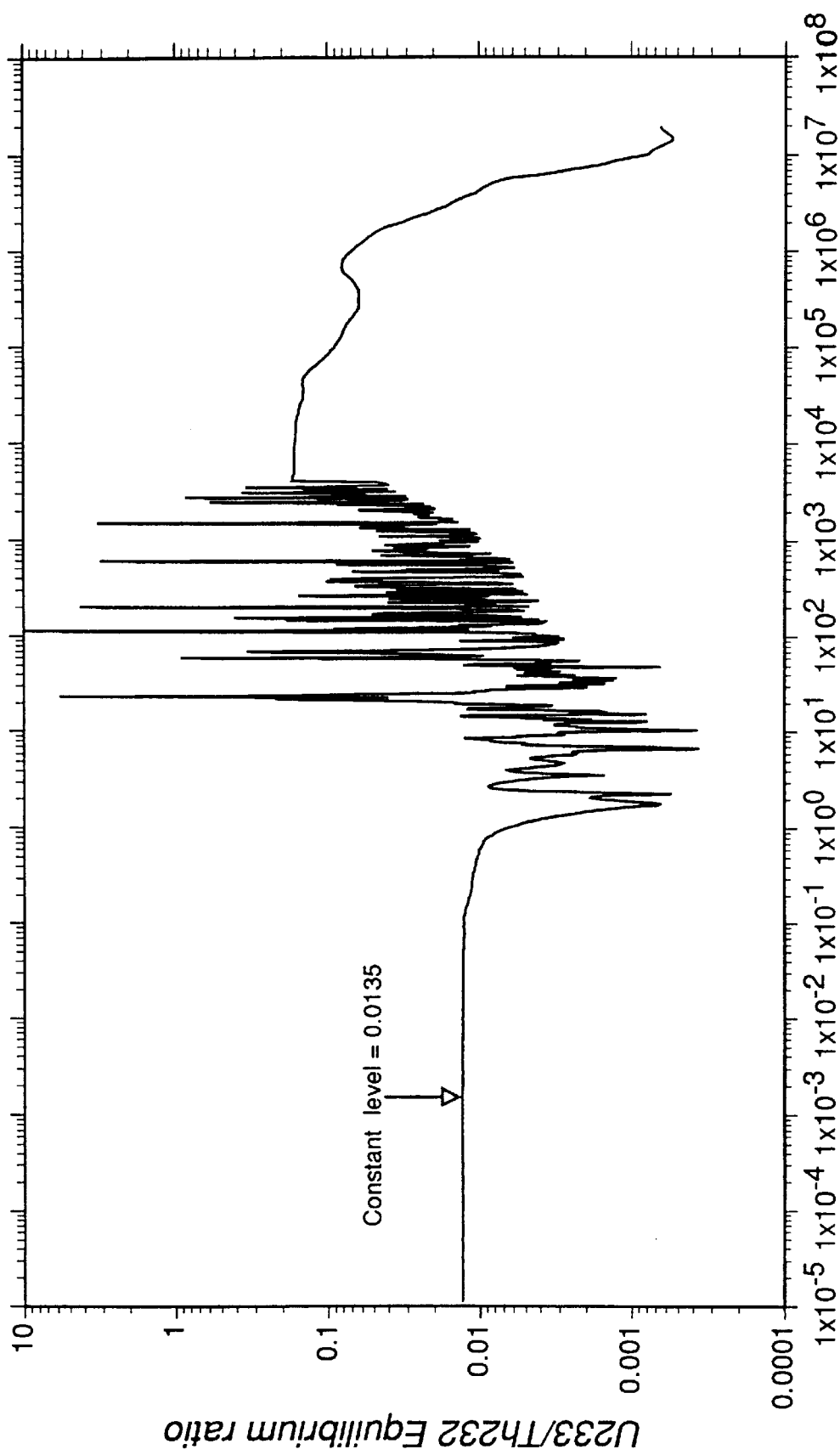
FIG. 1 is a plot showing the equilibrium concentration ratio in the case of a $Th^{232}$—$U^{233}$ mixture, as a function the energy of incident neutrons.

While the explanations of the relevant nuclear mechanisms set forth herein is based on the best presently known experimental evidence, we do not want to be bound thereby, as additional experimental data later discovered may modify some particulars.

THORIUM AS A BREEDING FUEL.

A very large fission cross section for low energy neutrons is the unique property of a few high Z nuclei such as $U^{233}$. Nuclei like $Th^{232}$ have no significant fission cross section below≈1 MeV, but they can be used to breed fissionable materials. At low energies, the (n–γ) reaction (neutron capture) is the only inelastic process, leading to a final (excited) nucleus with one more neutron. In turn, the daughter nucleus is β-unstable and leads through a cascade of decays to a final, higher Z-nucleus. Hence the neutron capture reaction offers the possibility of "breeding" fissionable fuels from initial materials which are not, namely:

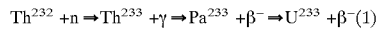

$$Th^{232} + n \rightarrow Th^{233} + \gamma \rightarrow Pa^{233} + \beta^- \rightarrow U^{233} + \beta^- \quad (1)$$

Let us define first the relevant cross sections for the mixture of elements in the fuel bars. The ratio of n-capture reaction $\sigma_i$ to fission reaction $\sigma_f$, averaged over the neutron spectrum and the material composition is normally denoted with α and the neutron multiplicity with ν. Hence the fraction of fission and capture reactions are $1/(1+\alpha)$ and $\alpha/(1+\alpha)$ respectively. The quantity $\eta = \nu/(1+\alpha)$ is the number of secondary neutrons resulting from one neutron interacting.

Assume a thin slab of fertile material ($Th^{232}$) is exposed to an intense neutron flux Φ. Indicating with $(X_1)$, $(X_2)$ and $(X_3)$ the successive nuclei $Th^{232}$, $Pa^{233}$ and $U^{233}$ in the chain (1), (the γ-transition of $Th^{233}$ to its ground state and the subsequent β-transition to $Pa^{233}$ are neglected) the basic differential equations are:

$$\frac{dn_1}{dt} = -\lambda_1 n_1(t)$$

$$\frac{dn_2}{dt} = \lambda_1 n_1(t) - \lambda_2 n_2(t)$$

$$\frac{dn_3}{dt} = \lambda_2 n_2(t) - \lambda_3 n_3(t)$$

$$\frac{dn_4}{dt} = \lambda_3 n_3(t)$$

where $n_k(t)$ designates the concentration of element $X_k$ in the fuel material (k=1,2,3) at time t, and $n_4(t)$ is the concentration of the fission products of $X_3$.

In our case $\lambda_1 = \sigma_i^{(1)}\Phi$, $\lambda_2 = 1/\tau_2$, $\lambda_3 = [\sigma_i^{(3)} + \sigma_f^{(3)}]\Phi$, where the upper subscript (k) stands for element $X_k$, and $\tau_2$ designates the half-life of element $X_2$ under β-decay. Initially, $n_2(0) = n_3(0) = 0$. Captures by $Pa^{233}$ are neglected for simplicity at this stage and will be considered later on. Solving the differential equations and in the approximation that $\lambda_1 \ll \lambda_2$ and $\lambda_1 \ll \lambda_3$, we find:

$$n_1(t) = n_1(0)e^{-\lambda_1 t}$$

$$n_2(t) = n_1(t)\frac{\lambda_1}{\lambda_2}(1 - e^{-\lambda_2 t})$$

$$n_3(t) = n_1(t)\frac{\lambda_1}{\lambda_3}\left[1 - \frac{1}{\lambda_3 - \lambda_2}(\lambda_3 e^{-\lambda_2 t} - \lambda_2 e^{-\lambda_3 t})\right]$$

In stationary conditions, $n_3/n_1 = \sigma_i^{(1)}/[\sigma_i^{(3)} + \sigma_f^{(3)}]$, independently of the neutron flux. Evidently it will not be possible to irradiate the fuel uniformly; notwithstanding, the fertile-fissile mixture remains stable during regime conditions, independently of the local intensity of the neutron flux. In FIG. 1 we plot $n_3/n_1$ in the case of a $Th^{232}$ and $U^{233}$ mixture as function of the neutron energy over the wide interval $10^{-5}$ eV till 20 MeV. Below 1 eV, we find a constant value, $n_3/n_1 = 1.35 \times 10^{-2}$. Above such energy, the ratio is rapidly oscillating in the resonance region and it settles to much larger values in the vicinity of $n_3/n_1 \approx 0.1$ for energies corresponding to the neutron spectrum from fission. Operation without moderator and with a neutron spectrum directly from fissions will give an equilibrium concentration of fissile material which is about seven times larger than the one for the thermalized neutron alternative.

However, as we shall see, fast neutrons allow much higher burn-up rates and hence the total of fuel can be correspondingly reduced: for the same output power, the stockpile of $U^{233}$ is in general comparable for both schemes.

The fact that after a turn-on period and in stable conditions, the fissionable content has a substantially constant concentration is important and must be underlined. Stability can be verified qualitatively looking at the effect of small variations of $n_3/n_1$: a small increase (decrease) of $n_3/n_1$ will be corrected by an increased burning and a reduced breeding which in turn will decrease $n_3/n_1$ (or vice versa). But instantaneous variations of beam intensity, while immediately reflected in the burning rate of the fissile material, produce new fuel only after a time of the order of $\tau_2$. For instance, an increase of neutron irradiation will produce an immediate reduction of $n_3/n_1$ followed by an increase of $n_3/n_1$ only after $\tau_2$. This is the classic problem of the delay in a feed-back loop.

Let us now look at the intermediary element, i.e. the β-precursor $Pa^{233}$. In stationary conditions, $n_2/n_1 = \sigma_t^{(1)}\Phi\tau_2$, which implies a density of $(X_2)$ directly proportional to the neutron flux. Therefore variations in flux cause variations in $n_2/n_1$, which in turn imply a new transition period toward the new equilibrium condition. Then $n_3/n_1$ will no longer be independent of $\Phi$ since instantaneous variations of beam intensity, while immediately reflected in the burning rate of the fissile material, produce new fuel only after a time of the order of $\tau_2$. For instance, if the neutron flux is suddenly cut off, the $(X_2)$ nuclei will decay with a rate $\lambda_2 = 1/\tau_2$ into $(X_3)$, leading to a final population of $(X_3)$ equal to $n_2 + n_3$. Such an increase in fissionable material must not make the system critical, although the time lag is related to $\tau_2$ and long (many days) and simple corrective measures can be easily taken. Therefore, the relative ratio $n_2/n_3 = (\sigma^{(3)}\Phi\tau_2)$ where $\sigma^{(3)} = \sigma_i^{(3)} + \sigma_f^{(3)}$ must remain small, setting a limit for the neutron flux $\Phi$.

For a less radical flux change of a step function of amplitude $\Delta\Phi$, the variations of $n_3/n_1$ are correspondingly smaller:

$$n_3(t) = n_1(t)\frac{\sigma_j(1)}{\sigma^{(3)}}\left[1 + (\sigma^{(3)}\Delta\Phi)\frac{1}{\lambda_2 - \lambda_3}(e^{-\lambda_3 t} - e^{-\lambda_2 t})\right]$$

where t is computed from the flux change and $\lambda_3 = \sigma^{(3)}\Phi$ is relative to the new flux conditions. Evidently, more complex changes can be analysed using the above formula as a sum of step functions.

There is a second equally relevant condition which limits the neutron flux. Indeed, in order to achieve a large breeding, most of the $Pa^{233}$ must survive neutron capture and rather decay into $U^{233}$, which is translated into the condition $\sigma_t^{(2)}\Phi\tau_2 << 1$. Inelastic cross sections for energies E up to few eV's (below the resonance region) can be parametrized as $\sigma(E) = (0.025 \text{ eV}/E)^{1/2}\Sigma$, with the parameter $\Sigma$ listed for the relevant elements in Table 1.

neutron energy, i.e. the temperature of the moderator medium when complete thermalization has taken place. Practical operating conditions will normally not exceed such a limit for $\Phi$. For practical temperatures, the limit for the neutron flux will be: $\Phi \leq 3\times10^{14}\text{cm}^{-2}\text{s}^{-1}$. Condition $\sigma_t^{(2)}\Phi\tau_2 << 1$ is translated into a temperature-dependent thermal neutron flux, $\Phi << 1.05\times10^{16}[T/(300° K.)]^{1/2}\text{cm}^{-2}\text{ s}^{-1}$ which leads to only a few percent of loss of breeding for the previous limit.

In the case of fast neutrons, cross sections must be integrated over the spectrum and are somewhat dependent on the choice of the chemical composition of the fuel (pure metal vs. oxide) and on the coolant. Let us consider first the already discussed consequence of the relatively long mean life of $Pa^{233}$, i.e. the significant reactivity addition which occurs during an extended shut-down, following the characteristic decay lifetime of $Pa^{233}$, the concentration of $U^{233}$ will increase by an amount asymptotically equal to the concentration of $Pa^{233}$, essentially independent of the mode of operation of the device for a given equilibrium burn-up rate. However, since now the equilibrium concentration of $U^{233}$ is about seven times larger, its effect on reactivity will be only 1/7 of the one of the thermal neutrons. Even for a burn-up rate three times larger, the corresponding limit will still be 3/7 of the one given for thermal neutrons.

Next, we consider the (fast) neutron capture by the intermediate elements of the breeding process and specifically by the $Pa^{233}$, which destroys a nascent $U^{233}$ atom at the price of an extra neutron. The cross section $\sigma_a(Pa^{233})$ is about 43 b (b; $1b = 10^{-24}$ cm$^2$) at thermal energies and 1.0 b for fast neutrons ($E \approx 10^5$ eV). Therefore, for fast neutrons, the cross section is much smaller but the flux is correspondingly larger: for a given burn-up rate, the loss is 0.67 times of the value for thermal neutrons. Note, however, that the allowance for neutron losses is much greater for the fast neutrons which have a larger $\eta\epsilon$, and therefore larger burn-up rates are practical; at three times the burn-up rate the loss is twice the one set for thermal neutrons, which is quite acceptable.

Figure 2:
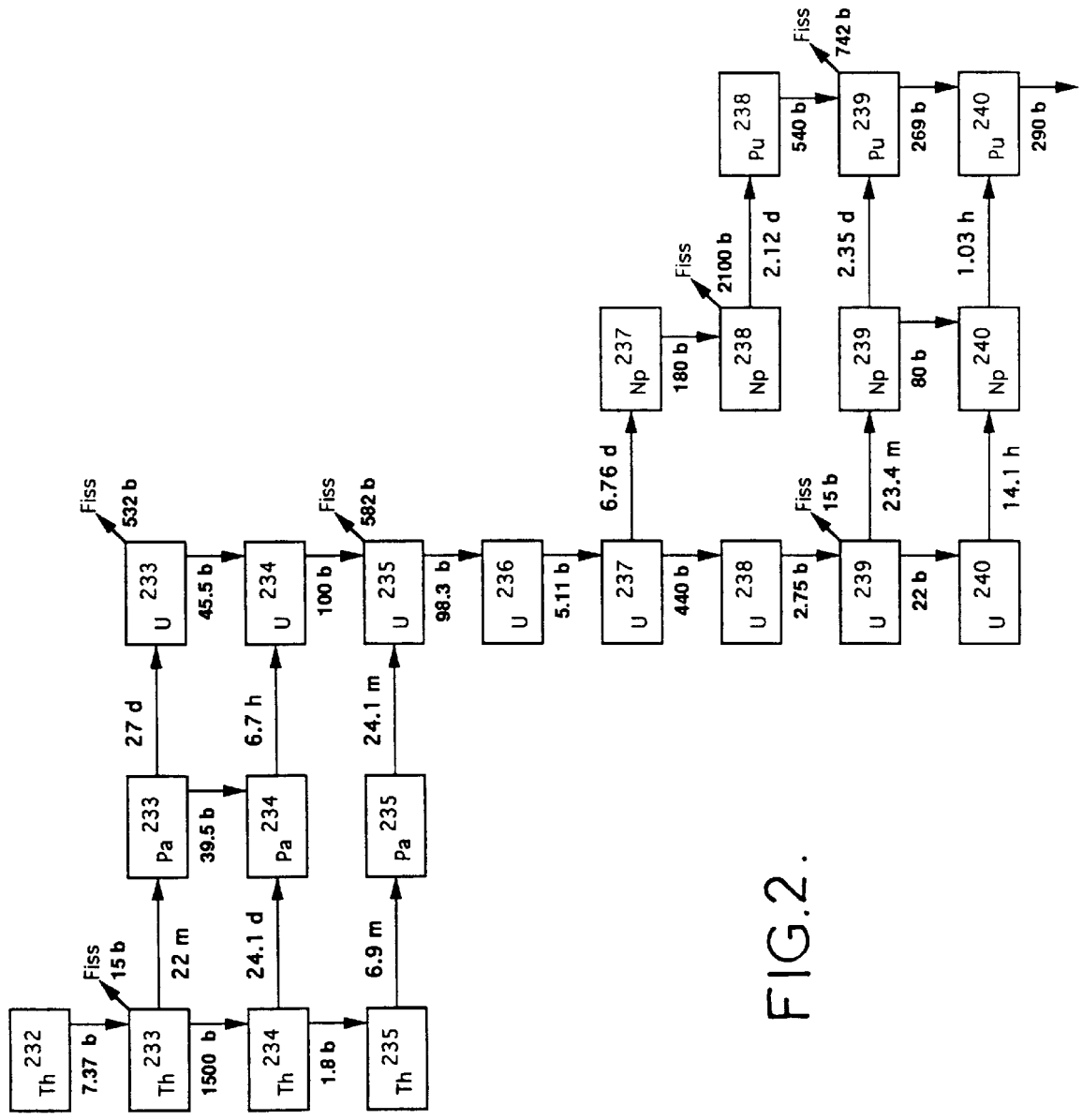
FIG. 2 is a diagram displaying various nuclear reactions which can occur starting from $Th^{232}$.

Many more reactions occur because of the intense neutron flux and of natural decays. The chain of possible reactions starting from the initial $Th^{232}$ fuel is displayed in FIG. 2, where vertical arrows denote neutron captures with the associated cross sections in barns, (b; $1b = 10^{-24}$ cm$^2$),

TABLE 1

Parameters of some nuclei below a few eV's: [$\sigma(E) = (0.025 \text{ eV}/E)^{1/2}\Sigma$]

| Element | Elastic, $\Sigma$ barn | Capture, $\Sigma$ barn | Fission, $\Sigma$ barn | n-multip. $\nu$ | sec/prim $\eta$ | $\sigma(\gamma)/\sigma(f)$ $\alpha$ |
|---|---|---|---|---|---|---|
| $Th^{232}$ | 13.0 | 7.48 | $<2 \times 10^{-4}$ | | | |
| $Pa^{233}$ | 13.1 | 40.6 | — | | | |
| $U^{233}$ | 12.7 | 46.2 | 534 | 2.52 ± 0.03 | 2.28 ± 0.02 | 0.105 ± 0.007 |
| $U^{235}$ | 10 ± 2 | 112 ± 110 | 582 ± 10 | 2.47 ± 0.03 | 2.07 ± 0.02 | 0.192 ± 0.007 |
| $U^{238}$ | 8.3 ± 0.2 | 2.75 ± 0.04 | $<5 \times 10^{-4}$ | | | |
| $Pu^{239}$ | 9.67 ± 0.5 | 285 ± 13 | 740 ± 9 | 2.91 ± 0.04 | 2.09 ± 0.02 | 0.39 ± 0.03 |
| $Bi^{209}$ | 9.37 | 0.034 | — | | | |
| Natural Pb | 13.0 | 0.17 | — | | | |

Using Table 1 and $n_2/n_3 \leq 0.2$ we find $\Phi \leq 1.44\times10^{14}$ [$T/(300° K.)$]$^{1/2}$ cm$^{-2}$ s$^{-1}$ for $Pa^{233} \rightarrow U^{233}$ and the ermal or epithermal neutrons, corresponding to large power yields, namely of the order of 70 MW for each ton of fuel mass of $Th^{232}$ and reasonable temperatures. The quantity T stands for the temperature, in Kelvins, corresponding to the average oblique arrows denote n-fissions with the associated cross sections in barns, and horizontal arrows denote β-decays with the associated half-lives in minutes (m), hours (h) or days (d). Cross sections are for thermal neutrons in barns.

Figure 3A:
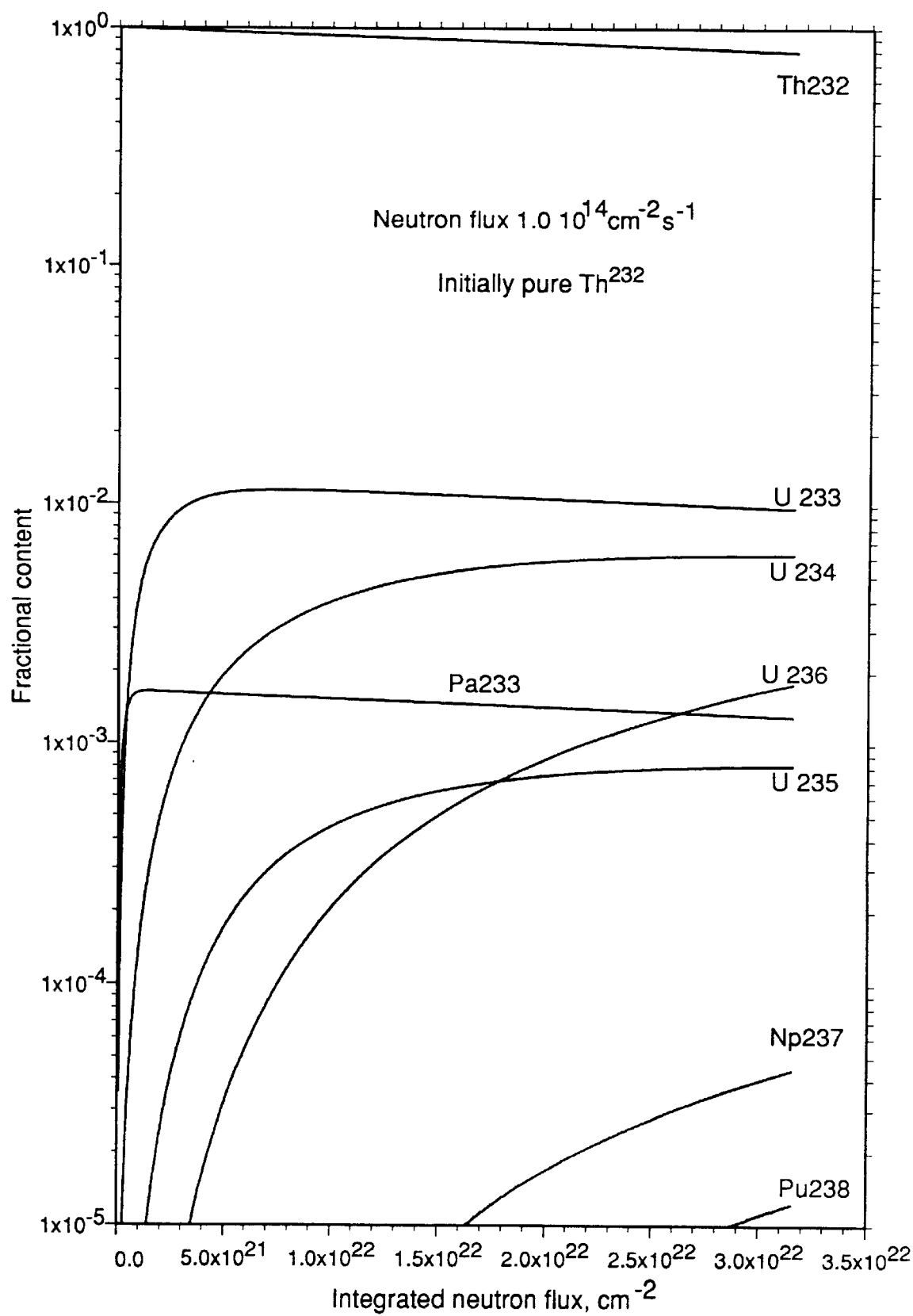
FIG. 3a is a plot showing the time evolution of the composition of an initial thin Thorium slab exposed to a constant thermal neutron flux of $10^{14}$ $cm^{-2}.s^{-1}$.

The situation is sufficiently complex to justify a computer simulation. Results are shown in FIG. 3a, in which it is displayed the time evolution of the composition of an initial, thin Thorium slab exposed to a constant (thermal) neutron flux of $1.0 \times 10^{14}$ cm$^{-2}$ s$^{-1}$. One can see the β-precursor Pa$^{233}$, the mixture of Uranium isotopes and a tiny fraction of higher actinides Np$^{237}$ and Pu$^{238}$.

Figure 4:
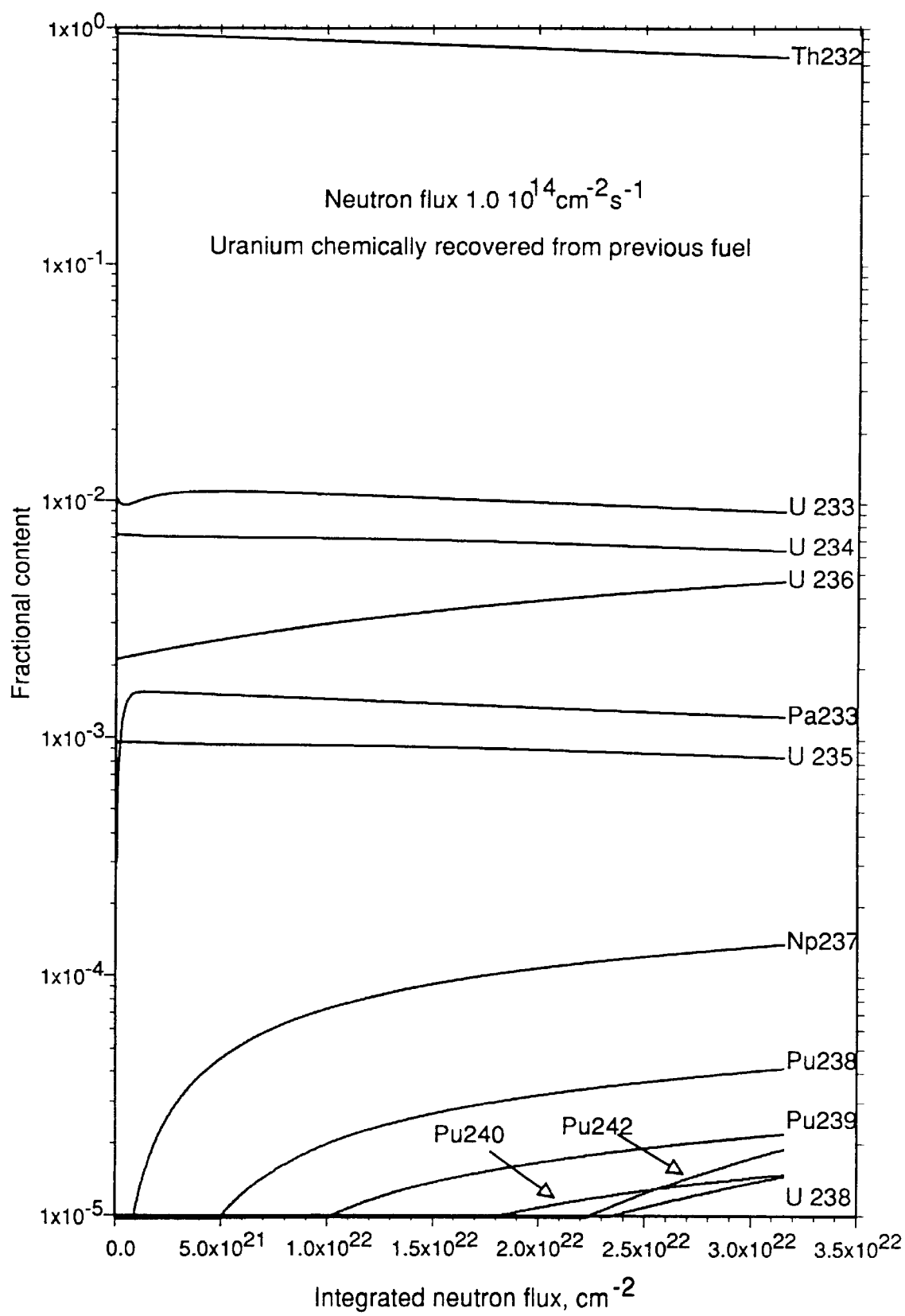
FIG. 4 is a plot similar to FIG. 3a in the case of a Thorium slab initially doped with Uranium "seeds".

The last two elements are the only true "ashes" of the combustion, since the Uranium isotopes are the "seeds" for further utilisation. The graph full scale in the abscissa corresponds to about 10 years of continuous exposure. After a first initial phase of "breeding" in which U$^{233}$ accumulates to the equilibrium ratio, a steady situation sets in where fission and breeding are both working (burning phase). Additional elements are formed, which are in general burnt by the neutrons and therefore reach an equilibrium concentration. A significant concentration of U$^{234}$ develops, which has a significant probability to be transformed into highly fissile U$^{235}$. Captures by U$^{233}$ which do not lead to fissions at once ($\approx 10\%$) are still used to produce energy since they are "bred" into fertile U$^{235}$ via U$^{234}$. This secondary breeding process which resembles reaction {1}—except that it is totally driven by neutron captures—has an additional contribution onto the neutron inventory, since to transform U$^{234}$ into U$^{235}$ one neutron is required, while U$^{235}$ fission gives about 2.5 new neutrons. This isotope can in turn miss fission and instead capture another neutron, leading to U$^{236}$ The next element to be formed is U$^{23}$, which has a short lifetime (6.75 days) and decays into Np$^{237}$ which is long-lived. Another neutron capture and the Np$^{237}$ is incinerated into Pu$^{238}$, which has the moderate lifetime of 87.7 years for α-decay into U$^{234}$. If left for a long time inside the fuel, Pu$^{238}$ will capture another neutron with a large cross section, thus giving rise to readily fissile Pu$^{239}$ At neutron fluxes of the order of $10^{14}$ cm$^{-2}$ s$^{-1}$, these many additional steps have an increasingly smaller probability to occur and "ashes" remain primarily Uranium isotopes. As has already been pointed out, they have the important function of ensuring that a simple chemical separation cannot yield a significant amount of fuel for military applications. The accumulation of Actinides other than the Uranium "seeds" constitutes no problem even after several seed recoveries and utilisation as shown in FIG. 4, which is the same as FIG. 3a except that now the terminal Uranium "seeds" are re-injected in the new Thorium fuel. In general, we expect that they are separated from the Uranium at each re-utilisation cycle and stored or incinerated.

The amount of delivered power depends linearly on the neutron flux, which is not uniform inside the active volume. It is therefore useful to speak of an "average, neutron exposure $\sigma_{ave}$. The total thermal power produced by fissions in a mass M of fuel at breeding equilibrium and neutron temperature T is given by:

$$P = 55.3 \left( \frac{M}{1 \text{Ton}} \right) \left( \frac{\phi_{ave}}{10^{14} \text{cm}^{-2} s^{-1}} \right) \left( \frac{300 \text{K}}{T(^\circ \text{K.})} \right)^{1/2} M \text{watt}$$

As an example, setting M=4.92 tons, $\sigma_{ave}$=1.50×10$^{14}$ cm$^{-2}$ s$^{-1}$ and T=400° C., we find 267 MW. If these steady conditions are maintained uninterrupted for two years, the integrated neutron flux in the fuel will be 9.46×10$^{21}$ cm$^{-2}$, which gives a conservative figure for the allowed integrated flux. During this period about 4.6% of the Thorium fuel will be burnt, corresponding to a mass of about 220 kg. One ton of fuel corresponds to 2.8 million metric tons of Coal. All along stationary conditions the amount of fissile U$^{233}$ is of the order of 67 kg, which means that the fissile fuel is fully bred slightly slower than twice per year.

Figure 3B:
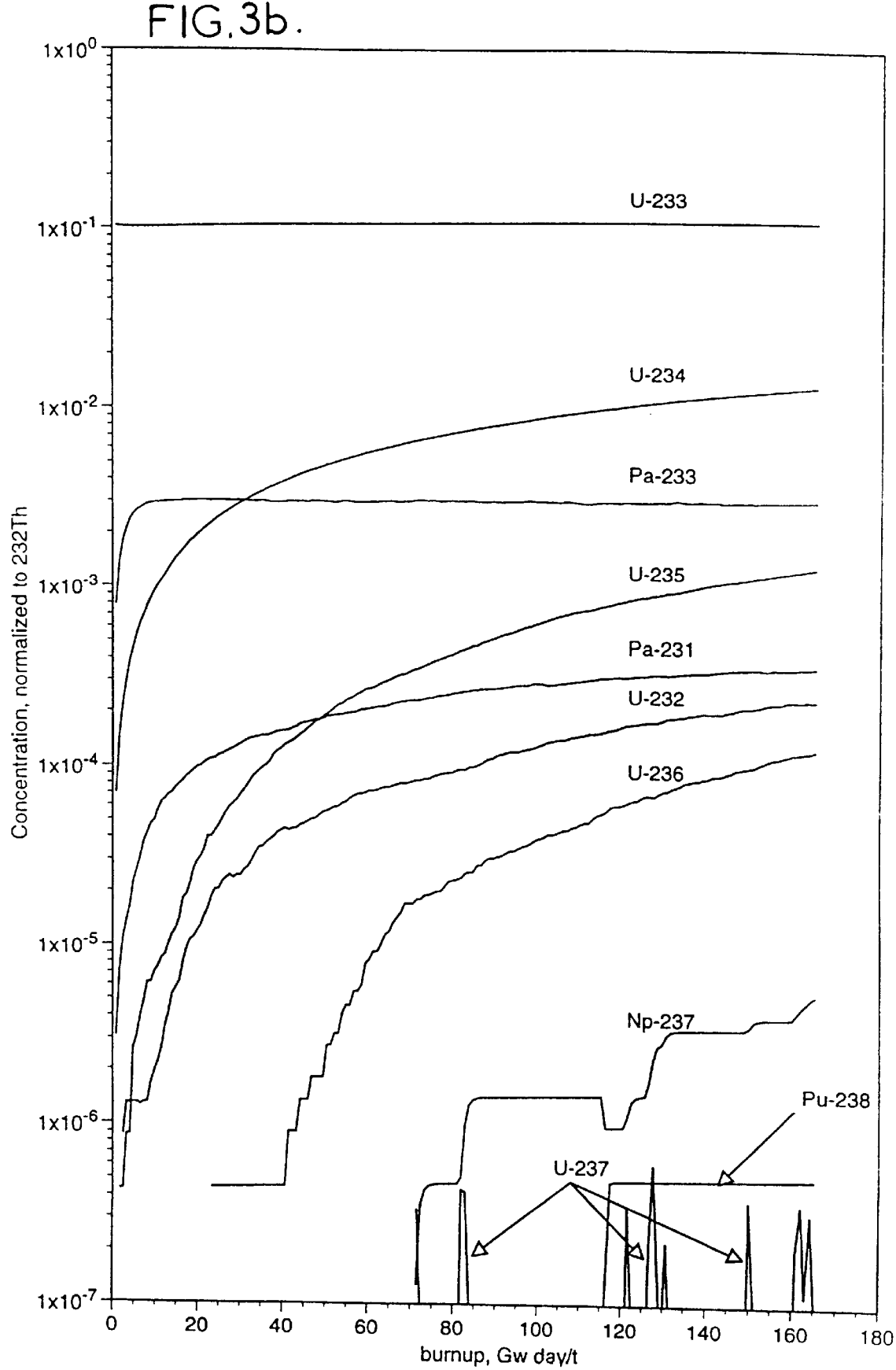
FIG. 3b is a plot showing the evoution of the composition of a Thorium slab in the presence of a fast neutron flux as a function of the integrated burn-up rate.

In the case of fast neutrons, the burn-up rate is about three times the one above. Because of the higher energies, additional neutrons are produced at each generation by different processes, like for instance fast fission in the fertile material Th$^{232}$ and (n,2n) reactions in the fuel and the moderator. It should be noted that, in the fast neutron regime, most even-even nuclei like U$^{232}{}_1$ U$^{234}$, U$^{236}$ and so on exhibit a significant fission cross section. Therefore, most of these elements become useful fuels. Concentrations of the Actinides are very different from the ones at thermal energies (FIG. 3b). While new elements become important because of the enhanced (n,2n) channels, like for instance Pa$^{231}$ and U$^{232}$2, the production of higher mass actinides is very strongly suppressed. Even the production of the lower Neptunium and Plutonium isotopes, like Np$^{237}$ and Pu$^{238}$ is now virtually suppressed (levels of less than 1 gr/ton after 100 GWatt (t) day/ton). A fortiori, this applies to higher Plutonium, Americium, Curium, Californium isotopes etc. which are the main source of long lived toxicity of ordinary Nuclear Reactors.

The fast neutron option promises also an important reduction in the toxicity of Actinides when compared to the already remarkable performance of the previous examples, provided that two problems are mastered, namely the one associated to the presence of U$^{232}$ and the one of Pa$^{231}$. The presence of a relatively large amount of U$^{232}$, which is about 50 times more abundant than for thermal neutrons for comparable burn-up, could indeed be considered as an advantage since it positively "denaturates" the Uranium making very hard, albeit impossible, any military diversion of the material. As already pointed out, the added toxicity due to the presence of U$^{232}$ is not so large as to make the processing of the spent fuel impossibly expensive.

The Pa$^{231}$ (which is produced at the rate of 200 gr/ton of Thorium fuel after 40 GWatt day/tcn of burn-up, roughly proportional to the integrated burn-up) instead represents a source of additional long-lived ($\tau$=3.2 $10^4$ years) radio-toxicity which must be mastered. It is possible to separate chemically the Pa$^{231}$ from the spent fuel. Methods can be envisaged in order to eliminate it. One could introduce such an element inside a strong thermal flux and transform it in U$^{232}$ by neutron capture and subsequent β-decay. The Pa$^{231}$ thermal neutron capture cross section is very large and dominated by a large resonance of 600 b at E$_n$=0.3 eV, which means that, at a neutron flux of 2×10$^{14}$ cm$^{-2}$ s$^{-1}$, the 1/e folding time for destruction is 96 days. An appropriate device based on thermal neutrons is therefore conceivable. Alternatively, if Pa$^{231}$ is simply re-injected with the next fuel load, its concentration will eventually saturate at a constant value after long burn-up, as a result of competing production and incineration.

The burn-up of an ordinary reactor varies from the 7 GWatt(t) day/t of a natural Uranium fuel of CANDU reactors, to the 30÷50 GWatt(t) day/t of enriched Uranium in PWR's. In the present invention, the fuel is in principle continuously renewed by the breeding. Hence, in principle, the ultimate burn-up is determined not by the fuel exhaustion, but rather by (1) fission fragment poisoning; (2) radiation damage of the supporting structures; and (3), pressure build-up of gaseous fission fragments.

In the case of the Energy Amplifier, as we show later on (see next paragraph), fission poisoning in the case of thermal neutrons limits the practical use of a fuel to about 50 GWatt(t) day/t. Fast neutrons permit in principle a much longer burn-up, since fission fragment poisoning is no longer of main concern. Hence, the fuel utilisation is determined by the limitations (2) and (3). A reasonable goal would then be 100÷150 GWatt day/t, corresponding to some 10÷15% of the Thorium in the fuel bred and burnt. However, the neutron flux is about 33 times larger for the same burnup, since the macroscopic cross section for $U^{233}$ fission is correspondingly smaller. Radiation damage becomes one of the important problems, and it may represent a major limitation for extending the burn-up beyond the indicated limit. The vast experience accumulated in the development of the Fast Breeders indicates that the burn-up goals are realistic.

Figure 5A:
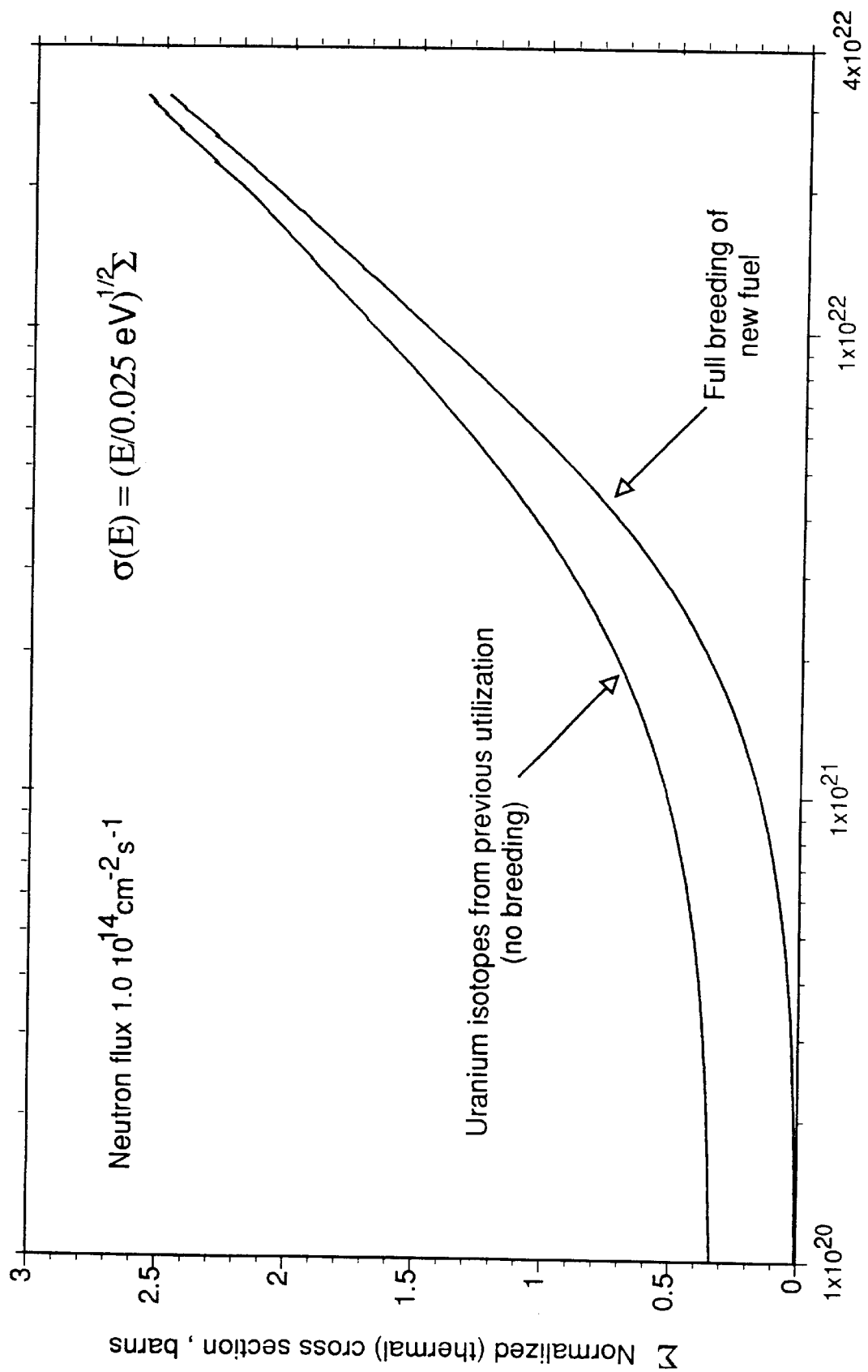
FIG. 5a is a plot showing the normalised thermal cross section due to fission fragment accumulation from $U^{233}$ fissions in the cases of FIG. 3a and 4 as a function of the integrated neutron flux.

1.—Fission fragments. The combustion of an appreciable quantity of fuel will produce fission fragments which in turn have a significant effective capture cross section for thermal neutrons. This is an important question of this scheme, since it is intimately tied to the problem of how long the reaction can continue without reprocessing. As has already been pointed out, when compared to a nuclear Reactor, in the Energy Amplifier these effects are less relevant since now one does not have to maintain criticality. An estimate of the effects due to the fission fragments is a major task, since there are very many nuclei and complicated decay chains. It is only possible to give results with numerical calculations based on available cross sections and thermal neutron captures. Epi-thermal neutrons are expected to contribute only slightly, since resonances in medium Z nuclei are generally well above these energies. It is therefore believed that these calculations can provide a reasonably accurate assessment of the situation. There are three main effects which must be considered:

1) Fission fragments may capture some of the neutrons, thus affecting the neutron inventory and consequently the energy amplification of the block. There is a complicated interplay between neutron captures and decays which both lead to transformations of the hundreds of compounds resulting from the fission. Hence the evolution is dependent on the neutron flux and more generally on the past history of the fuel. This is a well known effect in Nuclear Reactors. It should also be noted that fission fragment poisoning is less important in the case of Thorium in breeding equilibrium than for instance in Natural Uranium since the fuel cross section is 2.17 times larger and therefore the number of captures for a given fission fragment concentration correspondingly smaller. Computational results using known cross sections are shown in FIG. 5a for reasonable neutron fluxes and with the effective total cross section parametrized in the form already used in Table 1, namely $[\sigma(E)=(0.025 \text{ eV}/E)^{1/2}\Sigma]$. In FIG. 5a we display normalised, thermal cross section due to fission fragment accumulations from $U^{233}$ fissions, as a function of the integrated flux and for a constant neutron flux of $1.0\times10^{14}$ cm$^{-2}$ s$^{-1}$. Two curves correspond to the conditions of FIG. 3a and FIG. 4 respectively. Known cross sections and decay rates for 1170 different nuclear fragments have been added, taking into account the time evolution. Resonances for the medium Z nuclei from fission fragments occur generally at higher energies than in actinides and have a smaller contribution on the rate. The dependence of the effect of fission poisoning is rising less rapidly than linearly with the integrated irradiation $\int\Phi$ dt since there are both saturating (like for instance the well known $Xe^{135}$ and $Sm^{149}$) and non-saturating fission fragments.

Neutron losses due to the high thermal cross section fission product $Xe^{135}$ are well known. The Xenon poison fraction is neutron flux-dependent, since it relates, like in the case of $Pa^{233}$, to an equilibrium between captures and decays. For thermal neutrons and at the breeding equilibrium, the fraction of neutrons captured by $Xe^{135}$ is given by the expression $0.9\times10^{-19}\phi/(2.1\times10^{-5}+3.5\times10^{-18}\phi)$ which tends to an asymptotic value 0.028 for fluxes $\phi\geq1.0\times10^{14}$ cm$^{-2}$ s$^{-1}$. Following a reactor shutdown or reduction in power, the Xenon poisoning temporarily increases even further because decays producing Xe continue to occur, passing through a maximum 10 to 12 hours after the shutdown. The magnitude of this transient additional poisoning is also dependent on the neutron flux. Although the temporary loss is not significant, a necessary reactivity reserve, even if normally compensated by control devices, would represent a permanent loss of neutrons.

The same computer calculations have been used also to analyse the poisoning as a function of the integrated burn-up for conditions relevant to the fast neutron case. The most relevant conclusion is that losses due to fission fragment poisoning are much less important (FIG. 5b). Hence, much longer burn-ups are possible without reprocessing of the fuel. For instance, at a given burn-up of 40 GWatt day/t, the fraction of captures is about 18% for thermal neutrons and only 1.4% for fast neutrons. In the latter case, the Xenon type poisoning effect is essentially absent, since there is no fission fragment nucleus which has the required features in the energy domain of importance. These features translate into two distinctive advantages for the fast neutron option, namely (1) at a higher burn-up and (2) a higher allowed value of k, since its variations due to captures by fission fragments are now (1) time-independent and (2) far smaller.

2) Fission fragments are generally radioactive and produce additional heat, even if the proton beam is switched off, since they contribute with about 14 MeV to the total energy emitted by fission which is (204±7) MeV. Immediately after turn-off of the proton beam, the power produced by this residual activity is 14/204=0.0686 of the steady condition. Activity decays slowly with time, approximately as t–0.20, where t is in seconds, leading to a reduction of a factor 10 in about one day. Continued cooling must of course ensure that no melt-down occurs. In this respect, the Energy Amplifier does not differ substantially from a Reactor.

However, the possibility exists, at least in the case of Lead as a coolant, to extract the fission fragments heat in such a way as to totally eliminate the risk of an accidental melt-down in the eventuality of a massive failure of the cooling system.

We have taken the point of view that if one would "sacrifice" a few percent of the thermal energy produced by the Energy Amplifier, dissipating it in a spontaneous way by natural convection, by such an amount that it exceeds the radioactivity heat, an accidental melt-down becomes virtually impossible.

It is well known that a "swiming-pool" reactor is safe from melt-down risks. This is not only due to the fact that the power produced is modest. It is primarily so because the heat produced by beta decay heating is extracted from the core by natural convection. We have therefore explored the possibility of using the natural convection in the large pool of liquid lead to extract the corresponding, but much larger radioactive decay heat from the Energy Amplifier. A second cooling loop, also passive, should then transfer such a heat to the environment. Either water or even better air should be used for this secondary transfer.

Here, we concentrate our attention to the primary heat extraction from the core to the pool of liquid lead. Incidentally, the radioactivity decay heat will automatically ensure that the Lead remains liquid. We assume a core structure made by a large amount of thin channels between the pins each with an equivalent diameter D and total cross sectional area $A_f$. The flow of the coolant between the parallel pins is approximately laminar, because of the close spacing of the pins and the small convective driving force. This is in contrast with the forced heat extraction during the operation of the Energy Amplifier, where the coolant flow is definitely turbulent. The reason of insisting on a laminar flow is not fundamental, but is ensures the most efficient transfer with the minimal pressure drop across the core.

The ability to carry a thermal power $q_{tot}$ out from the core by convection only can be estimated easily with the help of the Poiseuille equation. The required temperature difference $\Delta t$ between the top and the bottom of the core to ensure the heat transfer is given by $$\Delta t = \sqrt{\frac{96\mu_{ave}}{\beta \rho_{ave}^2 A_f g D^2 c_p} q_{tot}}$$

where $\mu_{ave}$, $\rho_{ave}$ and $c_p$ are respectively the average viscocity, density and specific heat of the cooling fluid, g is the acceleration of gravity and $\beta$ is the thermal coefficient for volume expansion. The use of liquid Lead is particularly favourable since it has a large coefficient of thermal expansion, a large density and a small viscosity and it allows large temperature differences.

In order to estimate the potentialities of the method, we concentrate on a large installation with a nominal power of 2.4 GWatt(t). Clearly, a smaller power unit would represent a simpler problem. Immediately after switch-off, the thermal power due to delayed radioactivity is of the order of several percent of the nominal power and it falls rapidly with time. Assume then that a maximum of $q_{tot}=2.4 \times 10^9 \times 0.05=1.2 \times 10^8$ watt must be safely dissipated. The equivalent diameter of the spaces between pins is taken to be D=0.3 cm and the total cross sectional area of the cooling channels, i.e. the flow area, $A_f=2.0$ m$^2$. The temperature difference is then $\Delta t=244°$ C.; which is quite acceptable in view of the exceptionality of the event. The speed by which the liquid is flowing through the core is given by:

$$v = \frac{q_{tot}}{\rho c_p A_f \Delta t}$$

which gives v=0.168 m/s for the values chosen. At such a speed, the Reynolds number Re=3.13×10$^3$ and the Poiseuille equation can be still considered as approximately correct. Note that although the approximations of the calculations based on laminar flow are significant, the diameter of the flow channel and the fractional total flow area enter critically in the formula and considerable benefit can be achieved by relaxing on these parameters. If the flow were to switch to turbulent, the temperature difference would be much larger by a factor 2–3 and a more generous cooling geometry required. We shall leave this choice to the detailed design of a specific device.

The conclusion is that natural convection can be used to extract the residual heat even from a large Energy Amplifier core in the domain of 1 GWatt(e).

Figure 6:
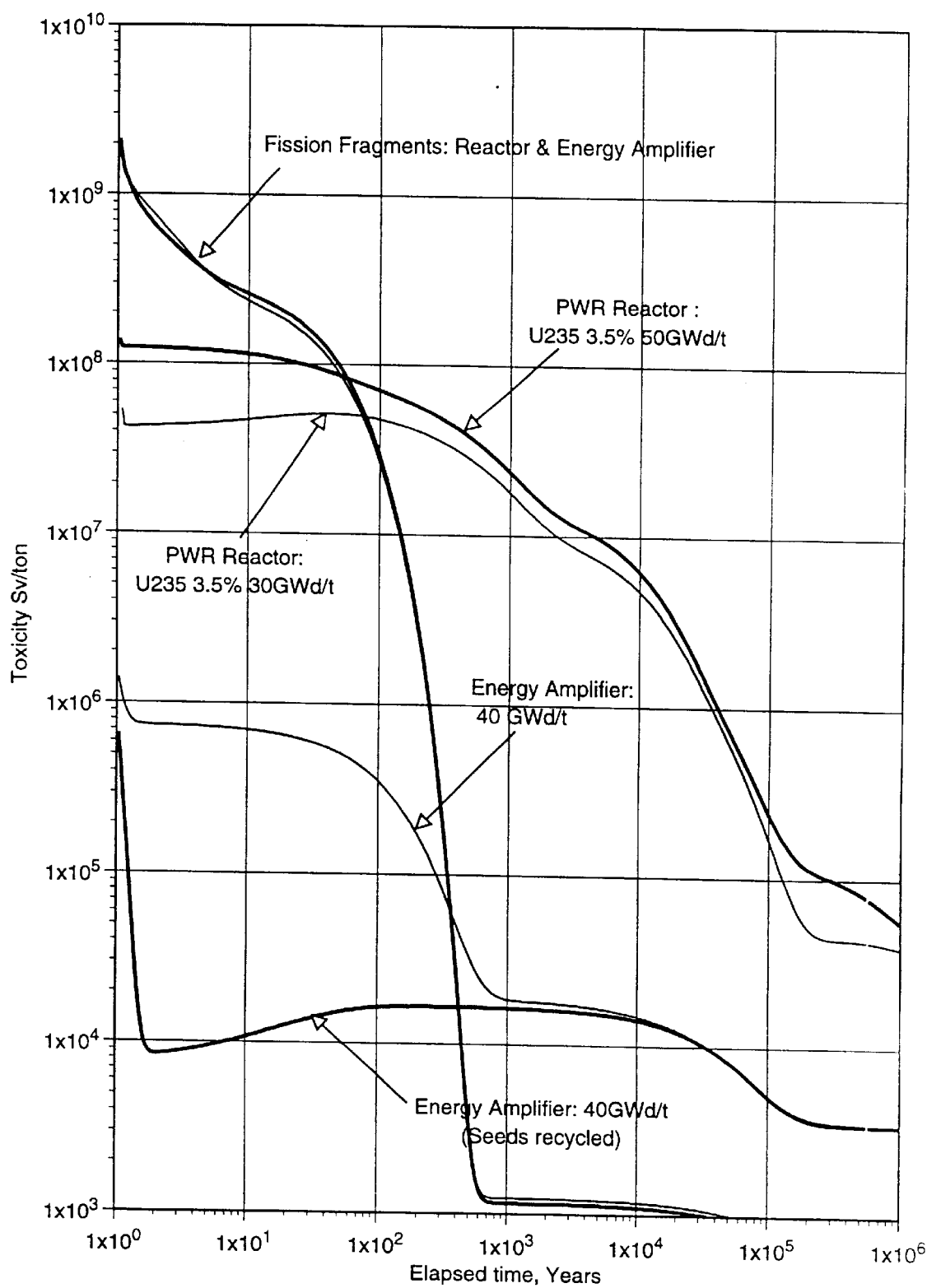
FIG. 6 is a plot showing the expected toxicities of fission products and Actinides in the Energy Amplifier, compared to those in conventional pressurized water reactors.

3) Long lasting radioactivity is a significant problem, although much less relevant than in the case of Actinides. The time evolution of the fragments after shutdown and separation is shown in FIG. 6, where the expected toxicities for Fission fragments and for Actinides, for an equivalent energy delivery, are plotted as a function of time. In the case of Actinides we have included all relevant elements (except the permanent Uranium seeds) at their "incineration" saturation level. If normalised to Uranium ores for an equivalent energy delivery, their relative toxicity will decrease inversely proportionally to the number of recycles. One can see that after about 300 years the toxicity content is inferior to the one of natural uranium ores for an equivalent energy supply and becomes totally negligible a few hundred years later.

In practice, in order to maintain a constant behaviour during the utilisation of the fuel, one could introduce initially some neutron absorbing elements, which are either progressively retracted or burned out into less absorbing elements during the combustion process. Anyway, such an evolution is not a problem, since it occurs over a very long period of time and it only decreases the reactivity of the system.

2.—A Thorium based Reactor? As pointed out, Thorium as a nuclear fuel has considerable advantages when compared with Uranium. However the realisation of a classic Reactor based on full breeding of Thorium presents serious difficulties—which will be briefly illustrated, and which justify the added complexity of an external neutron source according to the present invention.

In a Reactor, the neutron flux is sustained fully by the neutron multiplication process, which is fission driven. A key parameter is the effective multiplication factor, $k_{eff}$, the ratio of the neutrons at the end of a generation to the number starting that generation. It is obvious that for a critical Reactor, $k_{eff}=1$. One can separate out the effects due to neutron leakage and introduce the corresponding parameter $k_\infty=k_{eff}/P$, which is the parameter which would apply to an (homogeneous) identical lattice arrangement in which the dimensions are large enough as to make the neutron leakage probability 1–P negligibly small. Evidently $k_\infty$ must be significantly larger than 1 in order to permit to reach criticality with a sufficiently small lattice volume. The feature of $k_\infty$ is that it does not depend on the geometrical dimension of the device, which relates to P: the excess of $k_\infty$ from unity represents the allowance for the fractional neutron losses due for instance to leakage.

In the case of theoretically pure natural Uranium and graphite, the maximum possible value of $k_\infty$ is ≈1.1, while when heavy water (D$_2$O) is used as a moderator, again with natural Uranium, higher $k_\infty$ constants, approaching 1.3 are attainable. As well known, this leaves sufficient room for losses due to leakage and absorption by impurities and by fission fragments to realise practical devices. However for a Thorium based device the situation is not so favourable.

The value of $k_\infty$ is directly related to the concentration of fissile material. While for natural Uranium the relevant concentration is the one U$^{235}$ which is fixed and known (0.71%), in the case of Thorium breeding U$^{233}$, the equilibrium concentration of this last material is dependent on the previous intensity and history of the local neutron flux. As pointed out, in steady conditions and after an appropriate period of time, such a concentration reaches an equilibrium level in which the fissioned U$^{233}$ is balanced by the amount of U$^{233}$ bred from Th$^{232}$. Such equilibrium concentration is also dependent on the energy spectrum of the captured neutrons—which in turn is related to the basic geometry of the lattice. In addition to U$^{233}_1$, several other Uranium isotopes and other actinides are inevitably formed with a variety of time constants, which also reach eventually an equilibrium level. They also contribute both to neutron captures and multiplication with fissions and in a minor extent with (n,2n) reactions. "Reactor grade" Heavy Water (D$_2$O+0.14% H$_2$O), Beryllium, Water (H$_2$O) and Graphite are amongst the best neutron moderators. More generally, a large number of moderators can be used and ample choices are available, this being of course application-dependent and dictated by requirements of the specific design. The moderator must be sufficient to reduce the energy of fission neutrons, since as pointed out, at lower energies the amount of $U^{233}$ needed to reach breeding equilibrium is smaller.

A number of practical lattice geometries, with fuel bodies of a number of different shapes and dimensions (like fuel spheres or fuel bars) properly spaced and uniformly distributed in an essentially continuous moderating medium have been evaluated with computational methods in which the best knowledge of the underlying nuclear physics has been used. The relevant parameters are the bar or sphere radius r and the volume ratio ρ of the fuel to the moderator. The results can be expressed in terms of iso-$k_\infty$ curves as a function of the variables r and ρ. A clear optimum emerges for an appropriate broad choice of these parameters. The initial fuel can be in various chemical forms, for instance of metal, oxide or carbide. The resulting values of $k_\infty$ for optimal choices of r and ρ have been evaluated and given in Table 2.

TABLE 2

Properties of some infinite Reactar lattice geometries

| Initial fuel composition | Moderator composition | Fuel geometry | Maximum reactivity (theor.) |
|---|---|---|---|
| Pure Thorium | Graphite | Spheres, Rods | $k_\infty$ = 1.07 |
| Pure Thorium | Water | Spheres, Rods | $k_\infty$ = 1.07 |
| Pure Thorium | Beryllium | Spheres, Rods | $k_\infty$ = 1.36 |
| Pure Thorium | Beryllium+$^6$Li | Spheres, Rods | $k_\infty$ = 1.08 |
| Pure Thorium | Heavy Water | Spheres, Rods | $k_\infty$ = 1.10 |

Results are given for Graphite, Beryllium, Water($H_2O$) and Reactor grade Heavy Water ($D_2O$). A special case relates to Beryllium, which has a significant cross section for (n, 2n)reaction and hence it acts effectively as a neutron multiplier. However interactions with fission neutrons produce as well $^6$Li by the Be(n,α) reaction which has a cross section for thermal neutrons (0.025 eV) of 940 barns and which reaches saturation very quickly, offsetting the benefits of the (n, 2n) reaction. In addition neutron captures of $^6$Li produce a large amount of Tritium which is radioactive and must be disposed of.

The values of $k_\infty$ include only the contributions to the captures in the moderators and are given for a $Th^{232}$—$U^{233}$ mixture at the breeding equilibrium. Additional captures, with a corresponding loss of reactivity must be added:

1) Captures by the intermediate element $Pa^{233}$ whose concentration is proportional to the neutron flux. For $\Phi=10^{14}$ cm$^{-2}$ s$^{-1}$ we find $\Delta k_\infty=-5.3\times10^{-2}$.

2) Captures in the rapidly saturating $Xe^{135}$ and $Sm^{149}$ fission fragments, slowly dependent on the neutron flux. For $\Phi=10^{14}$ cm$^{-2}$ s$^{-1}$ we find $\Delta k_\infty=-2.0\times10^{-2}$.

3) Captures by the higher Uranium isotopes $U^{234}$, $U^{235}$, $U^{236}$ and $U^{238}$, generated by multiple neutron captures. Their concentration depends on how long the fuel has been used. Note that chemical separation cannot separate them from the main $U^{233}$ fuel and that both fission and captures contribute with opposite signs to the reactivity. For the relatively long integrated neutron exposure $\int\Phi dt>3\times10^{22}$ cm$^{-2}$ at which concentrations reach about saturation, the contribution is $\Delta k_\infty=-5.0\times10^{-2}$.

The largest value of $k_\infty$ for optimum choice of parameters and including only effects (1) and (2) is typically in the range 1.01÷1.03, namely much too small to ensure criticality for a finite size system and once other sources of captures due to impurities (slowly saturating and non saturating fission fragments) are taken into account. It should be pointed out that $k_\infty$ is significantly reduced also by effect (3), i.e. build-up of Uranium isotopes higher than $U^{233}$ as long as we wish to make an efficient use of the fuel without isotopic enrichment.

Hence, in realistic conditions, a Thorium burning Reactor can hardly reach criticality with full breeding requirements. This is why, according to the present invention, the addition of an external neutron source is determinant in order to provide the practical operability of Thorium related nuclear energy.

According to the present invention, there is no criticality. However, the effective multiplication factor needs to be high in order to achieve a high gain. It has already been noted that the condition $\sigma_i^{(2)}\Phi\tau_2\ll1$, which limits the neutron flux, results in an efficient $U^{233}$ production. It will be further appreciated that this condition also minimises the above-discussed effect (1), thereby ensuring a reasonably high reactivity. Indeed, minimising effect (1) seems to be a stringent criterion for limiting the neutron flux. In practice, the neutron flux $\Phi$ should be at most $0.03/(\sigma_i^{(2)}\tau_2)$, i.e. such that at most 3% of the $Pa^{233}$ nuclei absorb one neutron instead of decaying into $U^{233}$.

In the case of fast neutrons, εη is larger but not quite sufficient to realise a conservative Reactor design. For instance, the reactivity excess, $k_\infty=1.2$, is substantially lower than the one of a thermal reactor with natural Uranium, somehow a limiting case for practical utilisation, for which $k_\infty=1.4$.

The External Neutron Supply

The external neutron supply removes the above-mentioned limitations. This can be realised for instance by a high energy, high intensity proton accelerator, whose beam is striking a heavy metal target located in the central region of the enclosure. While the initial sample of low energy neutrons is provided by the beam hitting the target, major multiplication of this sample is naturally generated by the fissions in the fuel elements. For $N_1$ carriers in the first generation injected by the external neutron source, there will be $N_n=N_1\,k^{n-1}$ carriers in the n-th generation, with k the already defined effective multiplication factor or criticality factor. Of course, in order to avoid criticality, k<1. The total number of neutrons produced is then:

$$N_{tot} = N_1 \sum_{n=1}^{n=\infty} k^{n-1} = N_1(1 + k + k^2 + k^3 + \ldots) = \frac{N_1}{1-k}$$

with an enhancement factor $1/(1-k)$. The criticality factor has been already decomposed as $k=P\,k_\infty$, where $k_\infty$ relates to an infinite lattice and P the probability that a neutron does not escape and consequently reacts in the fuel. Note that-criticality (k=1) is avoided easily, since as already pointed out for a Thorium breeder device $k_\infty=1.0$. On the other hand k must be large to get a good multiplication. We need therefore a neutron retaining geometry, namely a large value for P in order to ensure that the probability of further fissions remains significant and the cascade from an incoming neutron continues for several generations.

We start our consideration, as before, on the case of thermal neutrons. The case of fast neutrons will also be discussed afterwards.

Practical examples indicate that a value of k within the range 0.9÷0.95 is optimal, corresponding to a total number of neutrons in the moderator-fuel which is 10÷20 times the number injected by the target. Clearly the success of the scheme depends on the healthy development of the nuclear cascade, which is most productive in the energy range from thermal energies to a few MeV. The relevant parameter is the rate of fissions, which ensures the continuation of the cascade with newly produced neutrons and it is the main source of energy production. The neutron yield from high energy protons on a massive target made of high Z material—demonstrated by practical Spallation Sources—is quite large. For instance, a possible choice of dimensions and of target composition—described later on will lead to an average neutron yield of about 42 neutrons for each incident proton of 1.5 GeV. Therefore the beam energy fraction required to produce one neutron with the help of the high energy cascade alone is of the order of $\epsilon n=35$ MeV. The subsequent neutron multiplication in the cascade due to fissions is important since it further reduces the energetic "cost" of a neutron in terms of the incident proton beam energy by the multiplicative factor $(1-k)$ bringing it to as little $1.75 \div 3.5$ MeV/n. Admittedly, the choice of this range for k is rather conservative, and perhaps even higher gains can be sustained in a well designed device. As a comparison, the fission energy yield is about $\epsilon_f=190$ MeV ($\beta$-decays from fission fragments are included, but neutrinos are excluded).

The energetic gain of the Energy Amplifier is denoted by G and it is defined as the ratio between and the total energy produced in the device and the energy deposited by the high energy beam. In order to give a first estimate of G, one has to take into account that in equilibrium conditions and an infinite lattice, about 0.40 of all the neutrons produce fissions, the rest being dedicated to breeding or captured in the moderator, fission fragments etc. Hence the net energy gain of the device is approximately given by $G=190$ MeV/$(35$ MeV$)\times 0.4 \times 1/(1-k)=2.17/(1-k)$ and it will generally fall between $G=22$ and $G=43$. Even far from criticality the energy gain is considerable. Assume for instance that the efficiency of the heat to electricity conversion, using a high temperature gas turbine is 0.45. The electric power produced will then be 10.2 (20.4) times the energy deposited by the high energy beam for $k=0.9$ (0.95). There is plenty of electric power produced, in excess of what needed to run the accelerator.

The neutron conservation equation relates directly and on very general grounds the attainable gain G and the ratio $\Gamma=n_{loss}/n_o$, where $n_{loss}$ is the number of neutrons escaping or absorbed by something else than the fuel mixture of Actinides, and $n_o$ is the number of neutron absorbed by the fuel mixture of Actinides, i.e.

$$\Gamma = a + \frac{b}{G}, \text{ or}$$

$$G = \frac{b}{\Gamma - a}$$

The parameters a and b are functions of $\nu$, the neutron multiplicity of fission, and of $\alpha$, the ratio of $(n,\gamma)$ and fission cross sections, weighted by the fraction $f_i$ of atoms of all Actinides o f the fuel and averaged over the neutron energy spectrum (the subscript i denotes each Actinide, and the bar above the cross sections $\sigma$ represents a value averaged over the relevant neutron spectrum):

$$\bar{\alpha} = \frac{\Sigma f_i \bar{\sigma}_{(n,\gamma)}}{\Sigma f_i \bar{\sigma}_{fiss}}$$

$$a = \frac{\nu}{1 + \bar{\alpha}} - 1$$

$$b = \frac{\epsilon_f}{\epsilon_n} \frac{1}{1 + \bar{\alpha}}$$

Note that when the device becomes critical ($G=\infty$), $\Gamma_{crit}=a$. Therefore, in first approximation, $a \approx k -1$. The contribution to $\Gamma$ due to the beam is given by the second term b/G. Exemplified figures appropriate to a practical device operating on thermal and epi-thermal neutrons are $a=0.070$ and $b=2.52$. The computer modelling used to determine a and b takes into account the actual energy spectrum of the neutrons and the energy dependence of the cross sections, particularly complicated in the resonance region. Using a highly neutron-saving design, one should be able to achieve, in the absence of fission fragment poisoning, $\Gamma_o \approx 0.08$. $\Gamma_o$ presents the contribution to $\Gamma$ of any neutron losses but captures by fission fragments, i.e. leakages, captures by the moderator, fuel cladding, spallation target if used . . . The margin $\Delta\Gamma=\Gamma-\Gamma_o$ is large when the system tolerates a relatively large amount of fission products. The negative value of $\Delta\Gamma_{crit}=\Gamma_{crit}-\Gamma_o$ ensures that the Energy Amplifier never becomes critical. But, in the same conditions and the already quite practical gain $G=20$, we find $\Delta\Gamma=0.116$ providing a considerable reactivity allowance. For a gain $G=40$, $\Delta\Gamma=0.053$. Therefore $\Gamma$ must be kept reasonably small in order to ensure the highest gain. The design of the device is therefore driven primarily by neutron economics.

The reward for minimising $\Gamma_o$ is a higher energy gain and wider allowance for captures due to fission fragments, which in turn means a longer lifetime without their extraction. The (normalised) cross section for fission fragments $\Sigma_{frag}$ is given in the previously described FIG. 5. A good estimate after an integrated flux of $10^{22}$ cm$^{-2}$ is $\Sigma_{frag}=1.6$ barn from which we calculate a contribution $\Delta\Gamma=0.106$. Evidently shorter exposures and/or smaller gains will improve the margin on $\Delta\Gamma$.

The build up of fission fragments has a direct influence on the gain, unless corrected downward during the early phases by introducing a variable amount of neutron absorption by other means. These extra neutrons do not have to be necessarily wasted in control bars. They could be used for instance to breed new fuel for further use.

There are of course also other reasons which suggest operation of the thermal neutron regime with relatively small values of k, namely its relatively large variations due to decay mechanisms after shut-down or power variations ($Pa^{232}$ and $Xe^{135}$) so as to leave enough margin from risk of criticality.

Figure 7:
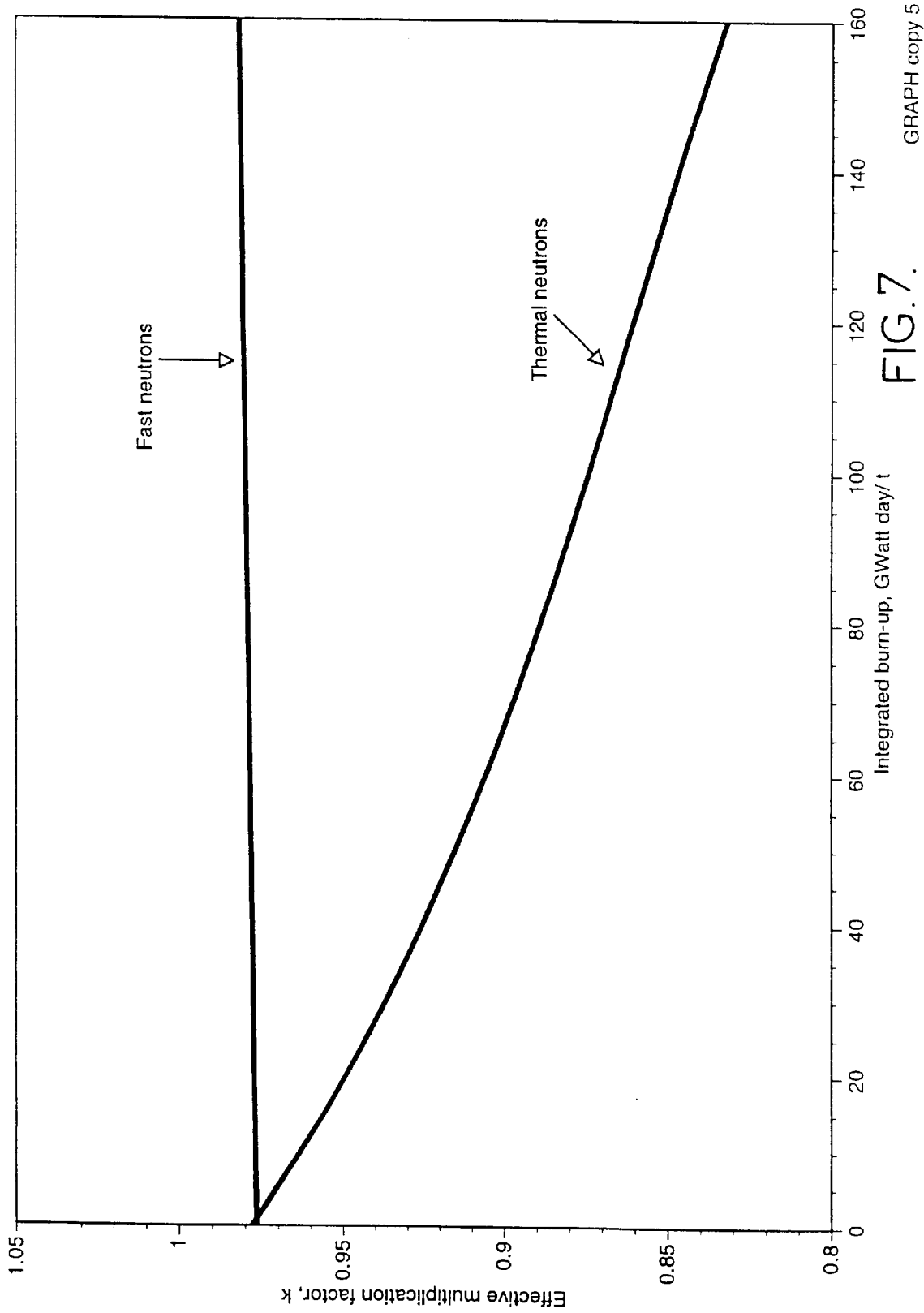
FIG. 7 is a plot showing the evolution of the effective multiplication factor as a function of the integrated burn-up rate in the cases of thermal and fast neutrons.

The same type of considerations would however suggest a much greater gain for a fast neutron scheme, for which an operating point in the vicinity of $k=0.980$ is an optimal operating point, corresponding to an energetic gain in the interval $G=100 \div 150$. A first reason for this choice stems from the much larger value of $\eta\epsilon=2.5$, which implies a $\geq 0.20$. On the other hand, the fission poisoning is much smaller and linearly growing with the burn-up, amounting to about $\Delta\Gamma=0.03$ after 100 GWatt day/t. the flux-dependent $Xe^{135}$ effect is absent and the time-dependent k variation due to $Pa^{233}$ decays is seven times smaller for a given burn-up rate. All these considerations suggest that $k=0.98$ is quite appropriate for a fast neutron environment. In addition, captures from the fission fragments are typically more than one order of magnitude smaller than in the case of thermal neutrons for the same burn-up. Many of the considerations given above for thermal neutrons are now no longer relevant. The value of k is indeed extremely constant over the burn-up period, as examplified in FIG.7. In this particular case, one has initiated the run with a $U^{233}$ concentration slightly less than the optimal breeding equilibrium, and achieved a perfect cancellation between the slightly falling effect of the fission captures and the rising due to the increases in bred $U^{233}$.

In order to tune the Energy Amplifier to the desired constant value of k, we must introduce an appropriate destiny for the excess neutrons, which are typically of the order of all produced neutrons. It is therefore necessary to determine which use one intends to make of them, like for instance, (1) breeding new fuel, (2) incineration of unwanted waste or possibly (3) absorbing then in "control rods". This choice would then define how the criticality parameter will be tuned to the wanted value, dissipating the excess criticality.

In the present application, we shall make the assumption that the extra criticality is to be deployed essentially to breed additional fuel. The excess of neutrons is of the order of 10% of the total inventory, once the effects of higher actinides and the moderator captures have been taken into account. These neutrons can be conveniently captured in a blanket of pure Thorium, in the form of $ThO_2$ oxide or metallic, arranged at the periphery of the core. Contrary to the main core, in which $Th^{232}$ and $U^{233}$ have essentially equal macroscopic cross sections, all neutrons contribute here to the breeding of $U^{233}$. This will continue to be so, at least as long as the build-up of $U^{233}$ produces a concentration which is much smaller than the equilibrium concentration in the vicinity of 0.10. Therefore, one expects to accumulate fin the breeder about 20% of the $U^{233}$ which is bred by the core.

THE HIGH ENERGY BEAM

The success of the scheme hence relies on the injection of a large number of neutrons from outside. This is achieved with the help of an high energy beam -typically of protons- which initiates a neutron-rich nuclear cascade which is capable of producing neutrons at a small energetic cost, namely a small $\epsilon_n$. Two alternatives are possible. In the first alternative the beam is shot directly at the moderator-fuel mixture. Alternatively a dedicated target can be used to absorb the beam and to produce the neutrons. Such target must be in addition as transparent as possible to the low energy neutrons, in order not to affect the neutron multiplication due to fissions.

Computer simulation with the Monte Carlo method on a practical geometry have been performed using a specially written cascade evolution programme. They represent a very realistic simulation since relevant cross sections are well known and introduced in the calculations. Hence they are a valid guidance in optimising the geometry of the device.

1.—The fuel-moderator as high enery target. The possibility of sending the beam on the fuel-moderator mixture itself is considered first, since it has the obvious advantage of simplicity. The spallation process provides neutrons in higher multiplicity for heavy nuclei than for light ones which are to be preferred for moderating the neutrons. In addition, Thorium has a large high energy cross section for fission with large neutron multiplicity. It is therefore apparent that in order to have a copious neutron production by the cascade, the fractional amount of moderating material must be as small as possible.

Typically a 1.5 GeV proton incident on a large Thorium block will produce on the average some 70 neutrons, corresponding to $\epsilon_n \approx 21$ MeV. This yield is approximately linearly energy-dependent, leading to an almost constant value for en, For instance at 800 MeV we find $\epsilon_n \approx 26$ MeV. However the same 1.5 GeV proton incident for instance on Water or on Graphite will yield on the average only 5.0÷5.5 neutrons. The moderator-fuel medium consisting of finely subdivided elements will yield an intermediate neutron rate, largely independent of the details of the geometry of the lattice. Indicating with $V_m$ and $V_f$ the relative fractions of volume occupied by the moderator and the fuel, approximate yields for Water-Thorium mixtures are given by the expression (valid in the interval $V_m \leq 2 \ V_f$): $\epsilon_n(MeV) \approx 21.89 \div 4.55 \ V_m/V_f$ and $\epsilon_n(MeV) \approx 26.82 + 5.29 \ V_m/V_f$ for 1.5 GeV and 800 MeV respectively. We note that up to $V_m \leq V_f$ the value of $\epsilon_n$ is not very different than the one of pure Thorium. It is this fortunate circumstance that the present invention is set up to exploit.

Very similar results for $\epsilon_n$ are found for a variety of low-Z moderator-thorium mixtures, provided for different materials 1 and 2, volumes $V_{m,1}$ and $V_{m,2}$ are compared in term of equal geometrical nuclear collision lengths $L_{int}$: $V_{m,1} = V_{m,2} \ (L_{int,2}/L_{int,1})^3$. By contrast, the moderating power, defined as the average logarithmic neutron energy loss —i.e. lethargy change- per unit of length, decreases very rapidly with increasing A of the moderating nucleus much faster than the geometrical nuclear collision length, as illustrated in Table 3.

TABLE 3

Some properties of some pure moderators for thermal neutrons and high energy (H.E.) protons

| Moderator | Density gr/cm$^2$ | H.E. nuclear interaction length, cm | Neutron Slow-down length, cm | Moderating Power, cm$^{-1}$ |
|---|---|---|---|---|
| Water | 1.0 | 84.9 | 5.74 | 1.53 |
| Heavy Water | 1.1 | 77.2 | 10.93 | 0.37 |
| Beryllium | 1.85 | 40.6 | 10.0 | 0.125 |
| Graphite | 1.80 | 47.9 | 19.7 | 0.064 |

As a consequence, for most moderators, like for instance Graphite, the requirements for an effective moderation and for an efficient neutron cascade cannot be simultaneously satisfied for a common value of $V_m/V_f$. The important exception is water, since hydrogen is extremely efficient in slowing down the neutrons. However in order to make it possible to use hydrogen as moderating element, we must also ensure that the fraction of neutrons captured by the well known radiative capture process (n,γ) is sufficiently small, in view of the stringent requirements imposed on the neutron inventory. We recall that a fully thermalizing water moderator like used for instance in standard PWR's will easily capture as many as ⅕ of all neutrons, a loss which is clearly incompatible with the present scheme.

We have identified an alternative regime in which water maintains a small neutron capture rate while the other parameters, namely $\epsilon_n$ and the equilibrium ratio of the fissile material at breeding equilibrium $n_3/n_1$ have both acceptable values, provided the neutron energy is kept significantly above thermalization with the help of under-moderation. In practice this is obtained choosing $0.2 \ V_f \leq V_m \leq V_f$, as required by the high energy cascade. In other words, such under-moderation in a water lattice meets simultaneously both requirements of (1)—an efficient neutron production by the high energy beam and of (2)—a low neutron capture during moderation. In addition, the resulting neutron energy spectrum with energies significantly higher than thermal has other useful features: (1) the reactivity $k_{\infty i}$ is increased by the presence of a significant contribution due to high energy fissions in $Th^{233}$ $U^{234}$ and $U^{236}$; and (2) neutron losses in $Pa^{23}$, $Xe^{135}$ and fuel cladding are reduced. Finally breeding performance is not impaired: notwithstanding there will be an increase of the relative fraction of neutron captures by Thorium due to the resonance region, which requires a correspondingly significantly higher $U^{233}$ concentration $n_3/n_1$ at breeding equilibrium.

Figure 8A:
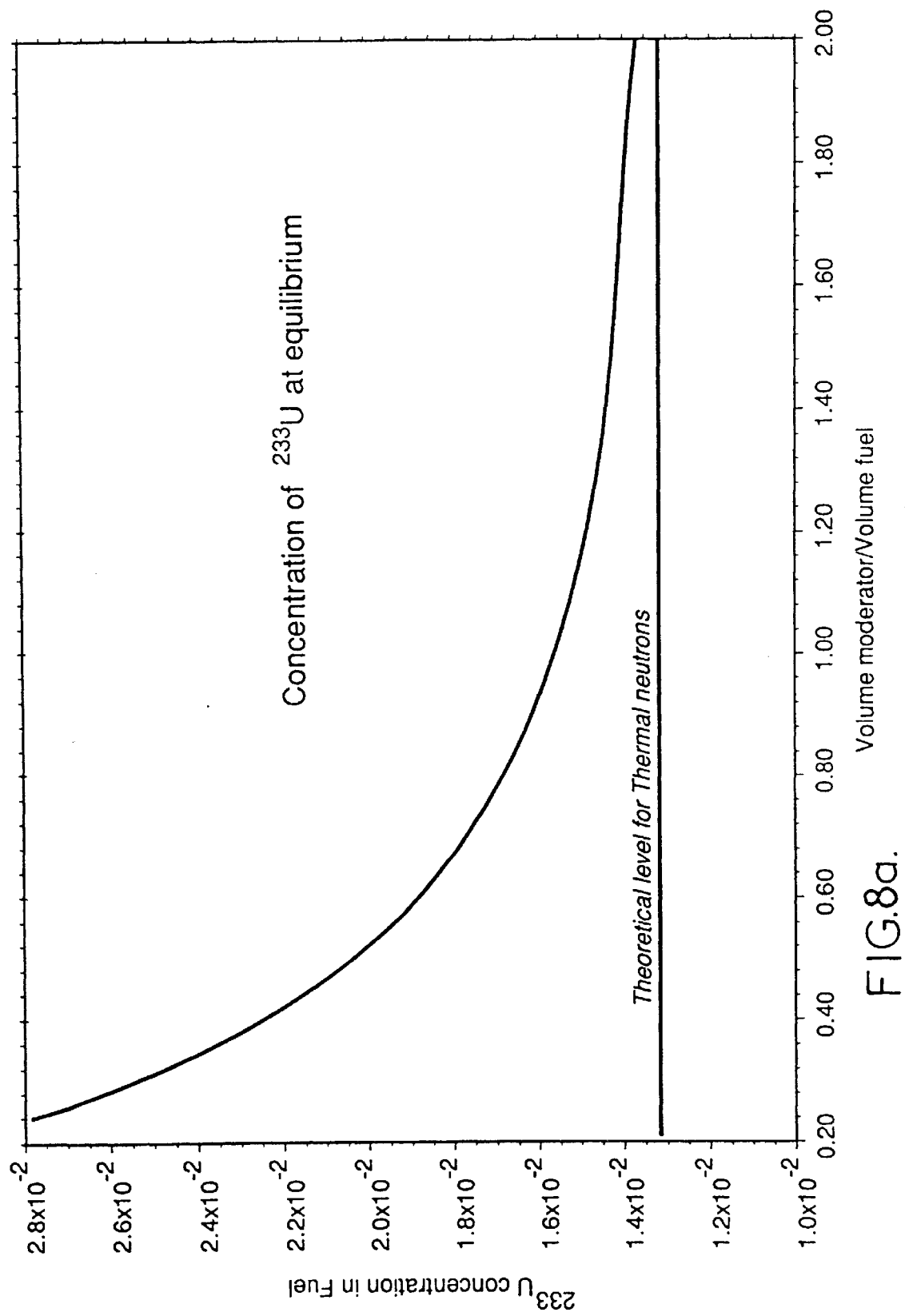
Figure 8B:
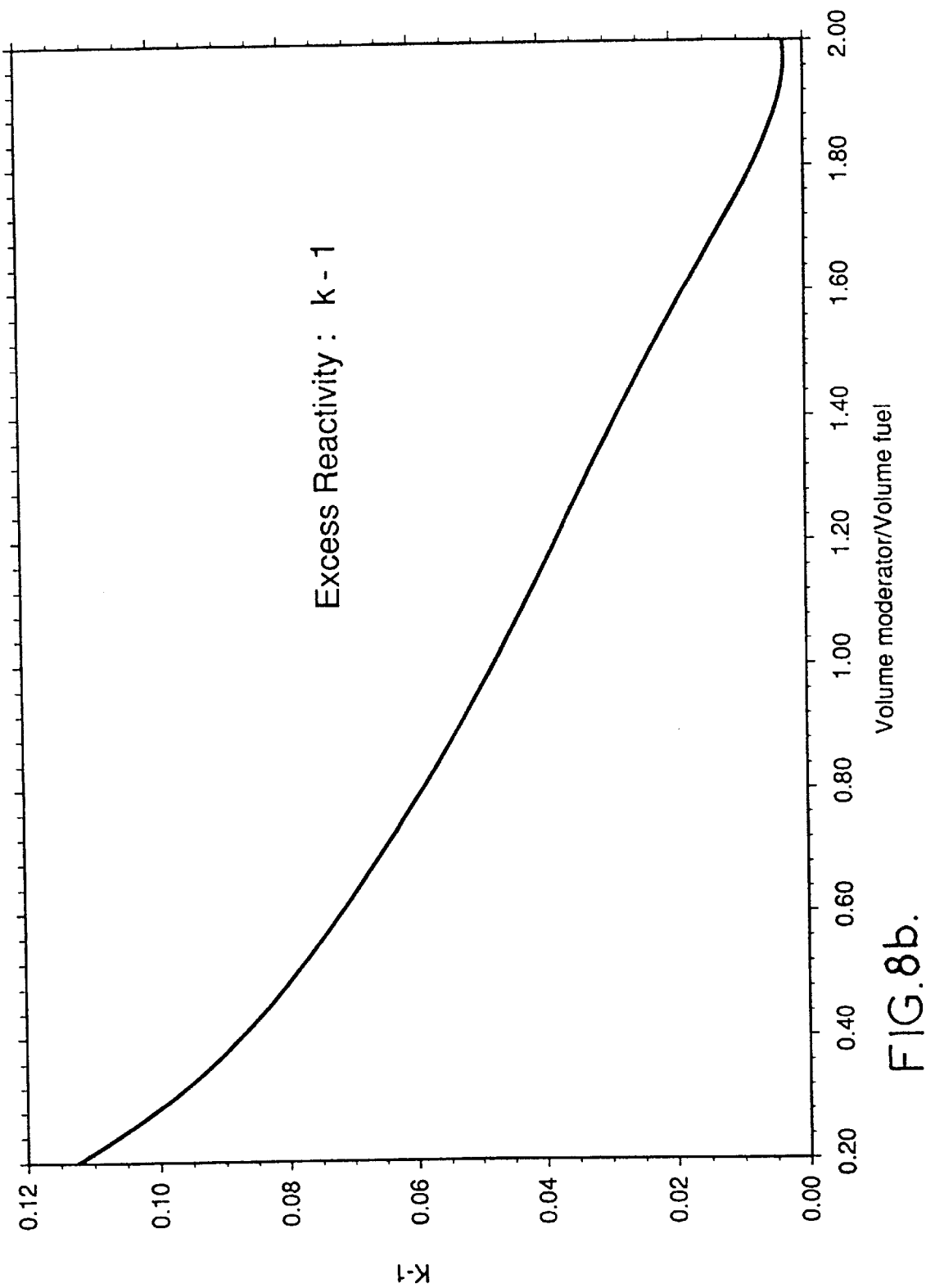
Figure 8C:
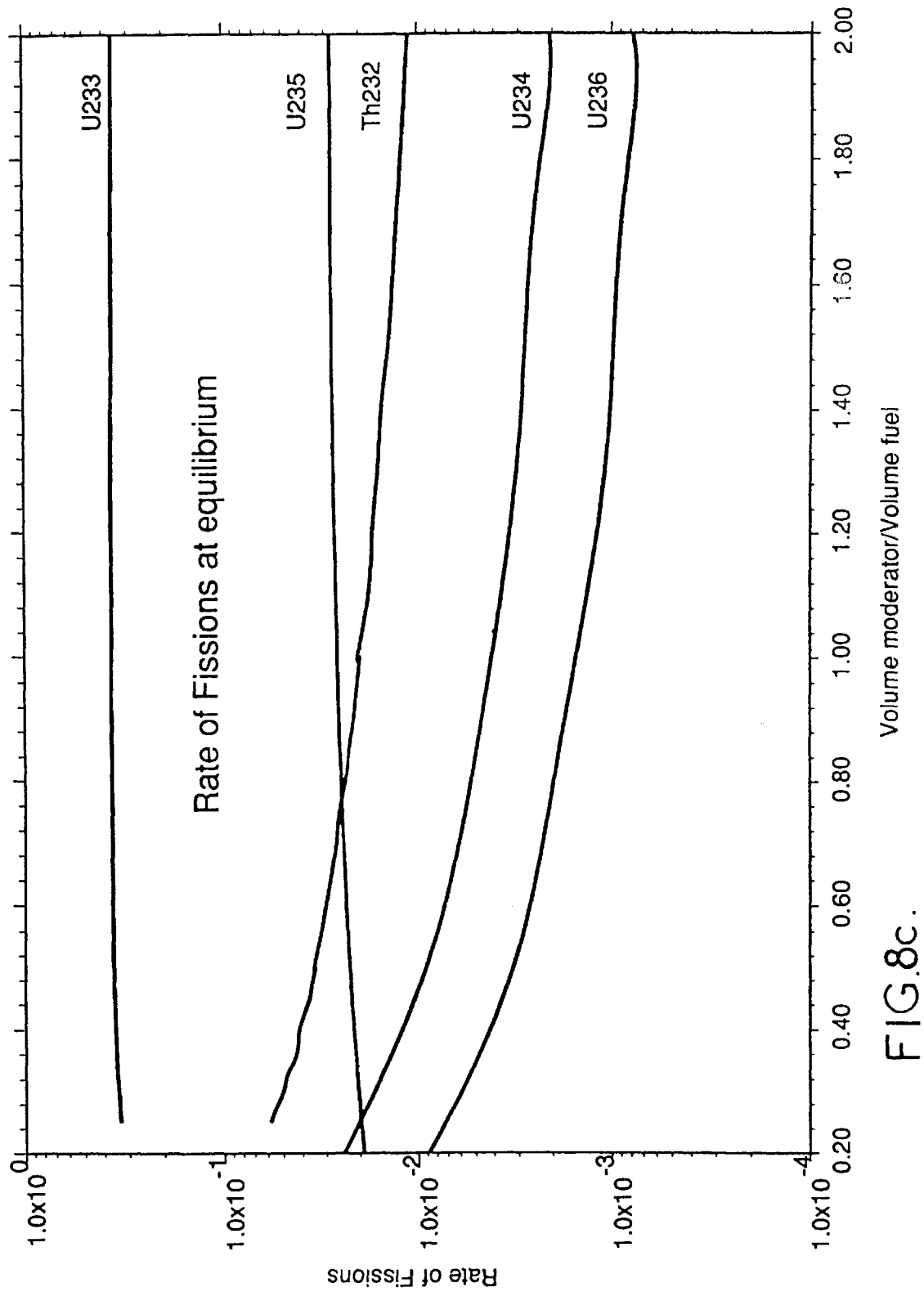

Parameter dependence for an infinite lattice made of Water and Thorium are given in FIGS. 8a–8d. Results are rather independent of the temperature (they have been calculated for pressurised water at 300° C.) and of the shape of the fuel elements (spheres, rods of radius r) and of their characteristic dimension r. They are given for an average performance over the interval 4.0 mm≦r≦2.0 cm and they hold within such interval to within ±5%. FIG. 8a shows the concentration of $U^{233}$ at breeding equilibrium as a function of the ratio $V_m/V_f$. FIG. 8b shows the excess reactivity $k_\infty-1$ again as a function of the ratio $V_m/V_f$. The contribution due to neutron absorptions by the moderator and all actinides at their expected equilibrium concentration are included. The separate contribution of different components at the breeding equilibrium to the rates of fissions and of (n,γ) captures are shown in FIG. 8c and FIG. 8d respectively. One remarks from FIG. 8d that the probability of radiative capture in the water moderator has become small or even negligible for $V_m/V_f \leq 1$. Typical conditions for $V_m/V_f=0.4$ and $V_m/V_f=0.8$ are listed in Table 4. As already pointed out, the U, Pa and Np concentrations used throughout are the ones corresponding to a very long exposure without isotopic separation, corresponding to asymptotic equilibrium conditions. Note however that the net effects on $k_\infty$ of elements with A≧234 is extremely small, since the effects of the captures are almost completely compensated by the neutrons produced by fissions. The net neutron balance per generation is in fact essentially zero, 0.0323×2.49−0.0841=−0.00353 for $V_m/V_f=0.8$ and 0.0375×2.49−0.0900=+0.00259 for $V_m/V_f=0.4$.

Water must be also sufficiently abundant in order to perform as well the important function of extracting the heat from the fuel-moderator block. Heat extraction is ultimately set by the well known "burn-out" condition which limits the energy which can be extracted from a given surface. In practice, operating conditions must be kept many times below such a limit. In a water-deficient arrangement, this problem can be overcome with an appropriately large contact surface to the liquid, like for instance with cooling fins on the fuel cladding.

The above figures are for an infinitely large device. Control of the neutron losses due to leakage is largely a matter of cost. In order to improve containment one can add a reflector, although this is not a necessity. As a general rule, in an Energy Amplifier designed for an optimised cost, these losses are likely to lead to a criticality factor $k=(0.97\div0.95)$ $k_\infty$. Once the inevitable losses in the fuel cladding, Xenon and other poisoning fragments etc. are added, the final value for k is likely to be only slightly below unity, namely the system is slightly sub-critical.

TABLE 4

Typical parameters of an infinite, water under-moderated geometry

| Fuel elements, shape | | sphere, cylinder | sphere, cylinder |
|---|---|---|---|
| Fuel elements, radius, r | | 4 mm ÷ 2 cm | 4 mm ÷ 2 cm |
| $V_m/V_f$ | | 0.4 | 0.8 |
| Average density (gr/cm³) | | 8.67 | 6.96 |
| $U^{233}$ equilibrium concentration (units of 1.3 × 10⁻²) | | 1.725 | 1.291 |
| Longitudinal cascade containment (95%) (1.5 GeV beam), m | | 1.11 | 1.34 |
| Radial cascade containment (95%), m | | 0.505 | 0.62 |
| $\epsilon_n$, MeV | | 23.5 | 25.2 |
| $k_\infty - 1$ | | 0.088 | 0.060 |
| Captures in the moderator: | —$H_2O$ | 0.00528 | 0.0216 |
| Captures in the fuel: | —$Th^{232}$ | 0.405 | 0.407 |
| | —$U^{233}$ | 0.0473 | 0.0458 |
| | —$Pa^{233}$ | 0.0152 | 0.0159 |
| | —$U^{234}$ | 0.0584 | 0.0585 |
| | —$U^{235}$ | 0.00715 | 0.00635 |
| | —$U^{236}$ | 0.0231 | 0.0176 |
| | —$Np^{237}$ | 0.00134 | 0.00163 |
| Fissions in the fuel: | —$Th^{232}$ | 0.0415 | 0.0237 |
| | —$U^{233}$ | 0.351 | 0.365 |
| | —$Pa^{233}$ | 0.00027 | 0.00016 |
| | —$U^{234}$ | 0.0123 | 0.00529 |
| | —$U^{235}$ | 0.0209 | 0.0251 |
| | —$U^{236}$ | 0.00428 | 0.00196 |
| | —$Np^{237}$ | 0.00009 | 0.00004 |

Containment of the cascade due to the proton beam must also be ensured. Fortunately, this leads in general to dimensions which are comparable to the ones required by previously defined requirements for neutron containment. Assume that. the beam hits an infinite fuel-moderator block. We define somewhat arbitrarily as "produced" neutrons all neutrons of the proton induced cascade as soon as their energy drops below 1 MeV. Evidently they act as seed for a continuing cascade which is accounted by the multiplication process already discussed.

Containment of 95% of uproduced" neutrons is ensured longitudinally and radially at depths in meters which are parametrized as $0.863+0.577\ V_m/V_f-0.0366\ (V_m/V_f)^2$ and $0.431+0.223\ V_m/V_f-0.0188\ (V_m/V_f)^2$ respectively. The shower size is only slightly smaller at 800 MeV. Hence the whole cascade can be conveniently contained in a cubic enclosure of, say, at least one meter each side.

Figure 9:
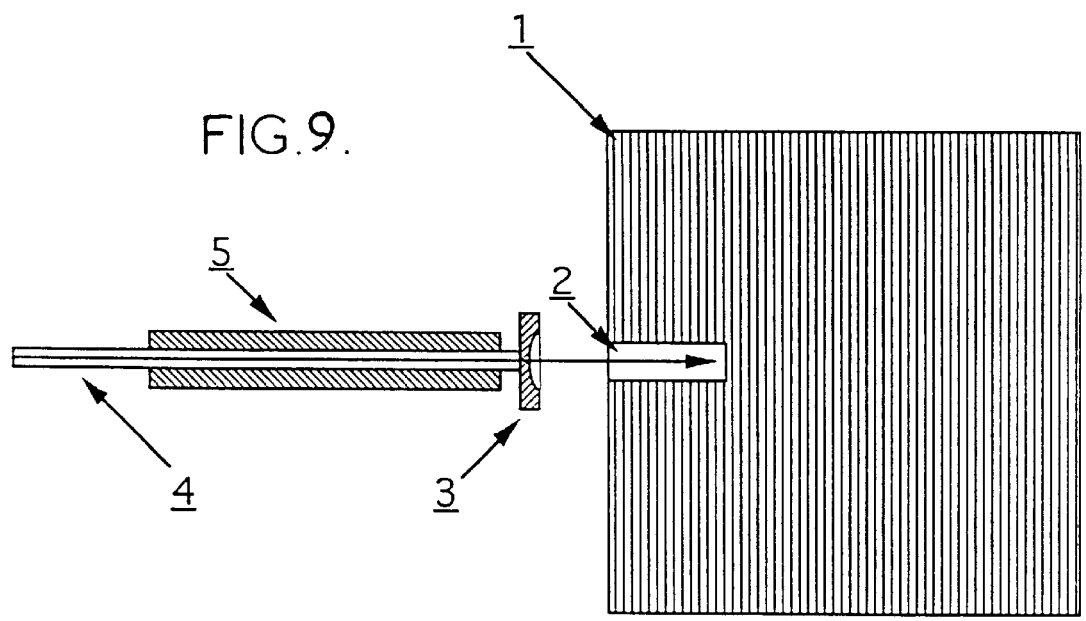
FIG. 9 is a schematic diagram of an Energy Amplifier without a separate spallation target.

A conceptual diagram of the target geometry is shown in FIG. 9. The moderator-fuel assembly is schematically indicated with 1. Some of the produced neutrons suffer back-scattering and actually emerge in the backward cone as seen from the beam impact point on the target. In order to minimise such an effect the beam must penetrate by some 15÷20 cm through a hole 2 matched to the relatively small beam size. The proton beam which travels in an evacuated pipe 4 has to penetrate into the Energy Amplifier through a thick window 3. This is not a problem as long as the window is relatively close to the moderator-fuel block (≈30–40 cm, depending on its thick-ness), since the few interactions occurring in it continue to propagate their secondaries through the block and have a comparable neutron yield. However some additional precautions have to be employed in shielding against the neutrons escaping out of the Energy Amplifier enclosure through the beam pipe. This is done with the help of a long entrance collimator 5.

Finally, the interactions initiated by the high energy proton beam cause break-up of nuclei and atoms within the enclosure. Nuclear break-up produces a series of nuclei, most of which are radioactive. The main effect of the atomic break-up is hydrolysis of the water moderator. Both effects have been considered in detail and appear to occur at quite acceptable level.

2.—A separate, high energy taroet. In some instances, like for instance in the case of a more bulky and less efficient moderator (Graphite), a separate spallation target must supply the neutrons. The target preferably occupies the central part of the device to ensure the largest utilisation solid angle. The target material must be also as permeable as possible to low energy neutrons which can be back-scattered from the moderator and the fuel. We can therefore rely in its design on the experience gained for neutron spallation sources.

A number of possible geometries can be envisaged. The size of the target region (typically 30 cm radius, 1 m long cylinder) must be optimised in order to contain the largest fraction of the high energy cascade but to let evaporation neutrons emerge. The average energy of such neutrons is of the order of a few MeV. The simplest geometry is a homogeneous volume rich of heavy material, typically either natural Lead, Bismuth or a (eutectic) mixing of the two. The choice of Pb-Bi mixture, rather than pure Pb or other materials like Tungsten or Uranium is justified by the main requirement —already mentioned—that the target must be as transparent as possible to low energy neutrons. Indeed in the inventory of practical nuclei with high Z only $Bi^{209}$, $Pb^{206}$ and $Pb^{208}$ exhibit a negligibly small (<0.03 barn for a neutron energy of 0.025 eV) capture cross section for thermal and epi-thermal neutrons. While natural Bismuth is a pure isotope, Lead is a mixture of many isotopes and its capture cross section is dominated by $Pb^{208}$ (<0.70 barn for a neutron energy of 0.025 eV) which has an abundance of 22.6%. Optionally, isotopic separation could be used to remove this most offending isotope.

In the development of the cascade we can ideally distinguish two phases: a first phase in which the high energy particle produces a number of secondaries and a neutron multiplication phase due to the inelastic collisions in a high-Z medium. In more sophisticated designs these two phases could be realised with separately optimised materials. For simplicity we have taken a single uniform volume. We expect a neutron yield of about 42 neutrons for incident proton of 1.5 GeV. Therefore, the energy required to produce each neutron is $\epsilon_n \approx 35$ MeV, significantly higher than the value $\epsilon_n \approx 21$ MeV in the case of Thorium.

In practice, the target must be liquid, since both Pb and Bi have a very low thermal conductivity and one has to rely on convection to extract the heat produced by the nuclear interactions. Fortunately, the melting point of Pb is 327° C. and the one of Bi 271° C. Pb and Bi can be mixed in eutectic mixture which have even a lower melting point. From the point of view of neutron transparency, Bi is of course largely preferable. However, it has also some disadvantages. On freezing it expands of 3.3% of volume and it is highly corrosive. Neutron captures lead to $Bi^{210}$ (Radium-E) and this is a β-emitter of 5 days half life decaying on $Po^{210}$ which is an α-emitter with a half life of 134 days and which is highly toxic and difficult to contain. Nevertheless, these problems appear solvable but require a rigorous containment of the molten metal. The best containing materials for liquid Bi or Pb are chrome steels. Mass transfers, which become important at high temperatures, around 550° C., can be controlled by the addition of tiny amounts (few hundred p.p.m.) of zirconium and magnesium to the liquid metal.

We visualise therefore that both the target and the fuel will be contained in sealed elements of similar design, but with different filling, for instance rods or spheres or other, suitable geometrical shape. The same cooling circuit can then be used to remove heat from both units. The simplest case is the one of cooling by gas (Helium, $CO_2$ etc.), since then the interaction probability of the high energy cascade in it, as well as the neutron absorption probability are negligible. Then, the target elements will be periodically removed and reconditioned just like the fuel. The structure of the fuel element assembly must be capable of withstanding the volume changes of the target material on melting.

Figure 10B:
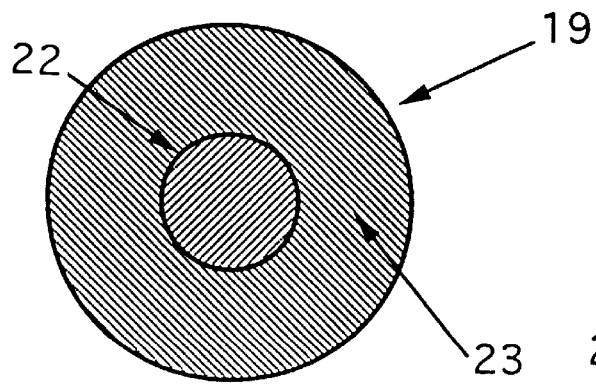
Figure 10C:
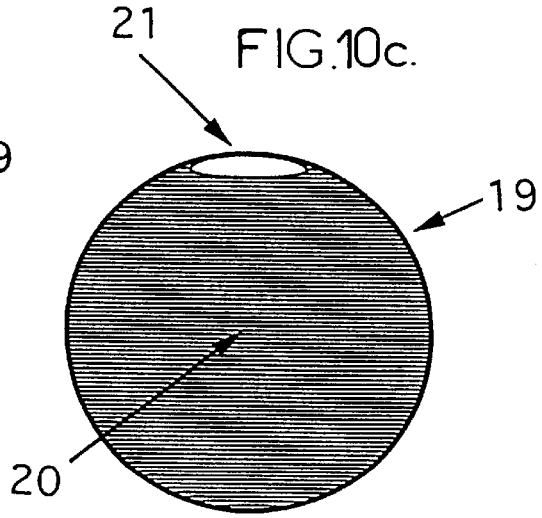
Figure 10A:
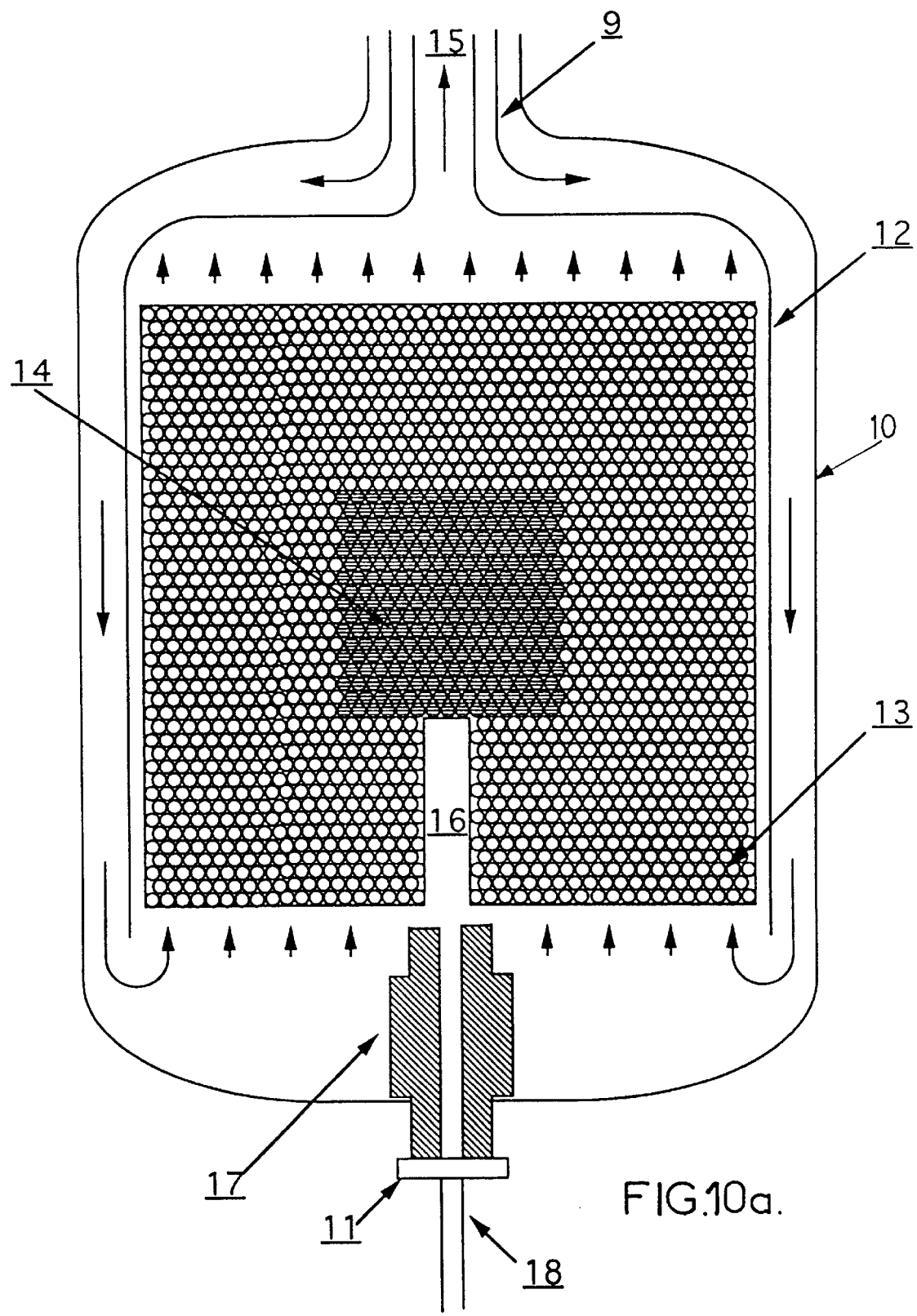
FIG. 10a is a schematic axial sectional view of an Energy Amplifier having a separate spallation target.

A conceptual diagram of the target geometry is shown in FIG. 10a–c. The alternative of gas cooling is shown for definiteness. The density of high temperature but compressed Helium, $CO_2$ or other suitable gaseous coolants, is sufficiently small to let the proton beam travel safely in it. Consequently, the beam window 11 to the vacuum of the accelerator can be conveniently installed outside the enclosure The "cold" gaseous coolant circulates as indicated by the arrows in FIG. 10a : it enters enclosure 10 at an inlet 9 located at the top of the enclosure, then it flows down between the enclosure wall and a skirt-shaped heat shield 12 which surrounds the fertile core 13; at the bottom of the enclosure, the coolant gas is deflected upward to traverse the fertile core 13 and the target region 14 before exiting at outlet 15. In the illustrated embodiment, inlet 9 and outlet 15 are coaxial and separated from each other by a pipe formed by an upper extension of heat shield 12. The beam reaches the target region through a cleared region 16, filled by the coolant gas. Both the fertile core region 13 and the spallation target region 14 are made of the suitable number of fuel elements, shown in FIG. 10b and 10c. We have chosen fuel pebbles in the exemplification: they are sealed by an appropriate cladding 19 (Zircalloy, Steel or other suitable material of low neutron absorption and good mechanical properties). The coolant gas circulates through the interstices between the pebbles, which ensures an important heat exchange surface.

(1) in the target region 14, there is no moderating medium and the liquefied metal 20, either Pb or Bi or the eutectic mixture of the two, fills as much as possible the available space, and a smal space 21 is left for the expansion from solid to liquid (FIG. 10c).

Note that the eutectic mixture Bi-Pb at 58% melts already at 125° C. and shows no appreciable contraction at solidification.

(2) in the fuel-moderator region 13, spheres are made of a central core of fuel 22, surrounded by a Graphite moderator 23 (FIG.10b).

Perforated panels (not shown) are used for containing the pebbles in the fertile core region 13, and for separating the target region 14 from the fertile core region 13, while allowing for circulation of the gas.

Care must be exercised in the geometry to make the coolant to travel in (curved) paths which are not such as to permit a significant fraction of the proton beam to miss the target. The proton beam travels in an evacuated tube 18 up to the window 11. A thick collimator 17 is necessary to reduce the neutron flux escaping through the beam porthole.

Just like in the case of the fuel moderator as target, the structural material used to contain the liquid metal participates to the high energy cascade. Fortunately however, the behaviour of materials like Zircalloy, Steel etc. to high energy protons is not as different as the one of Thorium, as in the case of water moderator. For instance, if the target is made of solid Zirconium, we expect $\epsilon_n \approx 70$ MeV. Hence, even if a relatively large fraction of the weight of the target is structural material, only modest effects are expected on $\epsilon_n$. The interactions of the high energy beam will produce a large number of different nuclei because of spallation and other inelastic nuclear collisions. Most of these products are radioactive and they must be contained just like fission products. Fortunately the amount of these products is relatively modest when compared with fission. The presence of a relatively large non fissionable target in the middle of the moderator-fuel medium with its own accumulation of reaction products is inevitably reducing the reactivity of the system. A first order estimate of the effect gives $\Delta k = -(1.0 \div 2.0) \times 10^{-2}$. Although the parameters of the container are application dependent, a significant additional loss in reactivity must be accounted for.

In conclusion, a separate target leads to significant reduction of the neutron yield (due to the poorer performance of Pb and Bi when compared to Th) and a significant reduction of reactivity due to additional neutron captures in the non fertile materials. However it opens the way to the possibility of using a variety of moderators, like for instance Graphite, and consequently of operating the device at higher temperatures than what is possible with water. Higher temperatures permit to increase the efficiency of the conversion to electricity and consequently at least partially to offset such shortcomings. To conclude, the efficient use of the fuel-moderator material as direct high energy target implies that neutrons remain under-moderated. These neutrons of energies substantially higher than thermal have the drawback of requiring a much higher fissile material concentration at equilibrium. In the case of Water which has a very high moderating power, we indicate a compromise situation in which the fissile concentration is only slightly higher than the thermal case and the target efficiency is high. Other schemes are of course possible with less efficient moderating media or with no moderator at all, but at expense of the much larger amount of fissile material.

In the alternative case in which the target has a different topology than the fuel-moderator medium, the high neutron yield and the transparency to neutrons must be ensured at all relevant energies, for the target, the associated cooling medium and the related containment hardware. Gaseous coolant has the interesting feature that it is essentially transparent to neutrons. Other liquid media are of course possible. Since they do not have to moderate neutrons inside the high energy target, the many coolants already used in fast neutron reactors can be identified, the choice amongst them of course largely dependent on the specific application.

THE HIGH ENERGY PARTICLE ACCELERATOR

The purpose of the accelerator is to produce most efficiently the largest number of secondary neutrons by collisions between the beam and a solid target. As already pointed out, there is a large independence of the energy and nature of the incoming beam. For instance, using a deuteron rather than proton beam will enhance the neutron yield by some 10%. In the following, for simplicity, protons are chosen. The energy of the incoming protons is not critical and any value in a wide interval, down several hundred MeV, gives comparable performance and a neutron yield proportional to the beam energy. The accelerator must also be energetically efficient, namely the beam must carry the largest possible fraction of the energy required to operate it.

The accelerated average current $i_{ave}$, once its kinetic energy T is set, is proportional to the power $P_{beam}$ required by the beam, which in turn is related to the power P delivered by the Energy Amplifier and the gain G:

$$i_{ave} = \frac{1}{G} \frac{P(M\text{watt})}{T(\text{GeV})} \text{ mA}$$

$$P_{beam} = \frac{1}{G} P$$

For the typical parameters G=40, T=0.8 GeV and P=250 MW, we find $i_{ave}$=7.18 mA and $P_{beam}$=6.25 MW. Smaller devices will require a correspondingly smaller accelerated current. Accelerators of characteristics close to the ones here required have been extensively used for Research purposes and, with the experience existing in the field, there is no reason to consider its construction or operation particularly delicate or complicated. Therefore one can be very brief. There are a number of possible technical choices in the design of the accelerator. Two possible schemes will be briefly outlined.

Figure 11:
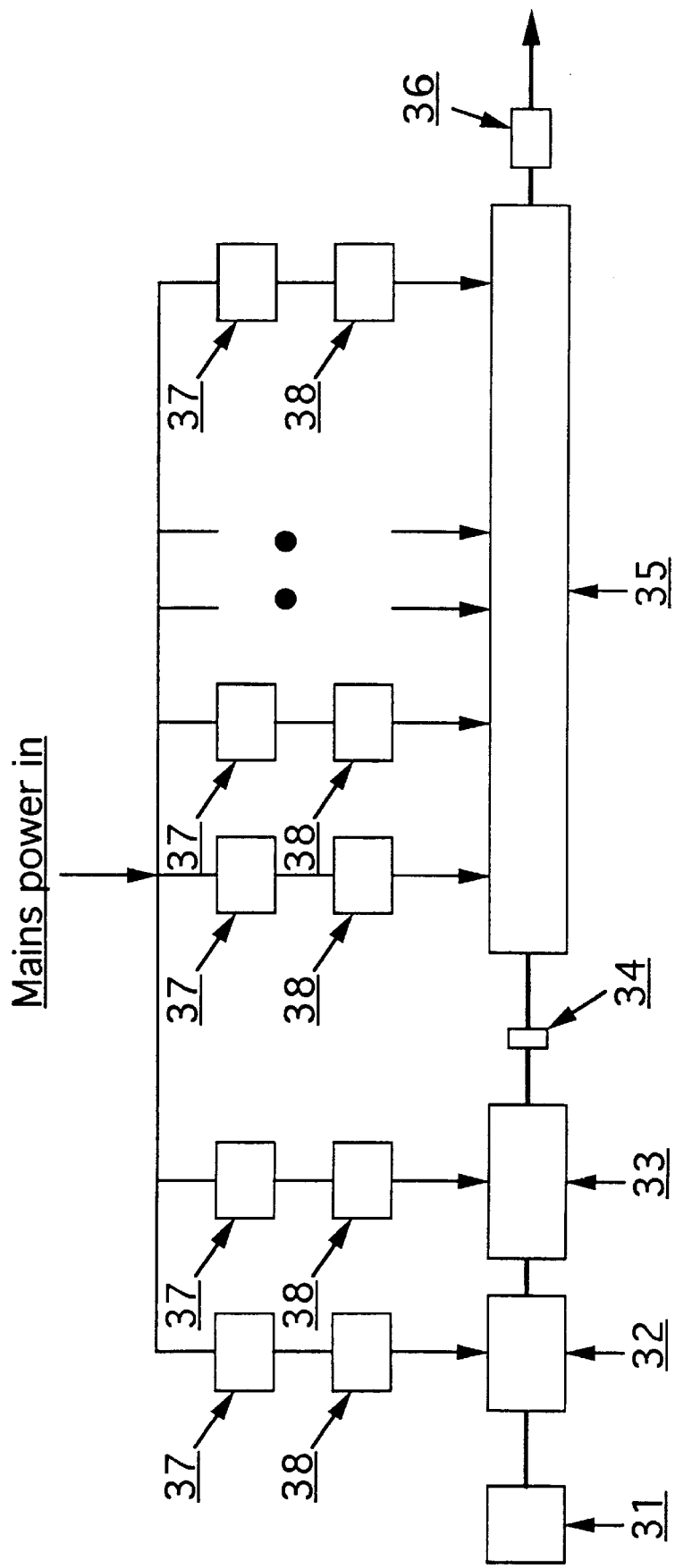
FIG. 11 is a block diagram of a LINAC proton accelerator.

1.—The LINAC accelerator. The accelerator chain is schematically shown in FIG. 11. It consists of a proton source and pre-injector 31, followed by a pre-accelerator 32 which could be for instance a RFQ (Radio Frequency Quadrupole). The RFQ will bring the energy of the beam to about 2 MeV and will be followed by an intermediate accelerating structure 33 which could be for instance a DTL (Drift Tube Linac) or other structure of similar performance. At the exit of the DTL the beam, which by now has about 25 MeV, is shaved -by a collimator 34 (in order to minimise the beam losses at high energy) before entering the main accelerating section 35. Such a main LINAC section can either be normal or superconducting:

1) In the case of non superconducting accelerating cavities the relevant figure relates to the power dissipated in the cavity (in the absence of beam).

There is an advantage in pulsing the accelerator for periods longer than the filling time of the cavities (typically $\approx 50\ \mu s$), since at high currents the power delivered to the beam exceeds largely the one that is dissipated in the accelerating cavities. For instance, for a maximum peak current of 180 mA (which seems quite acceptable, since there is no constraint to emittance), corresponding to 150 MW peak power at 0.80 GeV the power dissipated in the copper of the cavities is only about 50 MW. The average power is of course smaller and controlled by the duty-cycle of the accelerator. For instance if the indicated current of $i_{ave}$=7.18 mA is needed, the accelerator will be pulsed by modulators 37 at the rate of few hundred pulses/sec in order to be on for 4.4% of the time. The corresponding average dissipation in the cavities will be about 2.3 MW. The (average) energy gain is 1.5 MeV/m, which leads to a rather long structure. Optionally, since the magnetic rigidity of the beam is relatively modest, 180° bending elements could be inserted along the structure to fold it into smaller longitudinal dimensions. The RF sources 38 (klystrons) have typically an efficiency of 70%. Several of such units with appropriate splitters feed the many cavity units. An over-all mains-to-beam efficiency of 50% is a reasonable figure.

2) Superconducting cavities have been developed for particle accelerators and they could be used for the present application. The advantage of superconductivity is a higher (peak) gradient ($\geqq 6.0$ MeV/m, even higher gradients may be achieved with pulsed superconducting cavities. The ultimate limit is probably in the vicinity of 20÷30 MeV/m), which results in an accelerator of about ⅓ the length and in a better over-all mains-to-beam efficiency which will be in the neighbourhood of 60%. However, the complexity in operating a superconducting device—at least at today's state of the art—is somewhat more advanced and it is very likely that, in simpler cases, it might turn out to be excessively complicated. Notwithstanding, the benefits of superconductivity for this application must be emphasised, and simplicity of operation may be achieved in a not too distant future with further R&D work. In all LINAC versions, transverse focusing must be ensured all along the accelerator and this is easily realised with the help of quadrupole doublets. The matching of the beam to the target is performed by the final focus quadrupole lenses and beam transport 36. Particular care must be exercised in limiting beam losses which produce activation of the accelerator structure. The accelerator complex could in principle feed more than one Energy Amplifier. This can be easily accomplished with electric or magnetic deflectors pulsed in synchronisation to the LINAC followed by classic septum magnets and beam transport elements which will distribute separate pulses in close succession to different targets.

2.—The Isochronous Cyclotron. Such circular machines are capable of accelerating smaller but quite significant currents typically up to about 10 mA. When compared with the LINAC they have the advantages of the smaller size and, for some configurations, of a smaller cost. Particularly interesting is the possibility of a FFAG (Fixed Field Alternating Gradient) accelerator, or sector-focussed cyclotron, in applications in which the beam power does not exceed several MW and for energies of beam below 1 GeV. The main current limitation in a circular machine is due to transverse space charge effects and it occurs at low energies. This is why it is proposed to use the circular machine only after the beam has been accelerated to a substantial energy (for instance with a smaller LINAC and up to a value in the interval 50÷200 MeV, depending on the requirements of the final accelerated current), according to the scheme of FIG. 12. As in the case of a LINAC previously illustrated, it consists of a proton source and pre-injector 41, followed by a pre-accelerator 42 which could be for instance a RFQ (Radio Frequency Quadrupole). The RFQ will accelerate the beam to about 2 MeV and will be followed by the intermediate accelerating structure 43 which could be for instance a DTL (Drift Tube Linac) structure. At the exit of the DTL the beam has about 25 MeV and it is shaved by a collimator 44 before entering a third accelerating section 45 which brings the beam energy to the value required by the FFAG injection. The FFAG consists in a number of sector magnet units 46 with a strong focusing gradient disposed in a circular geometry. The beam circulates in an evacuated chamber 47 in the magnet gaps. The number of such sectors depends on the energy: for energies of 800 MeV about 8÷10 sectors are typical. The space made available between these sectors can be conveniently used for inserting RF accelerating cavities 48 and the injection 49 and extraction 50 channels. Cavities 48, as well as the other accelerating units 42, 43, 45 are energised by appropriate RF sources 51. Particles are isochronous and the RF operates at a constant frequency, accelerating a continuous beam.

Extraction of the beam from the FFAG is a delicate operation, since it has to be performed with high efficiency to avoid activation of the accelerator components.

The power consumption of the accelerator relates primarily to the one of the (big) magnets and to the RF. The efficiency of the present RF is quite comparable to the one previously discussed of a LINAC. The power consumption of magnet can be kept to reasonable level (1÷2 MW) by a conservative coil design. Alternatively a "super ferric" magnet, in which the coil is made superconducting, offers the possibility of significant power savings.

Figure 12:
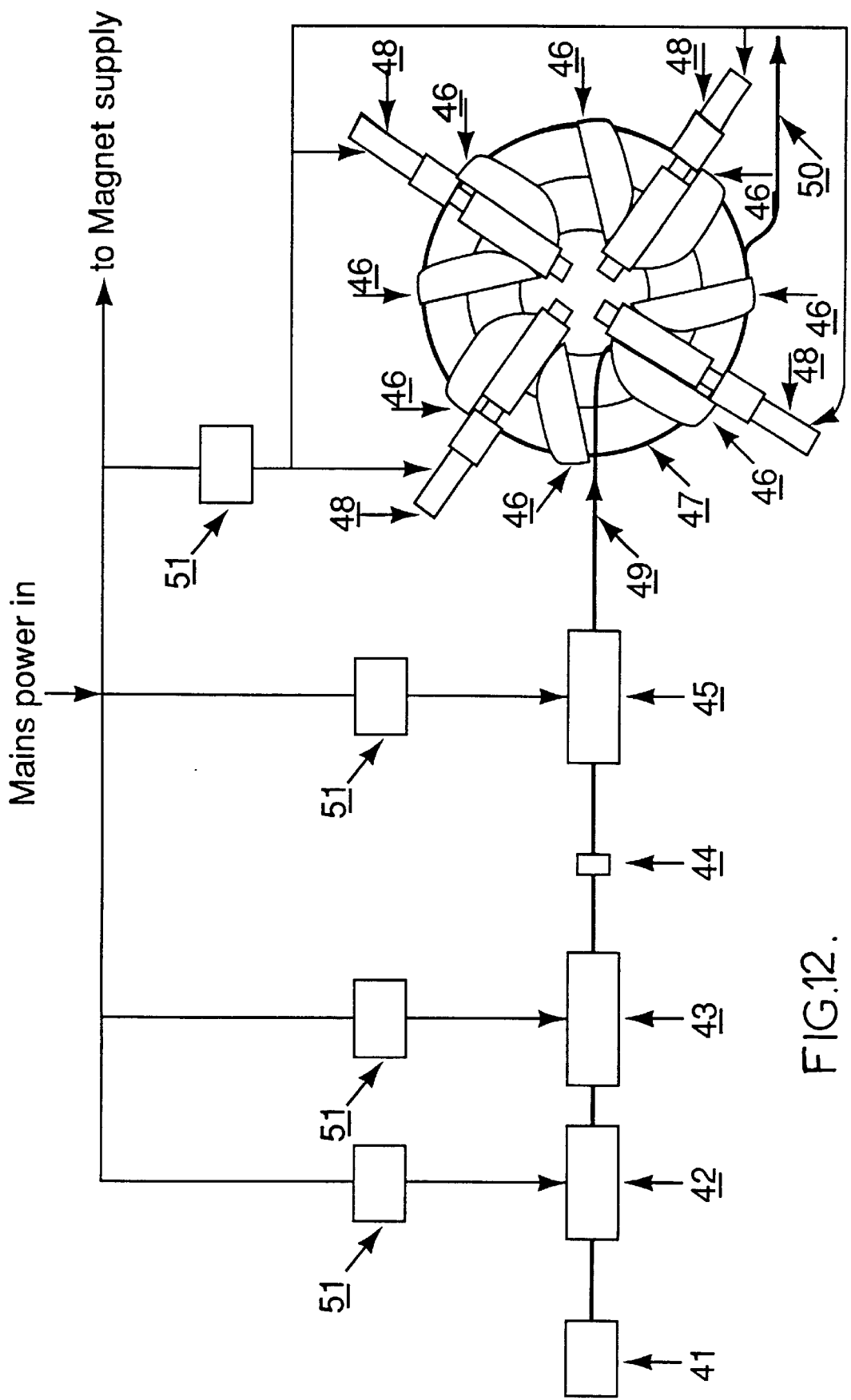
FIG. 12 is a schematic diagram of an isochronous cyclotron.

In FIG. 11 and 12, the power supply of the particle accelerators is shown as coming from the mains. Of course, once the equilibrium conditions are reached, it is more appropriate to use a portion of the energy output of the installation in order to drive the accelerator.

The Initial Fuel Load

In order to operate with a significant gain, the device must contain a reasonable amount of material which is fissile for thermal neutrons. The simplest approach consists of starting with only Thorium or a compound thereof as the fuel material, and performing an initial breeding phase, where the beam intensity is higher, until the equilibrium amount of $U^{233}$ is formed. Although conceptually simple, it is hardly likely that this will be so in practice, and the problem of how to "prime the pump" needs further consideration, even if it has to be done once in the lifetime of each specific application. We can list the following alternatives:

1) $U^{233}$ can be produced by inserting inside the moderator some additional Thorium in the early fuel life of a similar but already operational device. The neutron excess, destined to provide for the allowance of captures by fission fragments later on in the lifetime of the fuel can be dedicated to the breeding of new fuel. While such a possibility is not practical for a thermal environment since the neutron inventory is marginal, as already mentioned, in the case of fast neutrons, there is a quite significant extra reactivity allowance and some 10% of all neutrons could for instance be used to breed some fresh $U^{233}$ from a pure $Th^{232}$ blanket surrounding the central core. One should preserve the fast nature of the neutrons, since the large value if equilibrium concentration=0.1 of $U^{232}$ ensures that for small concentrations of bred $U^{233}$ in a relatively large bulk of initial Thorium, there is little or no burning, but only breeding. In this way, one should be able to breed about 20% excess $U^{233}$ with respect to the one burnt in the central, high concentration core. In practice, this permits, for the parameter chosen later on in this note, a doubling time of the available fuel every about 8/10 years, without relying on "start-up" procedures (see further on) based on enriched $U^{233}$ or surplus $Pu^{239}$ and $Pu^{241}$ from spent fuel or military applications. A doubling time of the installed power of Energy Amplifier of about 8/10 years seems quite an adequate rate of growth, naturally after an initial number of installations have been started with different fuels. Much greater yields can be achieved if one sacrifices to energy production, increasing the beam power and correspondingly reducing the gain with breeding captures. It is important that the added material is primarily used for breeding. Hence the fractional density of $U^{233}$ must be at all times much lower than the equilibrium level for stationary breeding. This implies that chemical purification is required to produce new fuel bars for the new power plant.

2) $U^{235}$ could be used as initial fissile fuel instead of $U^{233}$. Natural Uranium has the considerable inconvenience that inevitable captures of $U^{238}$ lead to a significant pile-up of Plutonium and minor actinides. It is therefore preferable to use highly enriched $U^{235}$. This fuel can either be directly dissolved in the fuel or contained in some auxiliary elements, to be removed after start-up. The properties of $U^{235}$ are quite similar to the ones of $U^{233}$ and an initial load in weight of about 90% of the equilibrium level will suffice to ensure a smooth transition between start-up fuel and the self sufficient $Th^{232}$—$U^{233}$ cycle. Note that this procedure must be followed only once in the history of each installation. Plutonium could also be used, but it involves production of higher actinides and it is not recommended, at least if the philosophy behind the present application has to be followed.

Once equilibrium conditions have been reached, combustion can start. This phase can last for a very long time (several years), the limit being the "poisoning" of the bars by the fission products and the consumption of a major fraction of Thorium fuel.

When the Thorium loading has been sufficiently used and fission fragment captures have reached the maximum acceptable level, a regeneration of the fuel is recommended. This must be done in a specialised centre. The fuel is chemically separated. The Uranium fuel is recovered while the other products (mostly fission fragments) are disposed of. Such a fuel is then used to prepare new Thorium bars, in order to skip the initial breeding phase for the successive filling and to limit the stockpile of actinides. Initial fuel breeding must occur only once in the history of each power plant.

An Energy Amplifier Based On Breeding From Natural Uranium

A main thrust of the present invention is the possibility of burning Thorium in conditions which are essentially free of higher actinide waste and especially of Plutonium. However, one can also use natural or depleted Uranium instead of Thorium. Uranium has a similar breeding reaction, in which $U^{238}$ becomes $Pu^{239}$ with $Np^{239}$ as the $\beta$-precursor:

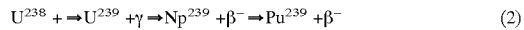

$$U^{238} + \to U^{239} + \gamma \to Np^{239} + \beta^- \to Pu^{239} + \beta^- \qquad (2)$$

Using the basic breeding equations set forth hereinabove and the experimental data from Table 1, we find, for the $U^{238}$—$Pu^{239}$ mixture at the breeding equilibrium, the remarkably small number, $n_3/n_1 = 2.85 \times 10^{-3}$. This means that in regime conditions, the reaction can be sustained indefinitely by $Pu^{239}$ in equilibrium at the tiny concentration of 2.85 kg/ton of Uranium. We remark that this inventory is much smaller than the amount of Plutonium needed in an ordinary Fast Breeder Reactor, and that no handling of the Plutonium is needed since it is bred "in situ" from $U^{238}$.

When compared to a Reactor, the present burning-breeding process with Energy Amplification makes use of the dominant isotope $U^{238}$ rather than of the fissile $U^{235}$ naturally present or enriched, leading to a much better utilisation of the fuel material. Of course the present breeding regime is impossible in a Reactor, since it relates only to a beam-driven sub-critical condition. A fraction of the naturally present $U^{235}$ can conveniently act as a "starter". It is quickly burnt away and replaced by a smaller quantity of highly fissionable $Pu^{239}$.

Figure 13:
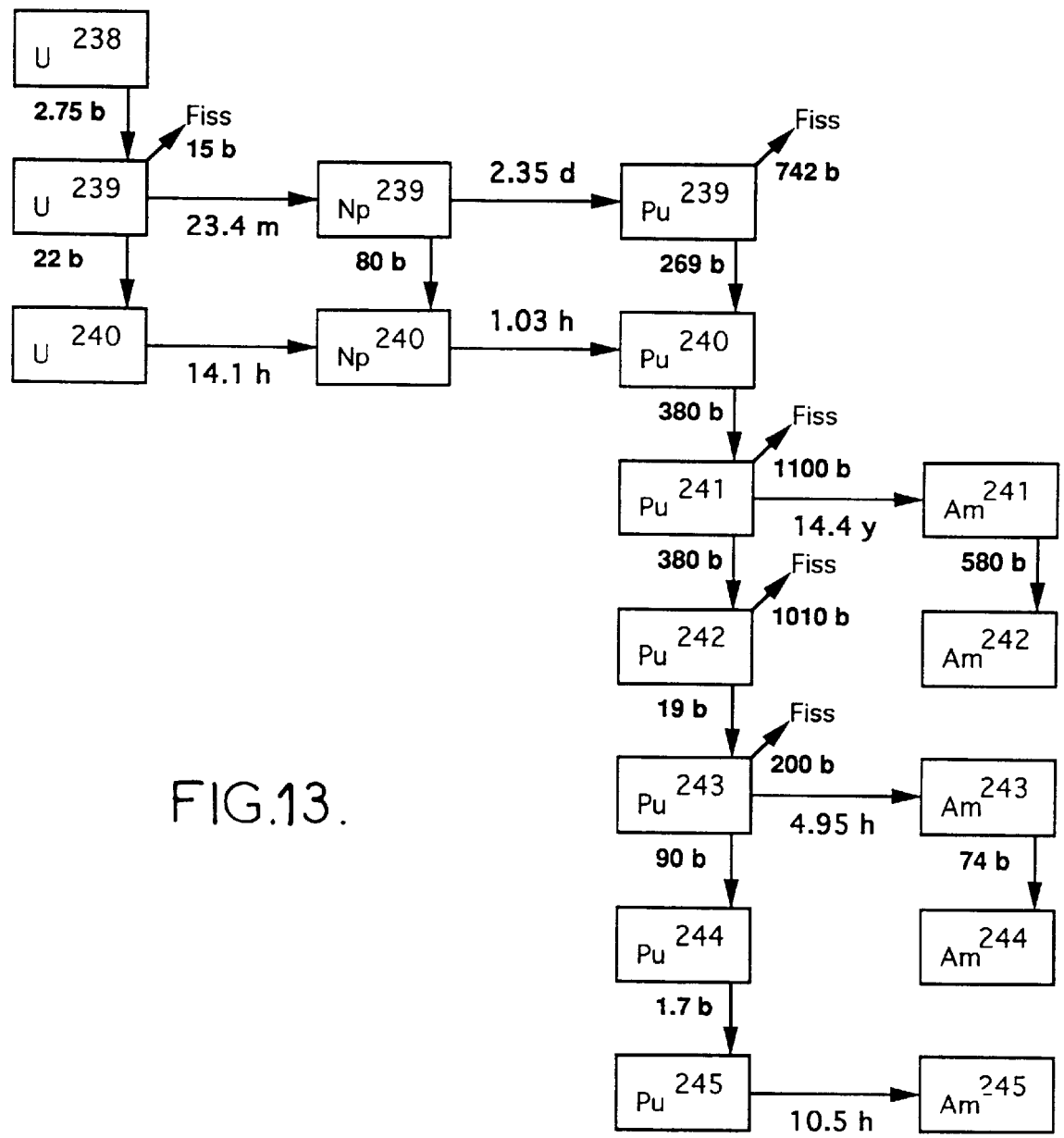
FIG. 13 is a diagram displaying various nuclear reactions which can occur starting from $U^{238}$.
Figure 14:
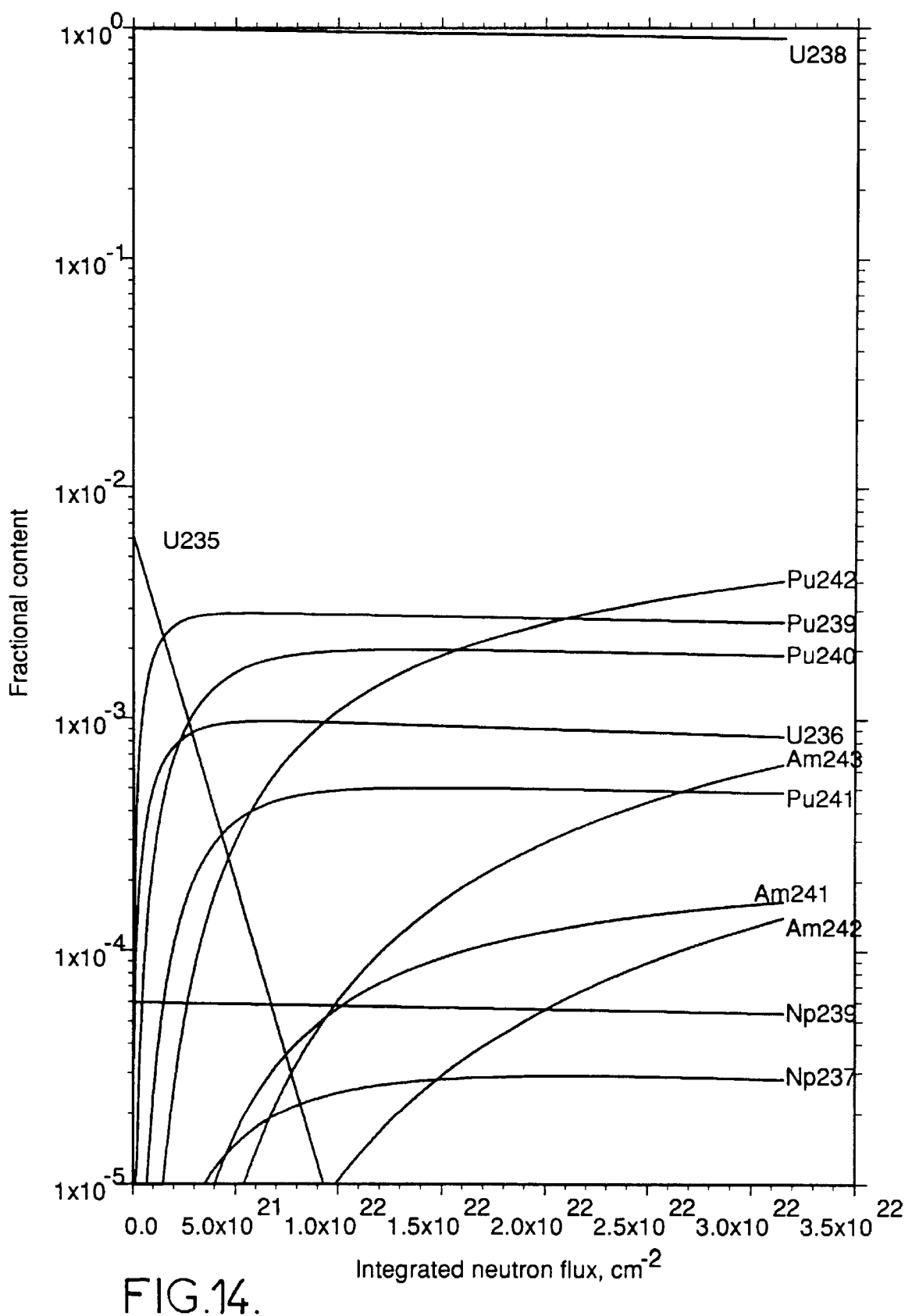
FIG. 14 is a plot similar to FIG.3a when slightly depleted Uranium is used as the initial fuel material.

As in the case of Thorium, a large number of different nuclei can be produced by multiple neutron captures and possibly by decays. They are illustrated in FIG. 13. The full time dependence of an initially slightly depleted Uranium fuel is given in FIG. 14. A fraction of naturally present $U^{235}$ has been preserved since it can conveniently act as natural "starter". One can see that when compared to the corresponding Thorium case (FIG.3a), there is a much larger production of higher actinides, but that their concentration is held to a constant value because of the high "incineration" capability of the scheme. From concentrations, one can calculate $\alpha = 1.694$, which is slightly larger than in the case of a $Th^{232}$—$U^{233}$ mixture, where we have $\alpha = 1.223$. Consequently the (target-averaged) value of $\eta = \nu/(1+\alpha)$ gives the number of secondary neutrons resulting from one neutron interacting and it is slightly smaller, (i.e. 1.08 vs. 1.13), which is detrimental but not unacceptable to the gain. They in turn have a larger capture cross section and are more heavily affecting the neutron inventory. It should also be noted that the effects of fission fragments are now more significant, since the "breeding" cross section is about a factor two smaller. Therefore the performance of Uranium is slightly worse than the one of Thorium: a smaller gain is expected and a more frequent reprocessing is required in order to remove fission fragment "poisoning", but not more frequently than in an ordinary Nuclear Reactor.

As in the case of Thorium, if the neutron flux is suddenly cut off, there is an increase in criticality, due to fact that all $Np^{239}$ nuclei will decay into $Pu^{239}$, leading to an increase of the final population of $Pu^{239}$. Such an increase in fissionable material must not make the system critical. This condition, as has already been pointed out sets a limit for the thermal neutron flux $\Phi \leq 9.84 \times 10^{14} [T/(300° K.)]^{1/2} cm^{-2} s^{-1}$ for $U^{238}$—$Pu^{239}$ (which is less demanding than the corresponding limit for $Th^{232}$—$U^{233}$ was $\Phi \leq 1.44 \times 10^{14} [T/(300° K.)]^{1/2} cm^{-2} s^{-1}$). For practical temperatures, the limit for the neutron flux will be $\Phi \leq 2 \times 10^{15} cm^{-2} s^{-1}$. However, the lifetime of $Np^{239}$ being shorter than the one of $Pa^{233}$ the burning phase is obtained somewhat faster (days instead of weeks).

The target and fuel-moderator configuration described for Thorium are applicable also to the case of the (depleted) Uranium. In particular we have verified that both schemes of the fuel-moderator as high energy target (under-moderated water moderation) and the separate target configuration can be readily extended to the present case.

An Illustrative Beam-Driven Liquid-Cooled Energy Amplifier Without Separate Target This illustrative case exploits the features of under-moderation with water already described previously. The main parameters of the scheme are given in Table 4. The typical thermal power which can be most readily produced in this way is of the order of 200 MW. In order to ensure sufficient cooling of the fuel, especially for larger power, the choice $V_m/V_f \approx 0.8$ is most appropriate. Once the leakage of neutrons and the other losses in the fuel cladding etc. are taken into account, the system will be sub-critical with $k = 0.92 \div 0.95$, corresponding to an energy gain $G = 33 \div 50$. A good design value is therefore $G = 40$. The beam current at $T = 800$ MeV is then $i_{ave} = 6.25$ mA and $P_{beam} = 5.0$ MW. Both a LINAC and a FFAG accelerator can easily satisfy such requirements.

The vast experience with Pressurised Water Reactors (PWR) can be used for the extraction of the heat. Of course other alternatives, like the Boiling Water mode can be used as well, the choice being determined by the type of application.

The operating pressure of the device (PWR) is of the order of 154 bar corresponding to an inlet temperature of 291° C. and an outlet temperature of 322° C. The coolant flow for the nominal power output of 200 MWt is 1.1 m³/sec. The required cooling transfer area inside the fuel core is approximately 300 m². Such a surface is provided even without cooling fins by cylindrical fuel rods of 2.5 (2.0) cm diameter or smaller and a fuel mass of at least 21.4 (17.1) tons.

Figure 15:
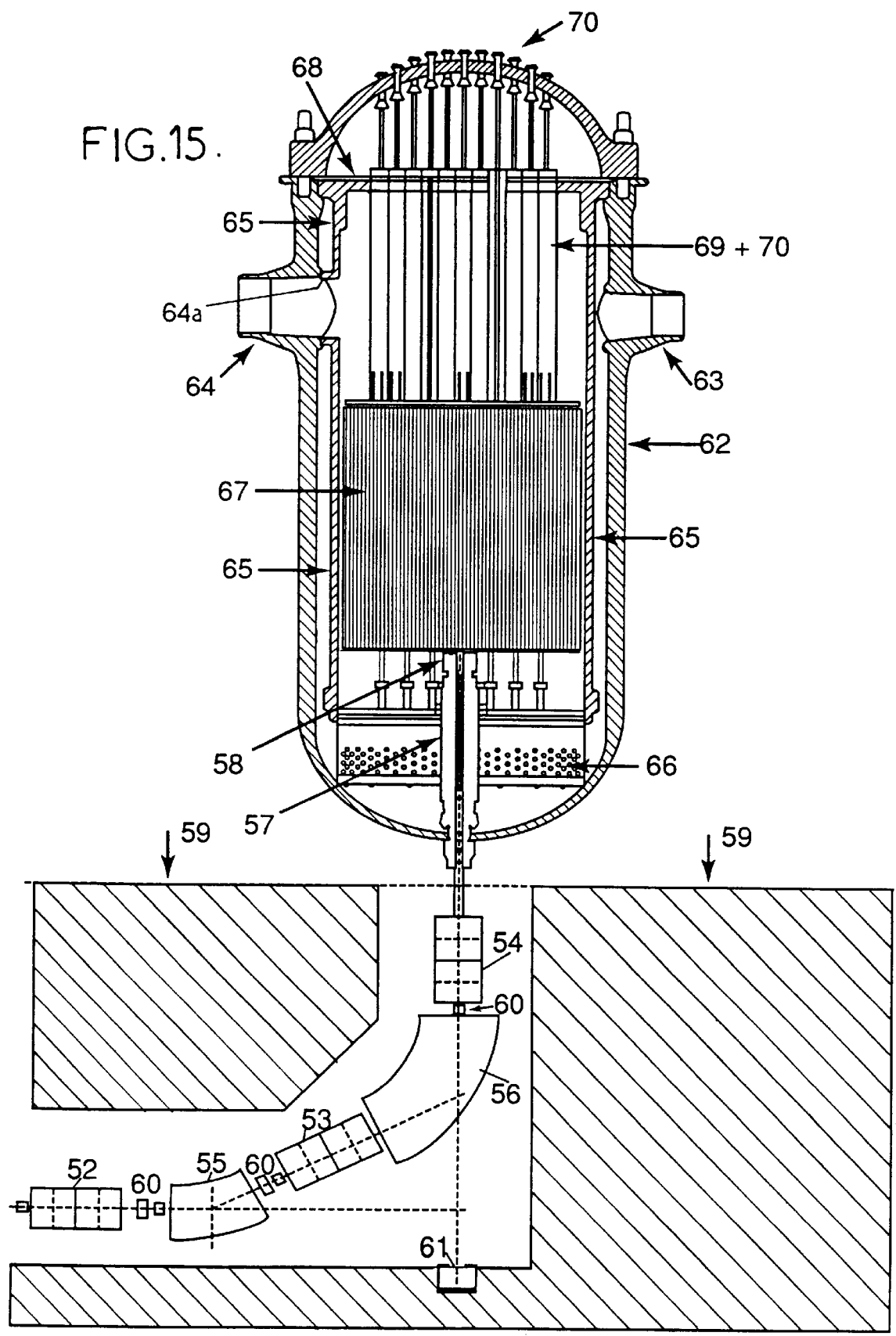
FIG. 15 is a general diagram of a liquid-cooled Energy Amplifier.

The general layout is shown in FIG. 15. It consists of two main separate parts, the final Beam Transport and the main Energy Amplifier assembly. The proton beam, travelling in vacuum from the accelerator, is focussed by magnetic quadrupoles lenses 52, 53 and 54 and deflected by 90 degrees with the help of bending magnets 55 and 56. It enters the pressurised enclosure 62 through a long Entrance Collimator 57, which has at its top end a pressure retaining window 58. Several beam observation devices 60 are used to follow the beam trajectory. A heavy shielding floor 59 is ensuring radiation safety. Neutrons from the fuel-moderator assembly can escape through the beam pipe. This loss is considerably reduced by the collimator 57. The narrow pencil neutron beam passing back through the collimator is collected in a beam dump 61, since, contrary to the proton beam, such neutron beam remains undeflected by the bending magnet 56.

Energy is extracted with the help of Pressurised Water contained in the main enclosure 62. The cooling fluid enters through an inlet nozzle 63 and exits through an outlet nozzle 64. It passes first between the inner walls of the main vessel 62 and the core support barrel 65. Its flow is uniformised by the flow skirt 66 and enters the inner volume of the core support barrel 65 in order to arrive onto the fuel assembly 67 from below. It traverses the many channels of the fuel assembly, extracting efficiently the heat produced therein, and exits through an outlet hole 64a provided in support barrel 65 above fuel assembly 67, the outlet hole communicating with outlet nozzle 64.

The upper part of the main enclosure houses a support structure 68, a fuel handling equipment 69 and a number of control bars 70, mainly to be used to secure firmly in the non-critical condition the fuel after switching the beam off. The need for such device is primarily due to the fact that the fissile $U^{233}$ accumulates after shut-off because of the decay of $Pa^{233}$. During operation these control bars can also be conveniently used to trim the neutron multiplication parameter k, and hence the gain of the Energy Amplifier.

Figures 16A, 16B:
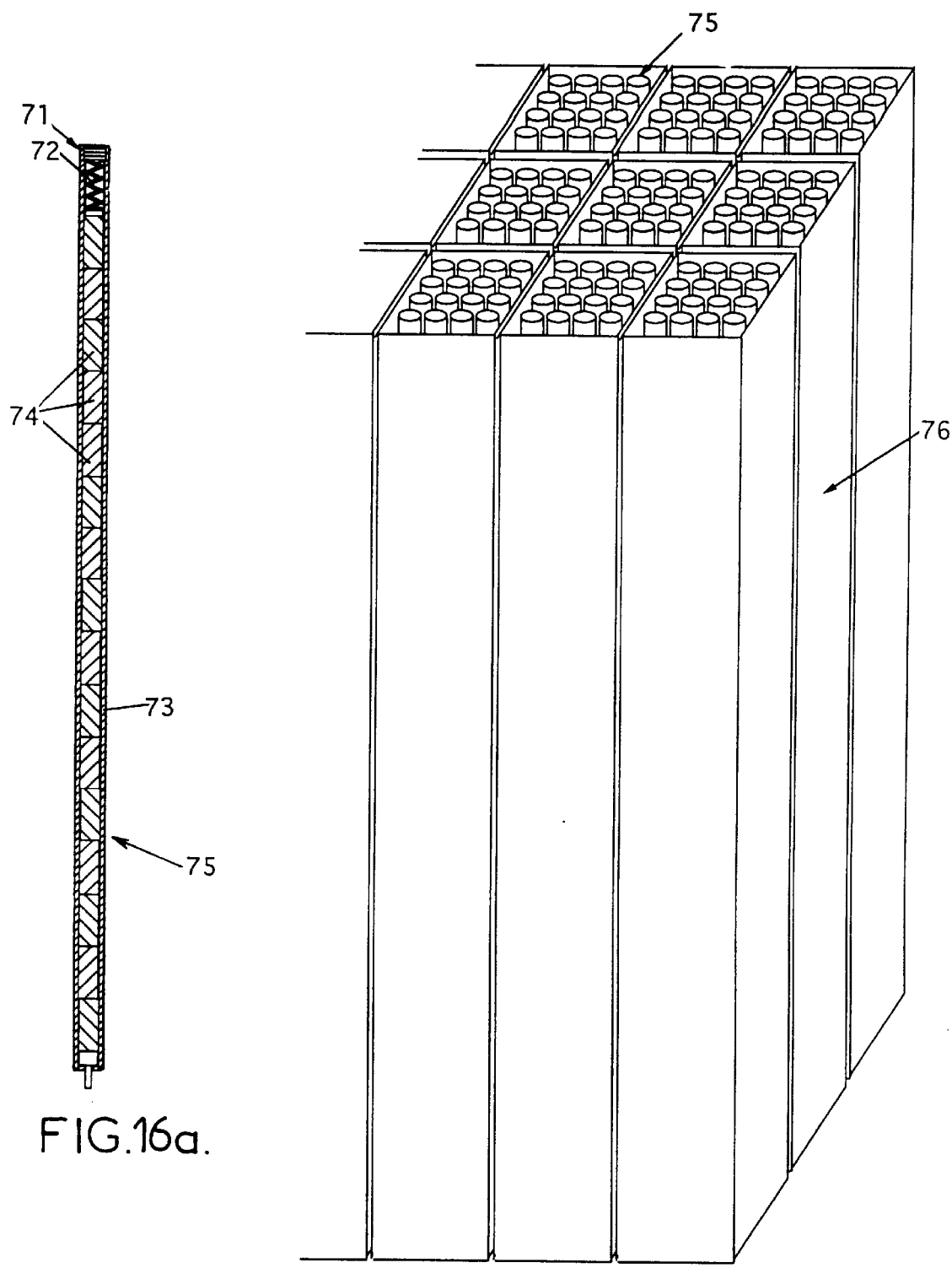
FIG. 16a is a sectional view of a fuel rod usable in the Amplifier of FIG. 15. An assembly of such fuel rods is shown in perspective view in FIG. 16b.

A number of different fuel assemblies can be used. Note that almost infinite variations are possible on fuel-moderator configurations. Two of such schemes, largely inspired to Reactor designs are listed below:

1) A fuel assembly is shown schematically in FIG. 16a–b. The fuel consists in Thorium metal fuel elements 74 stacked up to form fuel rods 75 and cladded with a thin Zircalloy sheet 73 to prevent corrosion (FIG. 16a). Each rod has an end cap 71 with a spring 72 for holding the fuel elements 74. The fuel rods are grouped in sub-assemblies 76 which constitute rigid units for easy handling (FIG. 16b). Note that metal fuel elements 74 could be replaced by pellets of $ThO_2$, $ThC_2$ or other chemically stable Thorium compounds.

2) We mention the advantageous possibility of $ThO_2$ fuel and of spherical fuel pellets in a fluidized bed configuration. A fluidized bed is one in which a fluid flows upwards through a bed of solid particles which then become borne or fluidized but not transported or slurred. The bed is in a state of turbulence, and the solid particles are in constant motion, resulting in a good mixing and excellent heat transfer characteristics.

Figure 17:
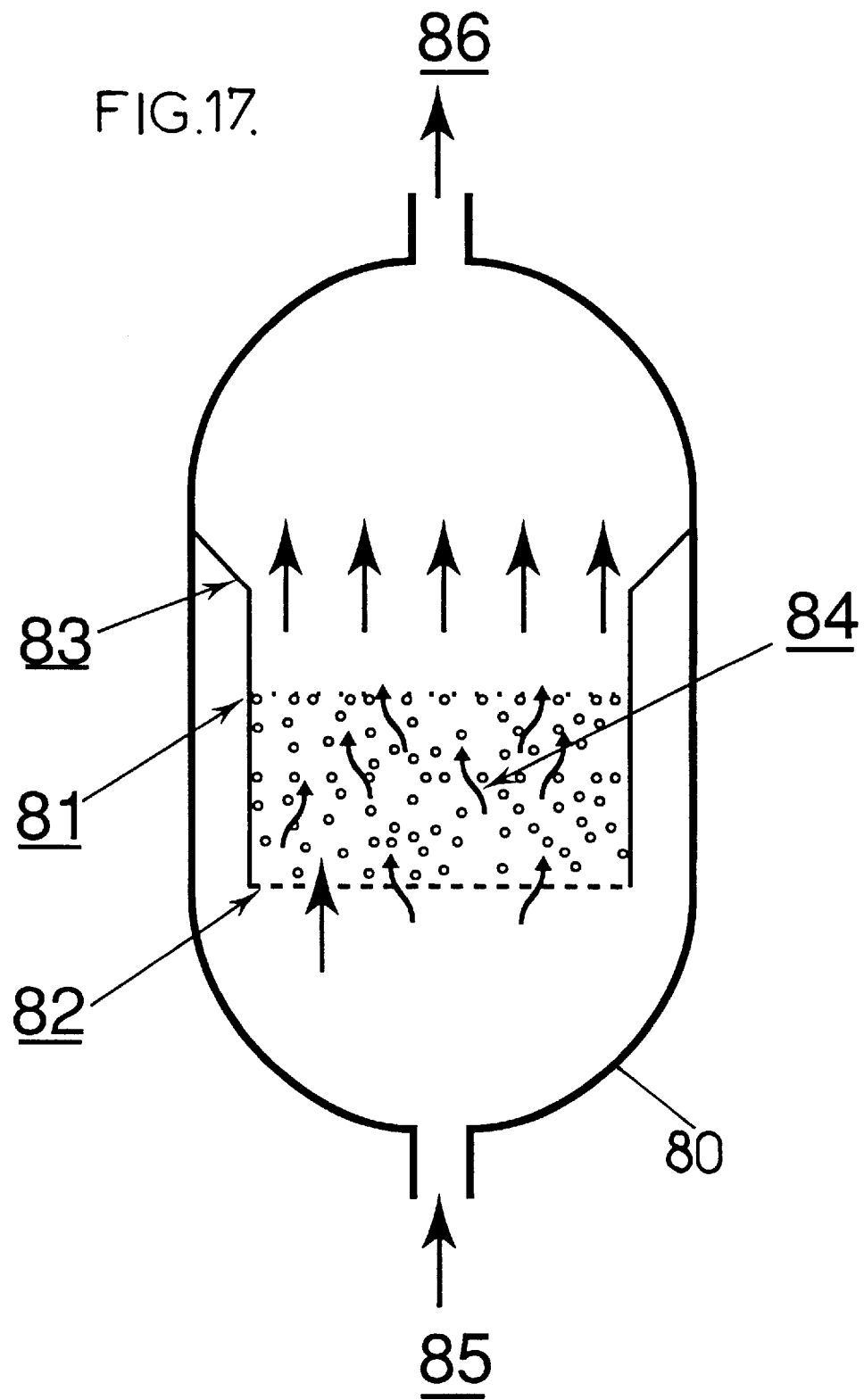
FIG. 17 is a diagrammatic view of a fuel assembly in the form of a fluidized bed usable, e.g., in the Amplifier of FIG. 15.

A typical design (FIG. 17) is made of an outer vessel 80 (to be placed e.g. inside support barrel 65 of FIG. 15), which houses a cylindrical container 81 having a perforated plate bottom 82 strong enough to support the weight of the full fuel load, and a flared top 83. The perforations should be such as to prevent the fuel from falling through, but they should permit the flow of the coolant without a too large pressure drop. The top 83 is flared to reduce the speed of the flow and avoid that fuel elements can escape from the top. The cooling fluid (water) enters vessel 80 at a bottom inlet 85, and exits at a top outlet 86. Fuel elements are simple small spherical pellets 84 that may be clad by coating or, if $ThO_2$ is used, without cladding. Problems of abrasions may arise and they must be studied, since they may affect the design of the primary cooling loop and require that the abraded, radioactive fuel is recovered safely. The maximum packing of the fuel in the collapsed state correspond to random packing of a very large number of spheres and it has a porosity (free volume filled with water/total volume) $a \approx 0.40$, corresponding to $V_m/V_f \approx 0.666$. However, the flow of liquid will increase the porosity and consequently $V_m/V_f$. Control of the reactivity k can be easily achieved without control rods, by simply varying the coolant flow rate within the range of fluidization and therefore the fuel-moderator ratio $V_m/V_f$. This simplifies considerably the design of the pressure enclosure. The simplicity of the fuel loading is also evident, since the continuous loading and unloading of the fuel is possible through small openings provided in the container wall.

Figure 18:
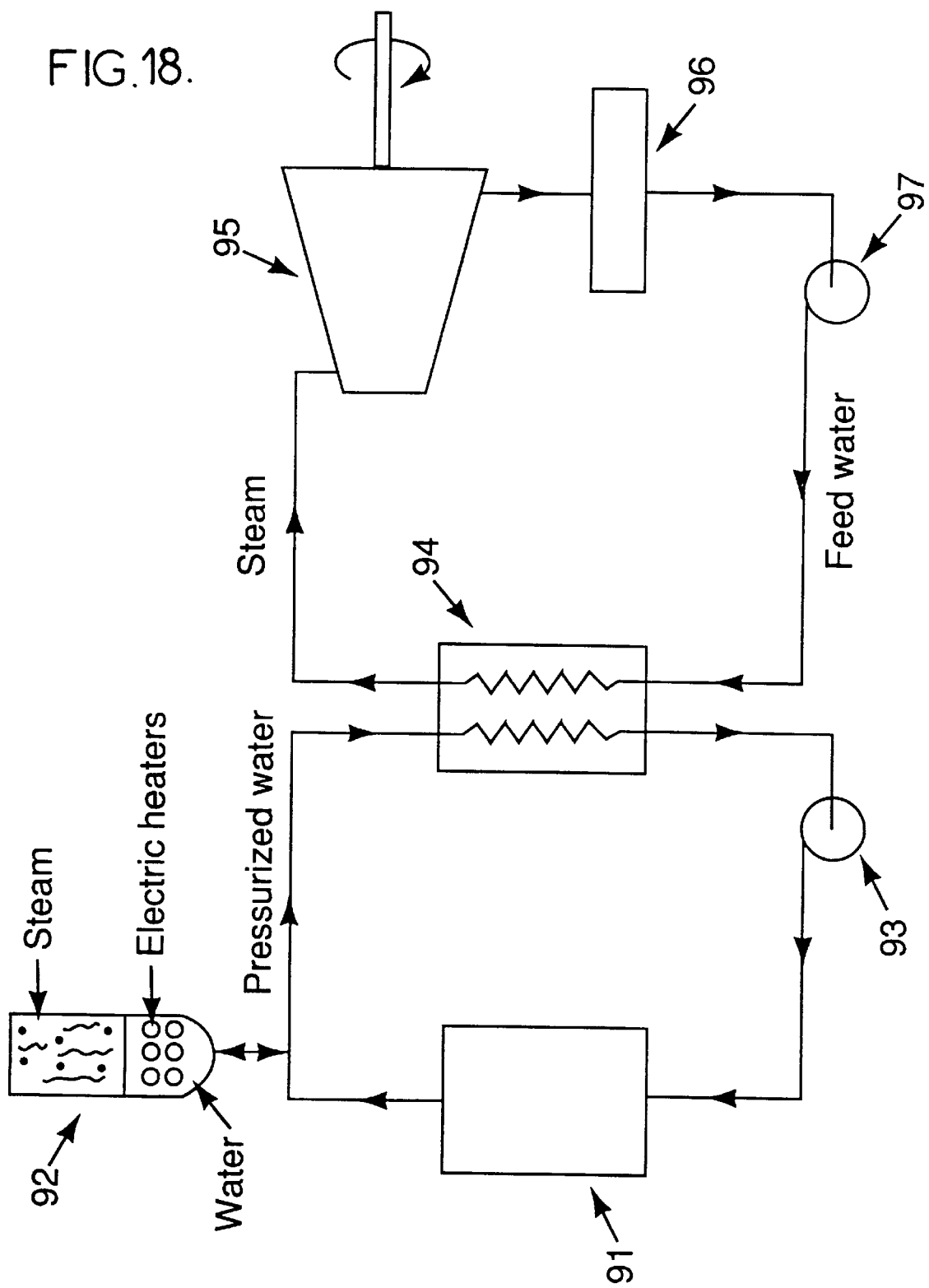
FIG. 18 is a block diagram of energy conversion means usable with a liquid-cooled Energy Amplifier.

The utilisation of the heat produced is of course application-dependent. The pressurised heated water from the enclosure must however be retained in a closed loop and extracted for further use by a standard heat exchanger. In the most obvious application of the device, one has to operate one or more turbines, as schematically shown in FIG. 18. The water which passes through the Energy Amplifier 91 is pressurised by device 92 and it circulates with the help of pump 93. A heat exchanger 94 is used to transform water from another loop into steam which operates turbine(s) 95. A condenser 96 and another pump 97 close the loop.

Common practice indicates that such an arrangement, vastly employed in power stations, can lead to a conversion efficiency into electricity slightly larger than 30%. About 60 MW of electricity can thus be produced with the exemplified parameters given above.

An Illustrative Beam-Driven Gas-Cooled Energy Amplifier With A Separate Target This illustrative case exploits the features of a separate high energy target previously described. Gas is preferred as a coolant, since, as already pointed out, it is essentially transparent both to the incoming high energy beam and to neutrons. Following the current practice in Nuclear Reactors and in other similar applications, the best gas choices are (pressurised) Helium or $CO_2$ (or their mixture) because of their excellent thermodynamical properties and the absence of corrosive effects. As an exemplification, we shall concentrate on pressurised Helium—because of its high heat transfer, low pressure drop, high sound velocity and neutrality toward metals and graphite—but our considerations are valid also for other gases. The moderating medium, in view of its performance at high temperatures has been chosen to be Graphite. Many different lattice geometries are of course possible: we shall describe in detail the one based on spherical units, called "pebbles", each made of a central core of fuel material (Thorium metal or Thorium compound) 22 of FIG. 10b surrounded by a Graphite shell 23. An optimisation of the relevant parameters (reactivity, $U^{233}$ concentration etc.) performed along the lines of the previous example of water moderation indicates that $V_m/V_f$ must be in the range 10÷20 for the best performance, namely $k_\infty=1.04$ and $n_3/n_1=1.7\times10^{-2}$. The ratio of the diameters of the external moderator spheres and of the fuel core are then $(V_m/V_f+1)^{1/3}=2.22\div2.75$. There is large freedom in the choice of the outer diameters of the "pebbles" typically of the order of several centimeters. The porosity of the fuel-moderator volume is the one of an assembly of very large number of randomly packed spheres, $a\approx0.39$. Of course void spaces are traversed by the cooling gas and do not influence appreciably neutrons.

The geometry of the fuel-moderator and target follows closely the one already described with reference to FIG. 10a–c. The target "pebbles" are spheres filled with Bi-Pb or pure Bi metal, liquefied by the energy carried by the beam during operation. A specially cleared region permits the beam to penetrate deeply into the interacting volume. Special grids or other form of mechanical separators ensure that pebbles of different kind cannot mix. Suitable mechanisms permit to introduce new pebbles or to extract them from the volume. A number of shut-off control bars must penetrate in the pebble assembly and they do so through a number of graphite tubings, which of course participate also to the moderation.

Figure 19:
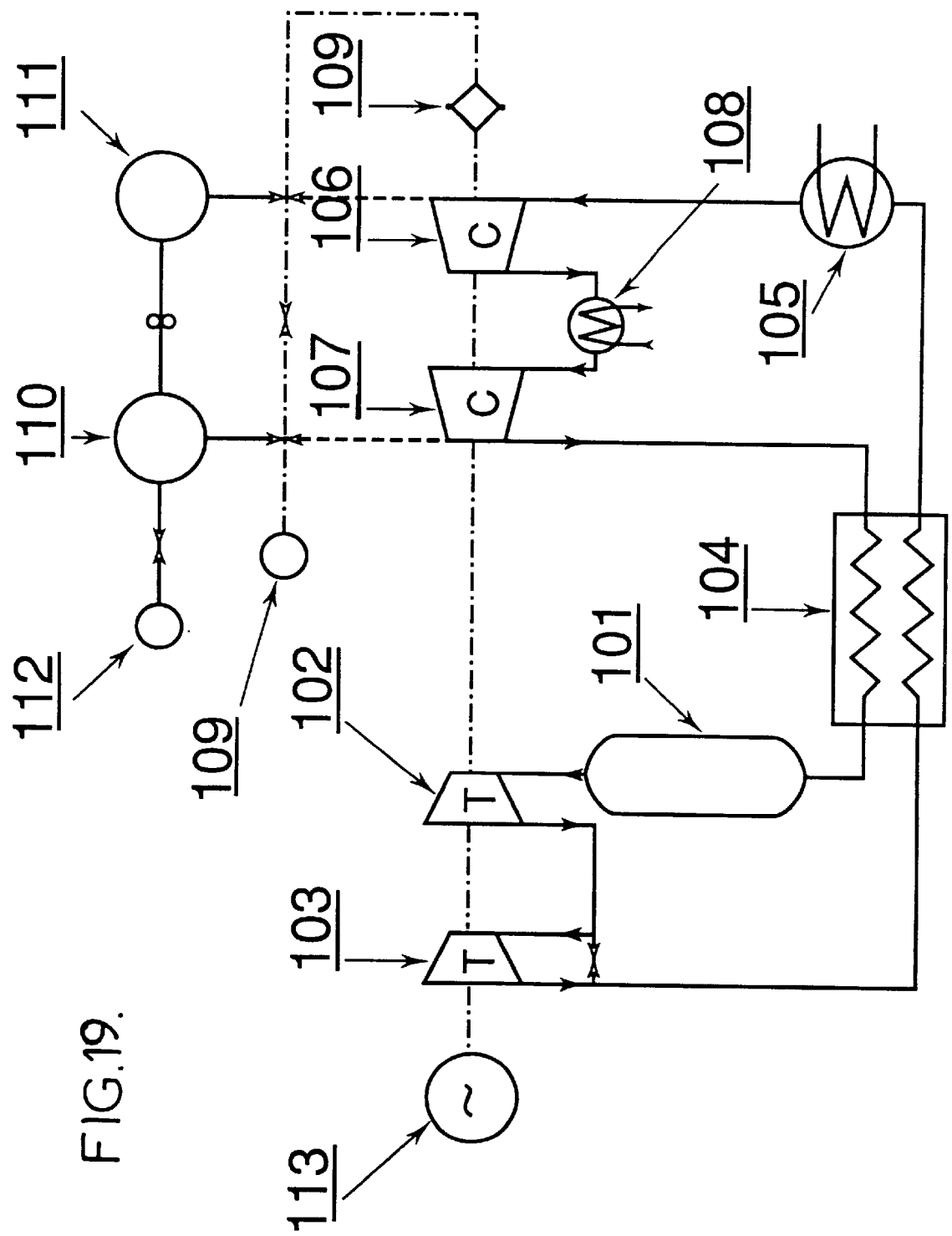
FIG. 19 is a block diagram of energy conversion means usable with a gas-cooled Energy Amplifier.

The present "atomic heater" can be used for a variety of practical applications in which high temperatures, up to and sometimes above 1000° C., are needed. We concentrate on a scheme based on a closed-cycle Helium gas turbine, largely inspired from the closed-cycle fossil fuel fired power plants. Following the large experience of such devices, the typical thermal power which can be most readily produced in this way is up to the order of 200 MWt. A flow diagram as a general example which gives the main design data of a direct helium cycle is shown in FIG.19. Different ways of arranging the machines are of course possible. Helium compressed at some 58 ata (1 ata=101.3 kPa) enters the Energy Amplifier 101 at a temperature of 435° C. and exits at 710° C. with an estimated pressure drop through Energy Amplifier of ≈2 ata. The gas flow is of the order of 200 kg/s. It delivers its power via two turbines 102 and 103 in cascade. Heat resisting material needs to be used only for the high temperature turbine 102. A turbine expansion ratio of 2.5 to 3 offers good design conditions and a small number of stages (2). At the exit of the second turbine 103 the gas has a temperature of 470° C. and a pressure of 26 ata and enters a recuperator 104 to further reduce its temperature to 150° C. With the help of a cooler 105, the gas temperature is reduced to 38° C. (25 ata) and it enters a two stage compressor 106 and 107 with an additional cooler 108 between the two units. At the exit of the compressor (120° C., 60 ata) the gas is preheated in the recuperator to 435° C., (58 ata) and closes the loop entering the Energy Amplifier 101.

Adequate control 109 is provided in order to ensure a constant efficiency over a wide power range. Make-up supplies 110 and 111 are used to replenish gas losses from external reservoir 112. The overall full load efficiency is of the order of 40%. About 80 MW of electricity can thus be produced by the generator 113 driven by the turbines 102, 103, with the exemplified parameters given above.

An Illustrative Beam-Driven Lead Cooled Energy Amplifier Operating With Fast Neutrons This illustrative case gives an example of the potentialities of the fast neutron environment. The extensive exploration of such device performed in the previous sections shows that it has remarkable features and it can overcome several of the limitations of the previous examples. In reference with the previous example of the water-cooled Energy Amplifier, which relies largely on the well mastered technique of the PWR's, a non-moderating coolant must be chosen. In view of the considerable safety problems related to liquid Sodium, chosen almost universally in the Fast Breeder Reactors, we have opted for liquid Lead, for which so far little experience exists, if not for a small reactor developed in the former Soviet Union and for the use in the USA of rather similar metal, Bismuth as cooling agent.

Its boiling point is at 1740° C., safety above any foreseeable operating temperature. Its melting point, 327° C. for the pure metal, can be lowered down to 125° C. with an equal, eutectic mixture of Lead and Bismuth. Its density is high ($\approx 10$ gr/cm$^3$) and its fluidity and heat capacity quite good. At high temperature, it has some corrosive properties which can be solved with appropriate additives. Its vapour pressure is also very low, reaching 1 mm Hg only at 973° C.

Another overwhelming reason for choosing Lead (or Bismuth, or an eutectic mixture of the two) is the fact that these materials as high energy targets offer an excellent neutron yield, and therefore the coolant material can also be the first target for the high energy proton beam.

A second major difference of the present illustrative example when compared to the previous cases is that the neutron flux and the related radiation damage are now some one hundred times larger. This is a well known problem of the Fast Breeder reactors and apparently has been solved at least for burn-ups of the order of 100 GWatt(t) day/ton.

The motivations in accepting these additional changes is in our view overwhelming in view of the considerable improvement in performance, namely (1) a higher gain (G $\approx 100\div150$), (2) a larger maximum power density (160 MWatt(t)/ton(Th)) and (3) an extended burn-up ($\geq 100$ GWatt(t) day/ton(Th)).

As already illustrated in the foregoing, the higher gain is due both to a more efficient high energy target configuration and to a larger, practical value of the neutron multiplication factor k. The higher power density results from the higher permissible neutron flux, which in turn is related to the reduced rate of $Pa^{233}$ neutron captures (which, as well known, suppress the formation of the fissile $U^{233}$) and the much smaller k variations after switch-off due to $Pa^{233}$ decays for a given burn-up rate. Finally, a longer integrated burn-up is made possible by reduced capture rate by fission fragments of fast neutrons, and it is limited by the mechanical surviva of the fuel elements.

In practice, a 20 MWatt proton beam (20 mA at 1 GeV) accelerated by a cyclotron will suffice to operate a compact Energy Amplifier at the level of $\approx$GWatt$_e$. The integrated fuel burn-up can be extended in excess of 100 GWatt day/ton, limited by the mechanical survival of the fuel elements. Because of the high(er) operating temperature ($\geq 600°$ C.) of the Lead coolant, one can safety assume a thermodynamical efficiency of the order of 42%. Hence, the thermal nominal power is 2.4 GWatt(t). The fuel mass is of the order of 15 Tons in the form of $ThO_2$—$UO_2$ mixture filling thin stainless steel rods or pins, in a configuration similar to the ones already described in FIG. 16a and FIG. 16b. The $U^{233}$ "seeds" (at equilibrium concentration of 10% of Thorium) have then a weight of 1.5 tons.

The fast neutron option has a larger neutron yield and smaller losses associated to poisoning due to fission fragments and higher isotopes of Uranium. Therefore, one can breed fissile $U^{233}$ in excess to what is normally regenerated by the main breeding process which is creating new $U^{233}$ exactly at the pace at which $U^{233}$ is burnt in the fuel. In this way one should be able to breed about 20% excess $U^{233}$ with respect to the one burnt in the central, high concentration, core. In practice, this permits a doubling time of the available fuel every about 8/10 years, without relying on "start-up" procedures based on enriched $U^{235}$ or surplus $Pu^{239}$ and $Pu^{241}$ from spent fuel or military applications. A doubling time of the installed power under ten years, seems quite an adequate rate of growth, naturally after an initial number of installations have been started with different fuels.

Neutron (n,γ) cross sections for fast neutrons are much smaller both in the case of fission fragments and of several of newly produced Uranium, Protactinium and Neptunium isotopes. Concentrations of the Actinides are very different from the ones for the thermal neutrons and must be illustrated:

(1) Two new elements becomes important because of the enhanced (n,2n) channels, namely $Pa^{231}$ and $U^{232}$. The presence of a relatively large amount of $U^{232}$ (τ=70 years), which is about 50 times more abundant for comparable burn-up, could be considered as an advantage since it positively "denaturates" the Uranium extracted, helping to fight military diversions of the material. The added toxicity due to the presence of $U^{232}$ is not so large as to make the processing of the spent fuel impossibility expensive. The $Pa^{231}$ represents a source of additional long-lived (τ=3.3 $10^4$ years) radio-toxicity which must be mastered. It is possible to separate chemically the $Pa^{231}$ from the spent fuel. Methods can be envisaged in order transform it in $U^{232}$ by neutron capture and subsequent βdecay.

(2) The production of higher mass actinides is very strongly suppressed, namely $Np^{237}$ and $Pu^{238}$ at levels of less than 1 gr/ton after 100 GW(t) day/ton. Higher Plutonium, Americium, Curium, Californium isotopes etc. are far below those levels, with a corresponding, beneficial effects on the toxicity of produced Actinides. The practically total absence of higher Actinides has a tremendous consequence in solving the problem of long time storage of spent fuel, provided that two problems are mastered, namely the one associated to the presence of $U^{232}$ and the one of $Pa^{231}$.

A few percent of all neutron absorptions will occur in the coolant; it is important to evaluate the effects of the daughter nuclei, both in terms of neutron captures and in terms of radio-toxicity. It may be worth noting that natural Lead has been already employed as practical reactor coolant.

Natural Lead is made of several isotopes, $Pb^{208}$ (52.4%), $Pb^{206}$ (24.1%), $Pb^{207}$ (22.1%) and $Pb^{204}$ (1.4%). If the target is ideally made of pure $Pb^{208}$, a neutron capture will produce $Pb^{209}$, which quickly ($t_{1/2}$=3.25 hours) decays into the stable $Bi^{209}$ which will remain as eutectic mixture with the target material. Reactions of type (n,2n) occur at a level which is few percent of captures and create $Pb^{207}$, also stable. Both daughter nuclei are stable elements and excellent target material themselves. A target with natural Lead will produce an appreciable amount of $Pb^{205}$ from captures of $Pb^{204}$ and to a smaller level from (n,2n) of $Pb^{206}$. This element is long-lived ($t_{1/2}$=1.52 $10^7$ years) and decays into stable $Tl^{205}$ by electron capture and no γ-ray emission. Neutron capture properties of $Pb^{205}$ are unknown, and therefore it is impossible to estimate the possibility of further transformations. Finally $Pb^{203}$ from (n,2n) of $Pb^{204}$ is short-lived ($t_{1/2}$=51.8 hours) and decays into stable $Tl^{203}$ by electron capture. Reactions of the type (n,p) transform Pb isotopes into the corresponding Thallium isoiopes ($Tl^{208}$, $Tl^{207}$, $Tl^{208}$ and $Tl^{204}$) which all β-decay quickly into Pb nuclei again. We remark that, in general, there could be a significant benefit in using $Pb^{208}$ isotopically enriched metal as a coolant.

Situation is more complex in the case of a Bismuth target. Neutron captures lead to short-lived $Bi^{210}$ which decays ($t_{1/2}$=5.0 days) in $Po^{210}$ which, in turn, decays with $t_{1/2}$=138 days to stable $Pb^{206}$. However, there is a longlived ($t_{1/2}$=3 $10^6$ years) isomeric state $Bi^{210}$, also excited by neutron capture, which decays by α-decay to short-lived $Tl^{206}$ (RaE), which in turn β-decays in stable $Pb^{206}$ Reactions of the (n,2n) type would produce the long-lived ($t_{1/2}$=3.58 $10^5$ years) $Bi^{208}$, which ends up to stable $Pb^{208}$ via internal conversion. Therefore, a Bismuth moderator may present significant problems of radio-toxicity which must be further examined before seriously considering such material as target.

Additional fragments are produced by the spallation processes due to the high energy beam. The toxicity problem has also to be investigated, although there is expectation that no major problems should arise. It is generally believed that the effects due to the neutron captures in such added impurities are small and will be neglected at this level.

Figure 20:
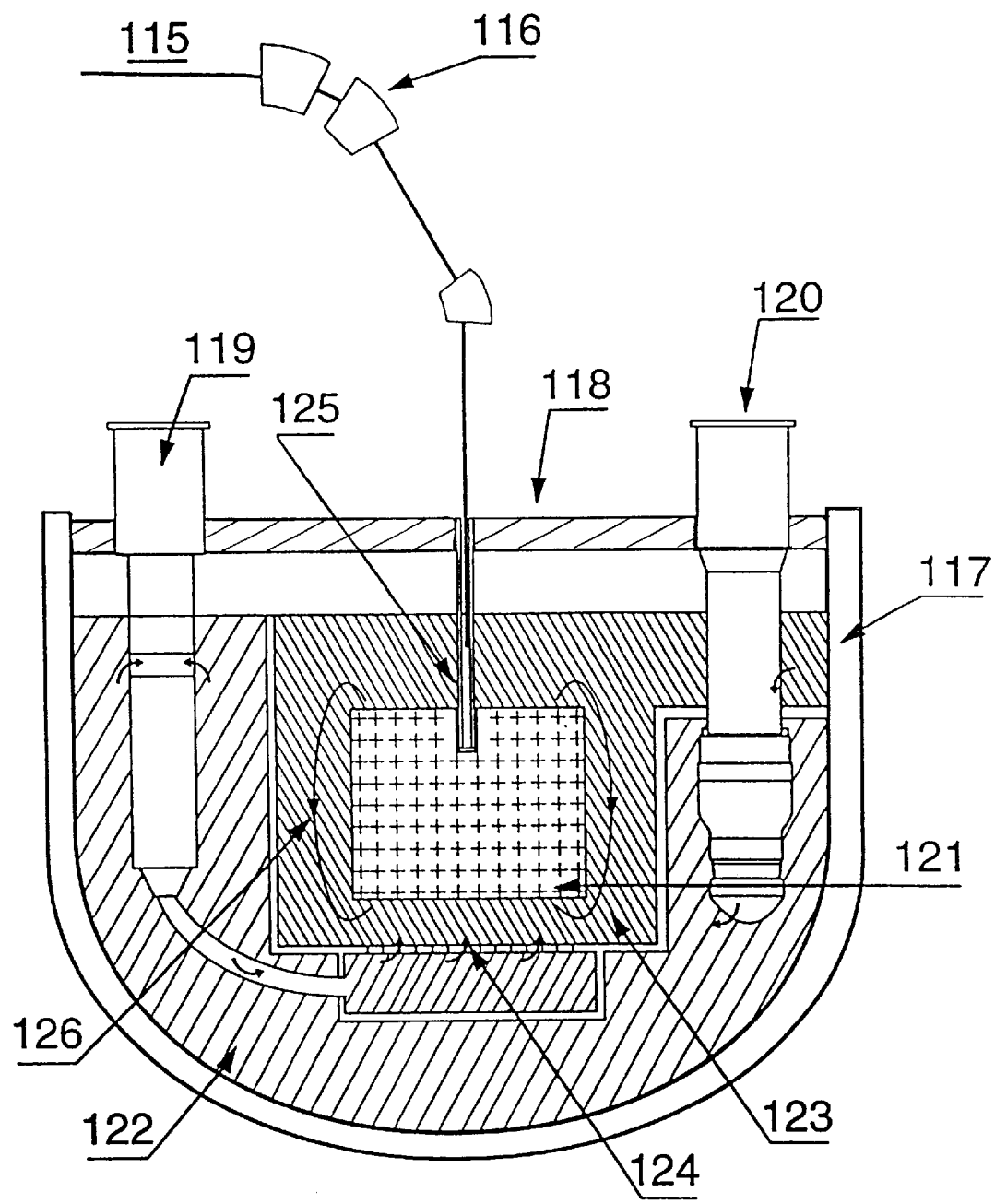
FIG. 20 is a schematic diagram of an Energy Amplifier usable in the case of fast neutrons.

The principle design of a Energy Amplifier with fast neutrons and Lead cooling is shown in FIG. 20. The incident proton beam 115 is steered by bending magnets 116 and impinges through a beam tube 125 on the core 121. The molten Lead includes a zone 123 that is brought to a high temperature by the released reaction heat. After passing through a heat exchanger 120, the molten Lead enters the low temperature zone 122, and is circulated back by a pump 119 to enter again the high temperature zone by a feedthrough grid 124. The set-up is included in a double walled vessel 117, which is topped by a lid 118. Radioactive heat in case of an accidental failure of the main cooling system is extracted from the main core by convection currents 126 and released to the atmosphere through a convective system in contact with the molten lead (not shown).

Figure 21:
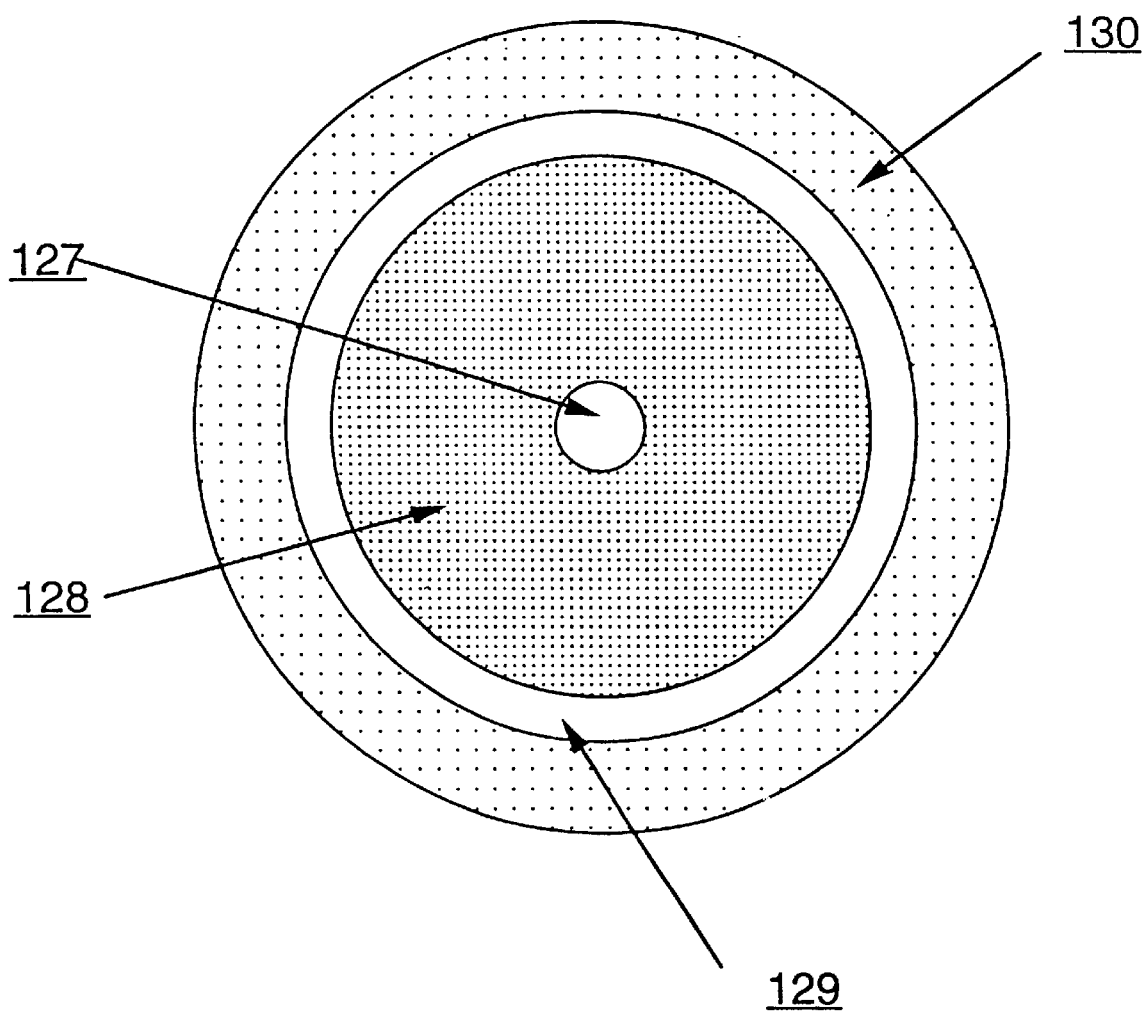
FIG. 21 is a schematic diagram of the core of an Energy Amplifier as shown in FIG. 20.

The Energy amplifier core, schematically illustrated in FIG. 21, which has for exemplification a cylindrical geometry, is subdivided in five separate regions. The innermost region 127 is filled simply by molten Lead and acts as high energy target for the incident beam. The next region 128 is the main core, filled with the appropriate geometry of fuel rods/pins, which contain the fuel in the form of Oxide cladded by thin Stainless Steel Walls. The geometry of these bars is similar to the one already described in the case of the water-moderated Energy Amplifier (FIG. 16a and FIG. 16b). Considerable experience exists on fuel pins of rods intended for Fast Breeders. Most of such experience can be directly transferred to our application. The main parameters of a typical fast breeder fuel pin are shown in Table 5. Their design can be perfectly adapted to our application. The thermodynamics of the fuel pins allows a burn-up rate which is about three times the one of a thermal neutron example. The corresponding neutron flux is then about a factor 100 larger, i.e. $\Phi=10^{16}$ cm$^{-2}$ s$^{-1}$. At such a flux, the current pin design should permit a burn-up of about 100 GW day/t.

After a buffer zone 129 filled only by the molten lead, we have the Breeder region 130, made of a bars/pins structure similar to the one of the core except that (1) initially pure Thorium is filling the bars/rods and (2) little or no burning occurs and therefore cooling requirements are much more modest. We expect that the amount of $U^{233}$ produced in the Breeder is about 20% of the amount burnt in the core.

TABLE 5

Main parameters of a typical fuel pin

| Material | $UO_2$, $PuO_2$, ($ThO_2$) | |
|---|---|---|
| Fuel pellet diameter | 6.0 | mm |
| Thickness of clad | 0.35 | mm |
| Type of clad | SS16Cr13Ni | |
| Smear density | 0.80 + 0.85 | |
| Linear rod power | 450 | W/cm |
| Fuel rating ($ThO_2$ + breeding), ρ | 160 | kW/kg |
| Gap between fuel pellet and clad | 80.0 | μm |
| Max.midway, hot spot clad temperature | 700 | °C. |
| Burn-up | >100 | GW day/t |
| Duration of an element @ 100 GW day/t | 2 years | @85% util |

I claim:

1. A method of producing energy from a nuclear fuel material including a fertile element, comprising the steps of:
   arranging said fuel material within an enclosure also containing heavy nuclei;
   directing a high energy particle beam into the enclosure, whereby interaction of said particle beam with said heavy nuclei contained in the enclosure produces high energy spallation neutrons;
   multiplying the neutrons produced by said directing step by a steadily sub-critical process of breeding of a fissile element from said fertile element of the fuel material via a β-precursor of said fissile element and fission of the fissile element, said breeding and fission process being carried out inside the enclosure; and
   recovering thermal energy evolved from said sub-critical breeding and fission process.

2. A method according to claim 1, wherein an average neutron flux to which the fuel material is exposed by said multiplying step is at most $0.03/(\sigma_i^{(2)}\tau_2)$, where $\sigma_i^{(2)}$ and $\tau_2$ designate a neutron capture cross section and a half-life, respectively, of the β-precursor.

3. A method according to claim 1, wherein an average neutron flux to which the fuel material is exposed by said multiplying step is at most $0.2/(\sigma^{(3)}\tau_2)$, where $\sigma^{(3)}$ designates a total neutron interaction cross section of a nuclei of the fissile element, and $\tau_2$ designates a half-life of the β-precursor.

4. A method according to claim 1:
   wherein said multiplying step includes an initial breeding phase and a burning phase;
   wherein, in the burning phase, a ratio between concentrations of the fissile element and of the fertile element in the fuel material is substantially stable; and
   wherein, in the initial breeding phase, in an initial fuel load, a ratio between concentrations of the fissile element and of the fertile element is substantially smaller than the stable ratio in the burning phase, the initial breeding phase being carried out in order to reach the stable value with an intensity of the particle beam being higher in the initial breeding phase than in the burning phase.

5. A method according to claim 1:
   wherein said multiplying step includes an initial breeding phase and a burning phase;
   wherein, in the burning phase, a ratio between concentrations of the fissile element and of the fertile element in the fuel material is substantially stable; and
   wherein, in the initial breeding phase, in an initial fuel load, a ratio between concentrations of the fissile element and of the fertile element is about the stable ratio in the burning phase, the fissile element content of the initial fuel load being recovered, through chemical separation, from another fuel material which has been consumed in a previous similar energy production operation.

6. A method according to claim 4, further including the steps of:
   inserting additional fuel material in the enclosure during activation of the particle beam, said additional fuel material having an initial content in which the ratio between the concentrations of the fissile element and of the fertile element is substantially smaller than the stable ratio in the burning phase, and
   removing of the additional fuel material from the enclosure once the stable ratio is reached, in order to use the additional fuel material as the initial fuel load in a subsequent energy production operation.

7. A method according to claim 1, wherein the fertile element is $Th^{232}$, the β-precursor is $Pa^{233}$, and the fissile element is $U^{233}$.

8. A method according to claim 7, wherein $U^{235}$ nuclei are provided in an initial fuel load of the fuel material, so as to have an initial fissile content in the fuel material.

9. A method according to claim 1, wherein the fertile element is $U^{238}$, the β-precursor is $Np^{239}$, and the fissile element is $Pu^{239}$.

10. A method according to claim 1, wherein said arranging step includes providing of a moderator medium in the enclosure so as to slow the hiqh energy neutrons down to thermal or epithermal energies.

11. A method according to claim 7, wherein said arranging step includes providing of a moderator medium in the enclosure so as to slow the high energy neutrons down to thermal or epithermal energies, and wherein an average neutron flux in the enclosure is less than $1.5 \times 10^{14}$ $cm^{-2} \cdot s^{-1}$.

12. A method according to claim 11, including the step of leaving the fuel material in the enclosure until the fuel material has been subjected to an integrated neutron flux of about $3 \times 10^{22}$ $cm^{-2}$.

13. A method according to claim 9, wherein said arranging step includes providing of a moderator medium in the enclosure so as to slow the high energy neutrons down to thermal or epithermal energies, and wherein the average neutron flux in the enclosure is less than $10^{15}$ $cm^{-2} \cdot s^{-1}$.

14. A method according to claim 13, including the step of leaving the fuel material in the enclosure until the fuel material has been subjected to an integrated neutron flux of about $10^{22}$ $cm^{-2}$.

15. A method according to claim 1, wherein said heavy nuclei contained in the enclosure are comprised of nuclei of the fuel material.

16. A method according to claim 15, wherein said arranging step includes providing water as a moderator medium in the enclosure, a ratio $V_m/V_f$ between volumes respectively occupied by the water moderator medium and by the fuel material in the enclosure being in a range of $0.2 \leq V_m/V_f \leq 1$.

17. A method according to claim 16, wherein said recovering step includes flowing of the water from the enclosure to extract heat therefrom.

18. A method according to claim 16, wherein said arranging step provides the fuel material in fragmented form, and includes the step of forming a fluidized bed with the water moderator medium.

19. A method according to claim 18, wherein said providing step includes the step of adjusting a flow rate of the water moderator medium.

20. A method according to claim 1, wherein said arranging step includes providing of the heavy nuclei contained in the enclosure by a separate spallation target.

21. A method according to claim 20, wherein said providing step locates the spallation target centrally in the enclosure and surrounded by the fuel material.

22. A method according to claim 20, wherein said providing step provides the spallation target with a substantial amount of a material having a high transparency to thermal neutrons.

23. A method according to claim 22, wherein the spallation target provided in said providing step is made of bismuth and/or lead.

24. A method according to claim 20, wherein said arranging step includes providing of a solid-phase moderator medium in the enclosure so as to achieve a substantially complete thermalization of the high energy neutrons produced by the spallation target.

25. A method according to claim 24, wherein said arranging step includes providing of the fuel material as a plurality of fuel bodies each encapsulated in a shell of a solid-phase moderator.

26. A method according to claim 24, wherein said providing of a solid-state moderator medium provides the moderator medium as graphite.

27. A method according to claim 20, wherein said recovering step includes flowing of gas to extract heat from the enclosure.

28. A method according to claim 1, wherein said multiplying step provides the neutrons involved in the breeding and fission process as fast neutrons.

29. A method according to claim 28, wherein said multiplying step provides an average neutron flux in the enclosure of less than $10^{16}$ cm$^{-2}\cdot$s$^{-1}$.

30. A method according to claim 28:
wherein said arranging step provides molten lead and/or bismuth as the heavy nuclei contained in the enclosure for interacting with the particle beam and;
said recovering step includes the step of circulating said molten lead and/or bismuth along a cooling circuit for extracting heat from the enclosure.

31. A method according to claim 30, wherein said circulating step in the cooling circuit occurs by passive convection, and this provides a dissipation of the evolved thermal energy.

32. A method according to claim 28:
wherein said arranging step includes the disposing of a blanket of fertile material about the fuel material so as to capture excess neutrons and produce some fissile elements and;
further including the step of using a fertile-fissile mixture thereby obtained as an initial fuel load in a subsequent energy production operation.

33. A method according to claim 1, wherein said directing steps provides particles which are protons or deuterons, provides the particles by a linear particle accelerator or by a sector-focussed cyclotron, and provides the particles with an energy of at least 0.5 GeV.

34. An energy amplifier comprising:
an enclosure for containing a fuel material including a fertile element and heavy nuclei; and
means for directing a high energy particle beam into the enclosure so as to produce high energy spallation neutrons from an interaction of the particle beam with the heavy nuclei contained in the enclosure, whereby the neutrons are multiplied by an in situ, steady subcritical process of breeding a fissile element from the fertile element of the fuel material and fission of the fissile element.

35. An energy production installation comprising:
an energy amplifier, said energy amplifier comprising:
an enclosure for containing a fuel material including a fertile element and heavy nuclei; and
means for directing a high energy particle beam into the enclosure so as to produce high energy neutrons from the interaction of the particle beam with the heavy nuclei contained in the enclosure, whereby the neutrons are multiplied by an in situ, steady subcritical process of breeding a fissile element from the fertile element of the fuel material and fission of the fissile element;
a particle accelerator for producing the high energy particle beam directed into the enclosure;
coolant fluid circulation means for extracting heat from the enclosure; and
energy conversion means for transforming heat conveyed by the coolant fluid into a readily usable form of energy.

36. An installation according to claim 35, wherein the particle accelerator is driven by a portion of the usable form of energy of the energy conversion means.

* * * * *